(12) United States Patent
Kojima

(10) Patent No.: US 7,673,008 B2
(45) Date of Patent: Mar. 2, 2010

(54) NETWORK SYSTEM AND DEVICE

(75) Inventor: Atsushi Kojima, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1015 days.

(21) Appl. No.: 11/359,361

(22) Filed: Feb. 23, 2006

(65) Prior Publication Data

US 2006/0190521 A1    Aug. 24, 2006

(30) Foreign Application Priority Data

Feb. 24, 2005   (JP) .............................. 2005-049457

(51) Int. Cl.
G06F 15/16   (2006.01)

(52) U.S. Cl. ................... 709/208; 709/221; 709/224; 714/4

(58) Field of Classification Search ......... 709/223–225, 709/208, 209, 221; 714/4
See application file for complete search history.

(56) References Cited

U.S. PATENT DOCUMENTS

| | | | | |
|---|---|---|---|---|
| 6,980,522 | B2* | 12/2005 | Boyle | 370/252 |
| 7,039,694 | B2* | 5/2006 | Kampe et al. | 709/222 |
| 7,359,950 | B2* | 4/2008 | Choi et al. | 709/209 |
| 7,433,317 | B2* | 10/2008 | Kobayashi et al. | 370/241 |
| 2001/0012757 | A1* | 8/2001 | Boyle | 455/11.1 |
| 2002/0042693 | A1* | 4/2002 | Kampe et al. | 702/186 |
| 2002/0167961 | A1* | 11/2002 | Haartsen | 370/444 |
| 2003/0193891 | A1* | 10/2003 | Chen et al. | 370/217 |
| 2005/0005003 | A1 | 1/2005 | Maekawa | |
| 2005/0086273 | A1 | 4/2005 | Loebbert et al. | |
| 2005/0249113 | A1* | 11/2005 | Kobayashi et al. | 370/219 |
| 2005/0262216 | A1* | 11/2005 | Kashiwabara et al. | 709/208 |
| 2006/0221856 | A1* | 10/2006 | Quiroz | 370/254 |

FOREIGN PATENT DOCUMENTS

| | | |
|---|---|---|
| JP | 11-161441 A | 6/1999 |
| JP | 11-249839 A | 9/1999 |
| JP | 2001-43105 A | 2/2001 |
| JP | 2002-259189 A | 9/2002 |
| JP | 2004-062253 A | 2/2004 |
| JP | 2004-129042 A | 4/2004 |
| JP | 2004-171093 A | 6/2004 |
| JP | 2005-44155 A | 2/2005 |

OTHER PUBLICATIONS

JP Office Action dtd Sep. 2, 2008, JP Appln. 2005-049457.

* cited by examiner

*Primary Examiner*—Oanh Duong
(74) *Attorney, Agent, or Firm*—Banner & Witcoff, Ltd.

(57) ABSTRACT

A network system includes devices connected to a network each of which is assigned an ordinal rank in the system, in which a device of the highest ordinal rank functions as a master device and devices of the other ordinal ranks function as general devices. In the network system, each device includes: a master device checking unit configured to operate when the device is functioning as a general device to check that a device functioning as the master device exists in the system; an ordinal rank judging unit configured to judge the ordinal rank of the device when no device functioning as the master device exists; and a first control unit configured to control the device to function as the master device when the ordinal rank of the device is judged to be the highest by the ordinal rank judging unit.

32 Claims, 29 Drawing Sheets

| ID | Name | Tel | Fax | Mail Address |
|---|---|---|---|---|
| 1 | Koji | 0001234567 | 0001234599 | koji@example.com |
| 2 | Noga | 0001234545 | 0001234599 | noga@example.com |
| 3 | Tom | 0123456789 | 0123234599 | tom@example.com |

FIG. 2

| ID | PRIORITY | IP ADDRESS | MASTER APTITUDE VALUE |
|---|---|---|---|
| 1 | 2nd | 192.0.0.5 | 128 |
| 2 | 3rd | 192.0.0.7 | 64 |
| 3 | 4th | 192.0.0.3 | 32 |

NETWORK SYSTEM AND DEVICE

CROSS-REFERENCE TO RELATED APPLICATION

This application claims priority under 35 U.S.C. §119 from Japanese Patent Application No. 2005-049457, filed on Feb. 24, 2005. The entire subject matter of the application is incorporated herein by reference.

FIELD

Aspects relate to a network system, a device forming the network system, and a program for implementing the functions of the device.

BACKGROUND

In a technique proposed in Japanese Patent Provisional Publication No. HEI11-249839 for a network system including devices (network printers, etc.) connected to a network, the user of the system connecting a new device to the network specifies a device that has already joined the network and the specified device transmits prescribed information to the new device, by which the device newly connected to the network acquires the prescribed information.

In the above conventional technique, the user has to specify the device as the sender of the prescribed information each time a new device is connected to the network, and that is troublesome to the user.

Meanwhile, it is possible to realize such transfer of prescribed information by previously specifying a device as a master device and letting the master device transmit the prescribed information to the new device each time a new device is connected to the network. By employing such a scheme, the prescribed information is expected to be transmitted from the master device to the new device on every connection of a new device to the network, without the need of specifying a device as the sender of the prescribed information every time.

However, in the above scheme previously specifying a device as the master device, there is a possibility that a new device is connected to the network while the master device is not in operation. In such cases, the prescribed information can not be supplied to the new device since the device as the sender (source) of information does not exist on the network when the new device is connected.

It is also possible to employ another scheme in which a new master device is dynamically selected from devices on the network when the original master device is not in operation. By employing such a scheme, the state with no information source device existing on the network can be eliminated.

However, a network system generally includes various types of devices from a device highly suitable as the master device to a device unsuitable as the master device, and thus there are cases where a device unsuitable as the master device is selected as the new master device. In such cases, the high performance of the devices highly suitable as the master device can not be utilized efficiently.

Incidentally, while the system in which the master device functions as the sender (source) of information and another device functions as the receiver (destination) of the information has been taken as an example in the above explanation, the scheme selecting one master device from devices existing on a network can be employed for various systems other than the above system. For example, in a system in which a master device collects information from other devices, the master device functions as the receiver of the information and the other devices function as the senders of information. Further, there are various other cases (other than such information transmission between a master device and other devices) where a master device has to be selected from devices.

SUMMARY

Aspects of the invention provide a network system, in which a master device can be dynamically selected from devices existing on the network while realizing the selection of a device having the highest aptitude as the master device at the point of the selection.

BRIEF DESCRIPTION OF THE ACCOMPANYING DRAWINGS

FIG. 2 is a table showing an example of address book data according to at least one aspect of the invention.

DETAILED DESCRIPTION

General Overview

Figure 1:
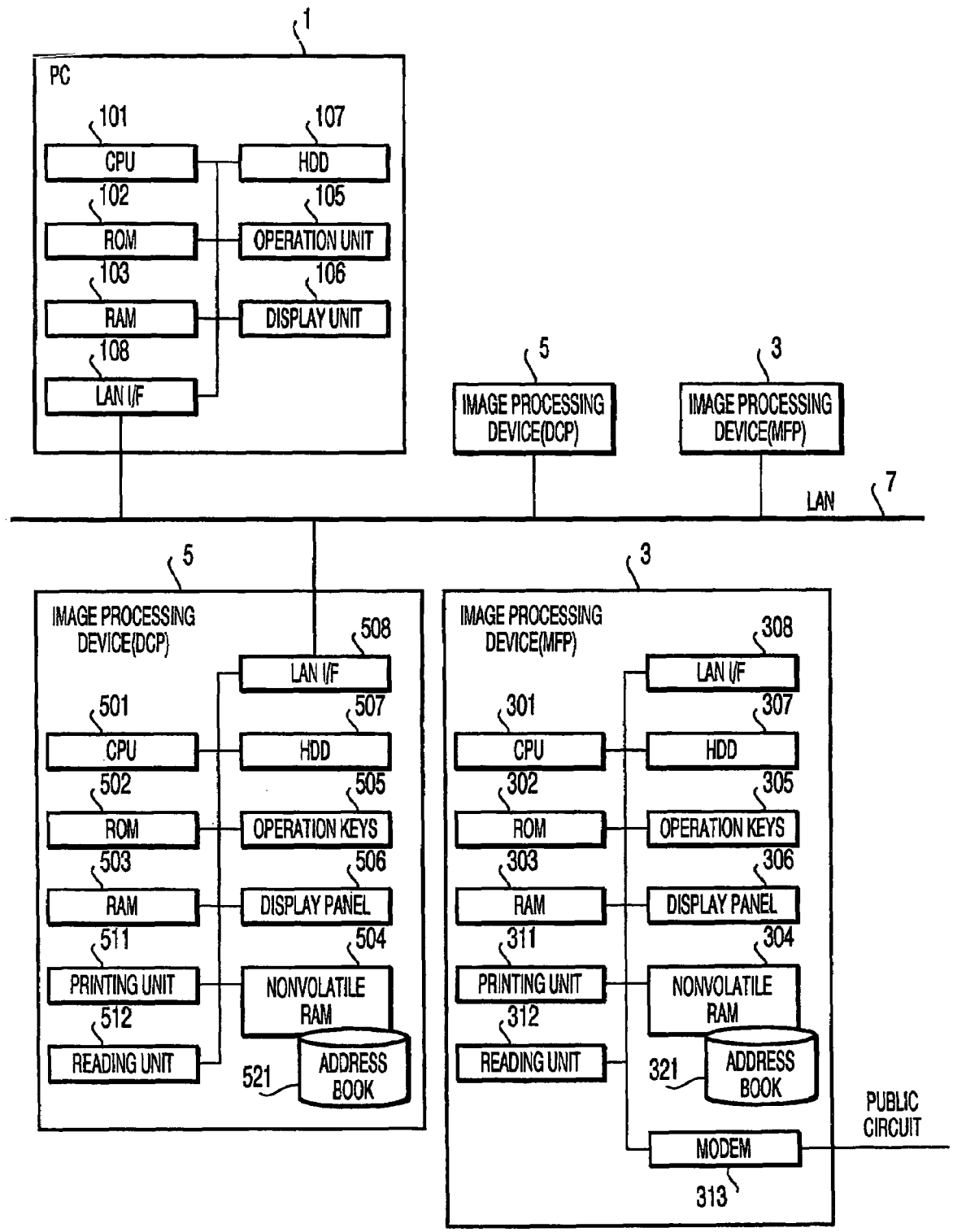
FIG. 1 is a block diagram showing the overall composition of a network system and the internal composition of each device of the network system according to at least one aspect of the invention.

A network system, including devices connected to a network each of which is assigned an ordinal rank in the system in which a device of the highest ordinal rank functions as a master device and devices of the other ordinal ranks function as general devices, is provided. In the network system, each of the devices includes: a master device checking unit configured to operate when the device is functioning as a general device to check that a device functioning as the master device exists in the system; an ordinal rank judging unit configured to judge the ordinal rank of the device when no device functioning as the master device exists in the system; and a first control unit configured to control the device to function as the master device when the ordinal rank of the device is judged to be the highest in the system by the ordinal rank judging unit.

In the network system configured as above, when a device functions as a general device, the master device checking unit checks whether a device functioning as the master device (hereinafter simply referred to as "the master device") exists in the system. When no master device exists in the system; the ordinal rank judging unit of the device functioning as a general device (hereinafter simply referred to as a "general device") judges the ordinal rank of the device. When the ordinal rank of the device is judged to be the highest in the system by the ordinal rank judging unit, the first control unit controls the device to function as the master device. Consequently, one of the general devices existing in the system whose ordinal rank has become the highest due to the absence of the master device starts functioning as the master device.

Therefore, with the above network system, a master device can be dynamically selected from devices existing on the network and the absence of the master device in the system can be avoided. Since a device rising to the highest ordinal rank due to the absence of a current master device becomes the new master device, a device having the highest aptitude as the master device can be selected as the master device by previously assigning the ordinal ranks to the devices according to the aptitude.

The devices connected to the network may include various types of devices, such as printing devices (printers, FAX machines, MFPs (Multi Function Peripherals) having the printer function and FAX function, etc.), image input devices (scanners, network cameras, etc.), image communication devices (FAX machines, etc.), communication path devices (network routers, network points, etc.) and information server devices (network storage devices, etc.).

Functions of the master device may include various functions such as supplying information to other devices, collecting information from other devices and controlling the operation of other devices.

Configurations desirable to the above network system will be described below.

In at least one aspect, each of the devices further includes a master device communication information storing unit configured to store master device communication information for communicating with the device functioning as the master device. The master device checking unit checks whether the device functioning as the master device exists in the system by communicating with the device functioning as the master device according to the master device communication information stored in the master device communication information storing unit.

In the network system configured as above, the master device checking unit can check whether the master device exists by executing communication specifying the master device according to the master device communication information for communicating with the master device (a node name, network address, etc. of the master device for realizing communication with the master device on the network). Therefore, the communication load on each general device can be reduced compared to cases where each general device communicates with all the devices on the network for the check.

In the above network system, each of the devices may further include a master device communication information supplying unit configured to operate when the device is functioning as the master device to supply the master device communication information to devices functioning as general devices.

In the network system configured as above, each general device can receive the master device communication information supplied from the master device. Therefore, each general device is allowed to obtain the master device communication information more easily and reliably compared to cases where each general device searches for the master device for itself.

However, it is of course possible to let each general device search for the master device for itself. For example, each general device may broadcast or multicast a request to devices on the network, receive replies from the devices, and extract the master device communication information (e.g. the network address of the master device) from the received replies.

It is also possible to let each general device check the existence of the master device by means of the broadcast or multicast. Specifically, each general device may broadcast or multicast a request to devices on the network, receive replies from the devices, and check whether the master device exists based on the received replies. In this case, the master device communication information (e.g. the network address of the master device) is unnecessary for the check on the existence of the master device. For example, the check can be made based on a flag contained only in information (reply) returned from the master device.

In at least one aspect, each of the devices further includes a higher-level device checking unit configured to operate when the device is functioning as a general device to check that a higher-level device of an immediately higher ordinal rank than the device itself exists in the system. The master device checking unit checks whether the device functioning as the master device exists in the system when the higher-level device can not be found to exist in the system by the higher-level device checking unit.

In the network system configured as above, each general device checks whether the master device exists only when the higher-level device does not exist in the system, by which the load on the master device can be reduced compared to cases where all the general devices constantly check the existence of the master device.

The general device may check the existence of the higher-level device of the immediately higher ordinal rank in various ways.

For example, the general device may broadcast or multicast a request to devices on the network, receive replies from the devices, obtain the ordinal ranks of the devices from the received replies, extract an immediately higher ordinal rank (i.e. an ordinal rank that is the lowest in ordinal ranks higher than its own ordinal rank) from the obtained ordinal ranks, and store information (e.g. network address) for communicating with the device of the extracted immediately higher ordinal rank. In this case, the general device repeats the above process at certain intervals and judges whether the information for communicating with the device of the immediately higher ordinal rank has changed from the information at the previous execution of the process. If the information has not changed from the previous information, it means that the higher-level device of the immediately higher ordinal rank exists in the system. If the information has changed, it means that the higher-level device of the immediately higher ordinal rank does not exist.

However, in the above method in which each general device executes the broadcast or multicast at certain intervals, the load on the network tends to be very heavy. The load on the network can be reduced by the following configuration.

In the above network system, each of the devices may further include a higher-level device communication information storing unit configured to store higher-level device communication information for communicating with the higher-level device, and the higher-level device checking unit may check whether the higher-level device exists in the system by communicating with the higher-level device according to the higher-level device communication information stored in the higher-level device communication information storing unit.

In the network system configured as above, each general device can check whether the higher-level device of the immediately higher ordinal rank exists by executing communication specifying the higher-level device according to the higher-level device communication information. Therefore, the communication load on each general device and the master device can be reduced compared to cases where each general device communicates with all the devices on the network for the check.

In the above network system, each of the devices may further include a higher-level device communication information supplying unit configured to operate when the device is functioning as the master device to supply the higher-level device communication information to devices functioning as general devices.

In the network system configured as above, each general device can receive the higher-level device communication information supplied from the master device. Therefore, each general device can obtain the higher-level device communication information more easily and reliably compared to cases where each general device searches for the higher-level device for itself.

However, it is of course possible to let each general device broadcast or multicast a request to devices on the network, receive replies from the devices, and check whether the higher-level device of the immediately higher ordinal rank exists based on the received replies.

When the system is configured so that data to be shared by the devices can be supplied from the master device to the general devices, each of the devices may further include a shared data generating unit which generates the shared data when the device is shifted from a state for functioning as a general device to a state for functioning as the master device by the first control unit.

In the network system configured as above, even when the master device for supplying the shared data stops its operation, a device newly judging that its own ordinal rank is the highest in the system regenerates the shared data when the device starts functioning as the master device, by which a state with no shared data can be avoided.

In the above network system, each of the devices may further include a shared data storing unit configured to operate when the device is functioning as a general device to store the shared data supplied from the device functioning as the master device, and the shared data generating unit may generate the shared data based on the shared data stored in the shared data storing unit.

In the network system configured as above, the shared data generating unit regenerates the shared data based on the shared data stored in the shared data storing unit (shared data previously supplied from the former master device), by which the contents of the previously available shared data can be transferred to the regenerated shared data with high probability.

In at least one aspect, each of the devices further includes: an ordinal rank determining unit configured to operate when the device is functioning as the master device to determine the ordinal rank of each device in the system based on characteristic information representing characteristics of each device in the system; a master replacement reporting unit configured to operate when the device is functioning as the master device to report to a higher-level device of an ordinal rank higher than the device that the higher-level device should function as the master device when the devices ranked by the ordinal rank determining unit include such a higher-level device; and a second control unit configured to control the device to function as the master device when the report indicating that the device itself should function as the master device is received from a current master device while the device is functioning as a general device.

In the network system configured as above, the ordinal rank determining unit of the master device determines the ordinal rank of each device in the system based on the characteristic information representing characteristics of each device in the system. When the devices ranked by the ordinal rank determining unit include a higher-level device of an ordinal rank higher than the master device, the master replacement reporting unit of the master device reports to the higher-level device that the higher-level device should function as the master device. In each general device, when the report indicating that the device itself should function as the new master device is received from a current master device, the second control unit controls the device to function as the new master device.

Therefore, a device of the highest ordinal rank (determined based on the characteristics of each device under the management of the master device) recognizes its own ordinal rank and starts operating as the new master device. Therefore, it is possible to constantly let a device of the highest ordinal rank function as the master device.

In the above network system, the ordinal rank determining unit may repeat the determination of the ordinal ranks at prescribed time periods by acquiring the characteristic information from the devices in the system.

In the network system configured as above, even if the master device is incapable of immediately recognizing a change in the number of devices on the network, the ordinal rank determining unit of the master device determines the ordinal ranks of the devices in the system by acquiring the characteristic information from the devices each time a prescribed time period elapses, by which the ordinal ranks can be reassigned properly incorporating the change in the number of devices.

In at least one aspect, each of the devices further includes: a characteristic information acquiring unit configured to operate when the device is functioning as the master device to acquire the characteristic information from the devices in the system; and a characteristic information supplying unit configured to operate when the device is functioning as a general device to supply the characteristic information to the master device.

In the network system configured as above, the characteristic information is transferred from each general device to the master device, by which the master device is allowed to obtain the characteristic information on the general devices more easily and reliably compared to cases where the master device investigates the characteristics of the general devices for itself. Further, the user is relieved of the task of inputting the characteristic information on each device to the master device.

In the above network system, the characteristic information supplying unit may supply the characteristic information to the master device when the device joins the network and functions as a general device, and the ordinal rank determining unit may determine the ordinal rank of each device in the system when the characteristic information is acquired from the devices in the system by the characteristic information acquiring unit while the device is functioning as the master device, based on the acquired characteristic information.

In the network system configured as above, when a new device joins the network, the characteristic information on the device is immediately supplied to the master device and the ordinal ranks of the devices in the system are determined again by the master device based on the characteristic information on the devices. Therefore, a proper ordinal rank can be assigned to the new device, and depending on the situation, the master device can be replaced with a proper device.

When the system is configured so that data to be shared by the devices can be supplied from the master device to the general devices, each of the devices may further include a shared data transferring unit configured to transfer the shared data to a higher-level device of an ordinal rank higher than the device when the devices ranked by the ordinal rank determining unit include such a higher-level device.

In the network system configured as above, when there is a change of the master device, the shared data is transferred from the former (current) master device to the new master device, by which the new master device is allowed to supply exactly the same shared data as that of the former master device to the general devices with reliability.

In at least one aspect, each of the devices may further include: an ordinal rank determining unit configured to operate when the device is functioning as the master device to determine the ordinal rank of each device in the system based on characteristic information representing characteristics of each device in the system; an ordinal rank reporting unit configured to report the ordinal rank to each device when the ordinal rank is determined by the ordinal rank determining unit; and a third control unit configured to control the device to function as a general device when the report indicating the ordinal rank is received from a different device while the device is functioning as the master device.

In the network system configured as above, the ordinal rank determining unit of the master device determines the ordinal rank of each device in the system based on the characteristic information representing characteristics of each device in the system, and the ordinal rank reporting unit of the master device reports the determined ordinal rank to each device. Incidentally, the master device does not generally receive the report indicating the ordinal rank since there is only one device functioning as the master device in the system in its normal state. However, there exist exceptional cases where two or more devices judge themselves to be the device of the highest ordinal rank (master device) for some reason (time difference between judgments, an information communication error, etc.), and in such cases, a device functioning as the master device can receive the report on the ordinal rank from another device. However, in this case, the third control unit controls the device to function as a general device (the device erroneously became the master device recognizes that it is not the device of the highest ordinal rank), by which the state with two or more master devices existing in the system can be eliminated.

In the above network system, the ordinal rank determining unit may repeat the determination of the ordinal ranks at prescribed time periods by acquiring the characteristic information from the devices in the system.

In the network system configured as above, even if the master device is incapable of immediately recognizing a change in the number of devices on the network, the ordinal rank determining unit of the master device determines the ordinal ranks of the devices in the system by acquiring the characteristic information from the devices each time a prescribed time period elapses, by which the ordinal ranks can be reassigned properly incorporating the change in the number of devices.

In at least one aspect, each of the devices further includes: a characteristic information acquiring unit configured to operate when the device is functioning as the master device to acquire the characteristic information from the devices in the system; and a characteristic information supplying unit configured to operate when the device is functioning as a general device to supply the characteristic information to the master device.

In the network system configured as above, the characteristic information is transferred from each general device to the master device, by which the master device is allowed to obtain the characteristic information on the general devices more easily and reliably compared to cases where the master device investigates the characteristics of the general devices for itself. Further, the user is relieved of the task of inputting the characteristic information on each device to the master device.

In the above network system, the characteristic information supplying unit may supply the characteristic information to the master device when the device joins the network and functions as a general device, and the ordinal rank determining unit may determine the ordinal rank of each device in the system when the characteristic information is acquired from the devices in the system by the characteristic information acquiring unit while the device is functioning as the master device, based on the acquired characteristic information.

In the network system configured as above, when a new device joins the network, the characteristic information on the device is immediately supplied to the master device and the ordinal ranks of the devices in the system are determined again by the master device based on the characteristic information on the devices. Therefore, a proper ordinal rank can be assigned to the new device, and depending on the situation, the master device can be replaced with a proper device.

When the system is configured so that data to be shared by the devices can be supplied from the master device to the general devices, each of the devices may further include a shared data transferring unit configured to transfer the shared data to a higher-level device of an ordinal rank higher than the device when the devices ranked by the ordinal rank determining unit include such a higher-level device.

In the network system configured as above, when there is a change of the master device, the shared data is transferred from the former (current) master device to the new master device, by which the new master device is allowed to supply exactly the same shared data as that of the former master device to the general devices with reliability.

In the above network systems, the characteristic information may include storage capacity of each device.

Specifically, when each device is equipped with a hard disk or nonvolatile memory, the storage capacity of the hard disk or nonvolatile memory may be incorporated into the characteristic information.

In the network system configured as above, ordinal ranks incorporating the storage capacity of each device are assigned to the devices. In this case, a device having a larger storage capacity is assigned a higher ordinal rank when other conditions are the same and such a device is more likely to become the master device. Such characteristic information is suitable when the master device has a function of storing a variety of information and supplying the information to other devices.

The characteristic information may also include processing power of each device.

Specifically, the performance of the CPU, the storage capacity or bit rate of the RAM, the communication speed with the network, etc. may be incorporated into the characteristic information. In cases where a newer device tends to have higher performance, the shipping date of each device may be incorporated into the characteristic information.

In the network system configured as above, ordinal ranks incorporating the processing power of each device are assigned to the devices. In this case, a device having higher processing power is assigned a higher ordinal rank when other conditions are the same and such a device is more likely to become the master device. Such characteristic information is suitable when the master device has to quickly supply a variety of information to other devices, when the master device has to perform various calculations, when the master device has to receive and output a lot of data, etc.

The characteristic information may also include continuous operability of each device.

The "continuous operability" means how long each device is expected to operate continuously, that is, how low the probability of shutdown (power off) is. For example, a device having no main power switch is regarded to have higher continuous operability than a device having a main power switch. Further, a device having the FAX function or telephone function is regarded to have higher continuous operability than a device having no FAX function or telephone function, since the former device generally operates continuously to wait for a call while the latter device (e.g. single-function printer) tends to be turned off when it is unnecessary.

In the network system configured as above, ordinal ranks incorporating the continuous operability of each device are assigned to the devices. In this case, a device having higher continuous operability is assigned a higher ordinal rank when other conditions are the same and such a device is more likely to become the master device. Such characteristic information is suitable for preventing frequent change of the master device caused by frequent shutdown of the master device, by which the processing/communication load on each device caused by the change of the master device can be reduced.

When the system is configured so that data to be shared by the devices can be supplied from the master device to the general devices, each of the devices may be a communication device having a function of transmitting data to a destination specified by address data, and the shared data may be address book data including the address data.

In the network system configured as above, each device is allowed to transmit data to a destination specified by address data based on the address book data supplied from the master device as the shared data, by which all the devices become equally capable of communicating with the same address contained in the address book data.

In accordance with another aspect, there is provided a network system including devices connected to a network each of which is assigned an ordinal rank in the system in which a device of the highest ordinal rank functions as a master device and devices of the other ordinal ranks function as general devices. In the network system, each of the devices includes: an ordinal rank determining unit configured to operate when the device is functioning as the master device to determine the ordinal rank of each device in the system based on characteristic information representing characteristics of each device in the system; a master replacement reporting unit configured to operate when the device is functioning as the master device to report to a higher-level device of an ordinal rank higher than the device that the higher-level device should function as the master device when the devices ranked by the ordinal rank determining unit include such a higher-level device; and a second control unit configured to control the device to function as the master device when the report indicating that the device itself should function as the master device is received from a current master device while the device is functioning as a general device.

In the network system configured as above, the ordinal rank determining unit of the master device determines the ordinal rank of each device in the system based on the characteristic information representing characteristics of each device in the system. When the devices ranked by the ordinal rank determining unit include a higher-level device of an ordinal rank higher than the master device, the master replacement reporting unit of the master device reports to the higher-level device that the higher-level device should function as the master device. In each general device, when the report indicating that the device itself should function as the new master device is received from a current master device, the second control unit controls the device to function as the new master device.

Therefore, with the above network system, a master device can be dynamically selected from devices existing on the network and the absence of the master device in the system can be avoided. Further, since a device of the highest ordinal rank (determined based on the characteristics of each device under the management of the master device) recognizes its own ordinal rank and starts operating as the new master device, a device having the highest aptitude as the master device can be selected as the master device by previously assigning the ordinal ranks to the devices according to the aptitude.

Configurations desirable to the above network system will be described below.

The ordinal rank determining unit may repeat the determination of the ordinal ranks at prescribed time periods by acquiring the characteristic information from the devices in the system.

In the network system configured as above, even if the master device is incapable of immediately recognizing a change in the number of devices on the network, the ordinal rank determining unit of the master device determines the ordinal ranks of the devices in the system by acquiring the characteristic information from the devices each time a prescribed time period elapses, by which the ordinal ranks can be reassigned properly incorporating the change in the number of devices.

In at least one aspect, each of the devices further includes: a characteristic information acquiring unit configured to operate when the device is functioning as the master device to acquire the characteristic information from the devices in the system; and a characteristic information supplying unit configured to operate when the device is functioning as a general device to supply the characteristic information to the master device.

In the network system configured as above, the characteristic information is transferred from each general device to the master device, by which the master device is allowed to obtain the characteristic information on the general devices more easily and reliably compared to cases where the master device investigates the characteristics of the general devices for itself. Further, the user is relieved of the task of inputting the characteristic information on each device to the master device.

In the above network system, the characteristic information supplying unit may supply the characteristic information to the master device when the device joins the network and functions as a general device, and the ordinal rank determining unit may determine the ordinal rank of each device in the system when the characteristic information is acquired from the devices in the system by the characteristic information acquiring unit while the device is functioning as the master device, based on the acquired characteristic information.

In the network system configured as above, when a new device joins the network, the characteristic information on the device is immediately supplied to the master device and the ordinal ranks of the devices in the system are determined again by the master device based on the characteristic information on the devices. Therefore, a proper ordinal rank can be assigned to the new device, and depending on the situation, the master device can be replaced with a proper device.

When the system is configured so that data to be shared by the devices can be supplied from the master device to the general devices, each of the devices may further include a shared data transferring unit configured to transfer the shared data to a higher-level device of an ordinal rank higher than the device when the devices ranked by the ordinal rank determining unit include such a higher-level device.

In the network system configured as above, when there is a change of the master device, the shared data is transferred from the former (current) master device to the new master device, by which the new master device is allowed to supply exactly the same shared data as that of the former master device to the general devices with reliability.

When the system is configured so that data to be shared by the devices can be supplied from the master device to the general devices, each of the devices may further include a shared data acquiring unit configured to operate when the device is shifted from a state for functioning as a general device to a state for functioning as the master device to acquire the shared data from a device functioning as the master device until the shift.

In the network system configured as above, when there is a change of the master device, the new master device acquires the shared data from the former (current) master device, by which the new master device can supply exactly the same shared data as that of the former master device to the general devices with reliability.

Each of the devices in the network system may also be provided with a shared data acquiring unit of a different type as follows:

When the system is configured so that data to be shared by the devices can be supplied from the master device to the general devices, each of the devices may further include a shared data acquiring unit configured to operate when the device is shifted from a state for functioning as a general device to a state for functioning as the master device to acquire the shared data from a device functioning as a general device.

In the network system configured as above, when there is a change of the master device, the new master device acquires the shared data from a device functioning as a general device, by which the new master device can supply the shared data acquired from the general device to the general devices even when the former master device stops its operation.

Also in the above network systems, the characteristic information may include storage capacity of each device.

Specifically, when each device is equipped with a hard disk or nonvolatile memory, the storage capacity of the hard disk or nonvolatile memory may be incorporated into the characteristic information.

In the network system configured as above, ordinal ranks incorporating the storage capacity of each device are assigned to the devices. In this case, a device having a larger storage capacity is assigned a higher ordinal rank when other conditions are the same and such a device is more likely to become the master device. Such characteristic information is suitable when the master device has a function of storing a variety of information and supplying the information to other devices.

The characteristic information may also include processing power of each device.

Specifically, the performance of the CPU, the storage capacity or bit rate of the RAM, the communication speed with the network, etc. may be incorporated into the characteristic information. In cases where a newer device tends to have higher performance, the shipping date of each device may be incorporated into the characteristic information.

In the network system configured as above, ordinal ranks incorporating the processing power of each device are assigned to the devices. In this case, a device having higher processing power is assigned a higher ordinal rank when other conditions are the same and such a device is more likely to become the master device. Such characteristic information is suitable when the master device has to quickly supply a variety of information to other devices, when the master device has to perform various calculations, when the master device has to receive and output a lot of data, etc.

The characteristic information may also include continuous operability of each device.

The "continuous operability" means how long each device is expected to operate continuously, that is, how low the probability of shutdown (power off) is. For example, a device having no main power switch is regarded to have higher continuous operability than a device having a main power switch. Further, a device having the FAX function or telephone function is regarded to have higher continuous operability than a device having no FAX function or telephone function, since the former device generally operates continuously to wait for a call while the latter device (e.g. single-function printer) tends to be turned off when it is unnecessary.

In the network system configured as above, ordinal ranks incorporating the continuous operability of each device are assigned to the devices. In this case, a device having higher continuous operability is assigned a higher ordinal rank when other conditions are the same and such a device is more likely to become the master device. Such characteristic information is suitable for preventing frequent change of the master device caused by frequent shutdown of the master device, by which the processing/communication load on each device caused by the change of the master device can be reduced.

When the system is configured so that data to be shared by the devices can be supplied from the master device to the general devices, each of the devices may be a communication device having a function of transmitting data to a destination specified by address data, and the shared data may be address book data including the address data.

In the network system configured as above, each device is allowed to transmit data to a destination specified by address data based on the address book data supplied from the master device as the shared data, by which all the devices become equally capable of communicating with the same address contained in the address book data.

In accordance with another aspect, there is provided a network system including devices connected to a network each of which is assigned an ordinal rank in the system in which a device of the highest ordinal rank functions as a master device and devices of the other ordinal ranks function as general devices. In the network system, each of the devices includes: an ordinal rank determining unit configured to operate when the device is functioning as the master device to determine the ordinal rank of each device in the system based on characteristic information representing characteristics of each device in the system; an ordinal rank reporting unit configured to report the ordinal rank to each device when the ordinal rank is determined by the ordinal rank determining unit; and a third control unit configured to control the device to function as a general device when the report indicating the ordinal rank is received from a different device while the device is functioning as the master device.

In the network system configured as above, the ordinal rank determining unit of the master device determines the ordinal rank of each device in the system based on the characteristic information representing characteristics of each device in the system, and the ordinal rank reporting unit of the master device reports the determined ordinal rank to each device. Incidentally, the master device does not generally receive the report indicating the ordinal rank since there is only one device functioning as the master device in the system in its normal state. However, there exist exceptional cases where two or more devices judge themselves to be the device of the highest ordinal rank (master device) for some reason (time difference between judgments, an information communication error, etc.), and in such cases, a device functioning as the master device can receive the report on the ordinal rank from another device. However, in this case, the third control unit controls the device to function as a general device (the device erroneously became the master device recognizes that it is not the device of the highest ordinal rank), by which the state with two or more master devices existing in the system can be eliminated.

Therefore, with the above network system, a master device can be dynamically selected from devices existing on the network and the absence of the master device in the system can be avoided. Further, even when the system erroneously shifts into a state with two devices functioning as the master device, one of the devices stops functioning as the master device upon reception of the report indicating the ordinal rank, by which the state with two master devices can also be avoided.

Configurations desirable to the above network system will be described below.

In the above network system, the ordinal rank determining unit may repeat the determination of the ordinal ranks at prescribed time periods by acquiring the characteristic information from the devices in the system.

In the network system configured as above, even if the master device is incapable of immediately recognizing a change in the number of devices on the network, the ordinal rank determining unit of the master device determines the ordinal ranks of the devices in the system by acquiring the characteristic information from the devices each time a prescribed time period elapses, by which the ordinal ranks can be reassigned properly incorporating the change in the number of devices.

In at least one aspect, each of the devices further includes: a characteristic information acquiring unit configured to operate when the device is functioning as the master device to acquire the characteristic information from the devices in the system; and a characteristic information supplying unit configured to operate when the device is functioning as a general device to supply the characteristic information to the master device.

In the network system configured as above, the characteristic information is transferred from each general device to the master device, by which the master device is allowed to obtain the characteristic information on the general devices more easily and reliably compared to cases where the master device investigates the characteristics of the general devices for itself. Further, the user is relieved of the task of inputting the characteristic information on each device to the master device.

In the above network system, the characteristic information supplying unit may supply the characteristic information to the master device when the device joins the network and functions as a general device, and the ordinal rank determining unit may determine the ordinal rank of each device in the system when the characteristic information is acquired from the devices in the system by the characteristic information acquiring unit while the device is functioning as the master device, based on the acquired characteristic information.

In the network system configured as above, when a new device joins the network, the characteristic information on the device is immediately supplied to the master device and the ordinal ranks of the devices in the system are determined again by the master device based on the characteristic information on the devices. Therefore, a proper ordinal rank can be assigned to the new device, and depending on the situation, the master device can be replaced with a proper device.

When the system is configured so that data to be shared by the devices can be supplied from the master device to the general devices, each of the devices may further include a shared data transferring unit configured to transfer the shared data to a higher-level device of an ordinal rank higher than the device when the devices ranked by the ordinal rank determining unit include such a higher-level device.

In the network system configured as above, when there is a change of the master device, the shared data is transferred from the former (current) master device to the new master device, by which the new master device is allowed to supply exactly the same shared data as that of the former master device to the general devices with reliability.

When the system is configured so that data to be shared by the devices can be supplied from the master device to the general devices, each of the devices may further include a shared data acquiring unit configured to operate when the device is shifted from a state for functioning as a general device to a state for functioning as the master device to acquire the shared data from a device functioning as the master device until the shift.

In the network system configured as above, when there is a change of the master device, the new master device acquires the shared data from the former (current) master device, by which the new master device can supply exactly the same shared data as that of the former master device to the general devices with reliability.

Each of the devices in the network system may also be provided with a shared data acquiring unit of a different type as follows:

When the system is configured so that data to be shared by the devices can be supplied from the master device to the general devices, each of the devices may further include a shared data acquiring unit configured to operate when the device is shifted from a state for functioning as a general device to a state for functioning as the master device to acquire the shared data from a device functioning as a general device.

In the network system configured as above, when there is a change of the master device, the new master device acquires the shared data from a device functioning as a general device, by which the new master device can supply the shared data acquired from the general device to the general devices even when the former master device stops its operation.

Also in the above network systems, the characteristic information may include storage capacity of each device.

Specifically, when each device is equipped with a hard disk or nonvolatile memory, the storage capacity of the hard disk or nonvolatile memory may be incorporated into the characteristic information.

In the network system configured as above, ordinal ranks incorporating the storage capacity of each device are assigned to the devices. In this case, a device having a larger storage capacity is assigned a higher ordinal rank when other conditions are the same and such a device is more likely to become the master device. Such characteristic information is suitable when the master device has a function of storing a variety of information and supplying the information to other devices.

The characteristic information may also include processing power of each device.

Specifically, the performance of the CPU, the storage capacity or bit rate of the RAM, the communication speed with the network, etc. may be incorporated into the characteristic information. In cases where a newer device tends to have higher performance, the shipping date of each device may be incorporated into the characteristic information.

In the network system configured as above, ordinal ranks incorporating the processing power of each device are assigned to the devices. In this case, a device having higher processing power is assigned a higher ordinal rank when other conditions are the same and such a device is more likely to become the master device. Such characteristic information is suitable when the master device has to quickly supply a variety of information to other devices, when the master device has to perform various calculations, when the master device has to receive and output a lot of data, etc.

The characteristic information may also include continuous operability of each device.

The "continuous operability" means how long each device is expected to operate continuously, that is, how low the probability of shutdown (power off) is. For example, a device having no main power switch is regarded to have higher continuous operability than a device having a main power switch. Further, a device having the FAX function or telephone function is regarded to have higher continuous operability than a device having no FAX function or telephone function, since the former device generally operates continuously to wait for a call while the latter device (e.g. single-function printer) tends to be turned off when it is unnecessary.

In the network system configured as above, ordinal ranks incorporating the continuous operability of each device are assigned to the devices. In this case, a device having higher continuous operability is assigned a higher ordinal rank when other conditions are the same and such a device is more likely to become the master device. Such characteristic information is suitable for preventing frequent change of the master device caused by frequent shutdown of the master device, by which the processing/communication load on each device caused by the change of the master device can be reduced.

When the system is configured so that data to be shared by the devices can be supplied from the master device to the general devices, each of the devices may be a communication device having a function of transmitting data to a destination specified by address data, and the shared data may be address book data including the address data.

In the network system configured as above, each device is allowed to transmit data to a destination specified by address data based on the address book data supplied from the master device as the shared data, by which all the devices become equally capable of communicating with the same address contained in the address book data.

In accordance with another aspect, there is provided a device which is used as a node forming a network system including devices connected to a network each of which is assigned an ordinal rank in the system in which a device of the highest ordinal rank functions as a master device and devices of the other ordinal ranks function as general devices. The device comprises: a master device checking unit configured to operate when the device is functioning as a general device to check that a device functioning as the master device exists in the system; an ordinal rank judging unit configured to judge the ordinal rank of the device when no device functioning as the master device exists in the system; and a first control unit configured to control the device to function as the master device when the ordinal rank of the device is judged to be the highest in the system by the ordinal rank judging unit.

The device configured as above is equipped with the same units as the device in a network system which has been described before, and thus such a network system can be formed and the same effects can be achieved by use of the device.

The device is a system element equivalent to the device in the aforementioned network system as mentioned above, and thus the device may of course be further provided with the aforementioned configurations desirable to the device in the aforementioned network system.

In accordance with another aspect, there is provided a device which is used as a node forming a network system including devices connected to a network each of which is assigned an ordinal rank in the system in which a device of the highest ordinal rank functions as a master device and devices of the other ordinal ranks function as general devices. The device includes an ordinal rank determining unit configured to operate when the device is functioning as the master device to determine the ordinal rank of each device in the system based on characteristic information representing characteristics of each device in the system; a master replacement reporting unit configured to operate when the device is functioning as the master device to report to a higher-level device of an ordinal rank higher than the device that the higher-level device should function as the master device when the devices ranked by the ordinal rank determining unit include such a higher-level device; and a second control unit configured to control the device to function as the master device when the report indicating that the device itself should function as the master device is received from a current master device while the device is functioning as a general device.

The device configured as above is equipped with the same units as the device in a network system which has been described before, and thus such a network system can be formed and the same effects can be achieved by use of the device.

The device is a system element equivalent to the device in the aforementioned network system as mentioned above, and thus the device may of course be further provided with the aforementioned configurations desirable to the device in the aforementioned network system.

In accordance with another aspect, there is provided a device which is used as a node forming a network system including devices connected to a network each of which is assigned an ordinal rank in the system in which a device of the highest ordinal rank functions as a master device and devices of the other ordinal ranks function as general devices. The device includes an ordinal rank determining unit configured to operate when the device is functioning as the master device to determine the ordinal rank of each device in the system based on characteristic information representing characteristics of each device in the system; an ordinal rank reporting unit configured to report the ordinal rank to each device when the ordinal rank is determined by the ordinal rank determining unit; and a third control unit configured to control the device to function as a general device when the report indicating the ordinal rank is received from a different device while the device is functioning as the master device.

The device configured as above is equipped with the same units as the device in a network system which has been described before, and thus such a network system can be formed and the same effects can be achieved by use of the device.

The device is a system element equivalent to the device in the aforementioned network system as mentioned above, and thus the device may of course be further provided with the aforementioned configurations desirable to the device in the aforementioned network system.

In accordance with another aspect, there is provided a computer program product including computer-readable instructions that cause a device, as a node forming a network system including devices connected to a network each of which is assigned an ordinal rank in the system in which a device of the highest ordinal rank functions as a master device and devices of the other ordinal ranks function as general devices, to function as: a master device checking unit configured to operate when the device is functioning as a general device to check that a device functioning as the master device exists in the system; an ordinal rank judging unit configured to judge the ordinal rank of the device when no device functioning as the master device exits in the system; and a first control unit configured to control the device to function as the master device when the ordinal rank of the device is judged to be the highest in the system by the ordinal rank judging unit.

By letting the device execute the computer-readable instructions of the computer program product, the device functions in the same way as the device in a network system which has been described before, and thus such a network system can be formed and the same effects can be achieved by use of the device.

The device executing the computer-readable instructions functions as a system element equivalent to the device in the aforementioned network system as mentioned above, and thus the computer-readable instructions may of course further include instructions implementing the aforementioned configurations desirable to the device in the aforementioned network system.

In accordance with another aspect, there is provided a computer program product including computer-readable instructions that cause a device, as a node forming a network system including devices connected to a network each of which is assigned an ordinal rank in the system in which a device of the highest ordinal rank functions as a master device and devices of the other ordinal ranks function as general devices, to function as: an ordinal rank determining unit configured to operate when the device is functioning as the master device to determine the ordinal rank of each device in the system based on characteristic information representing characteristics of each device in the system; a master replacement reporting unit configured to operate when the device is functioning as the master device to report to a higher-level device of an ordinal rank higher than the device that the higher-level device should function as the master device when the devices ranked by the ordinal rank determining unit include such a higher-level device; and a second control unit configured to control the device to function as the master device when the report indicating that the device itself should function as the master device is received from a current master device while the device is functioning as a general device.

By letting the device execute the computer-readable instructions of the computer program product, the device functions in the same way as the device in a network system which has been described before, and thus such a network system can be formed and the same effects can be achieved by use of the device.

The device executing the computer-readable instructions functions as a system element equivalent to the device in the aforementioned network system as mentioned above, and thus the computer-readable instructions may of course further include instructions implementing the aforementioned configurations desirable to the device in the aforementioned network system.

In accordance with another aspect, there is provided a computer program product including computer-readable instructions that cause a device, as a node forming a network system including devices connected to a network each of which is assigned an ordinal rank in the system in which a device of the highest ordinal rank functions as a master device and devices of the other ordinal ranks function as general devices, to function as: an ordinal rank determining unit configured to operate when the device is functioning as the master device to determine the ordinal rank of each device in the system based on characteristic information representing characteristics of each device in the system; an ordinal rank reporting unit configured to report the ordinal rank to each device when the ordinal rank is determined by the ordinal rank determining unit; and a third control unit configured to control the device to function as a general device when the report indicating the ordinal rank is received from a different device while the device is functioning as the master device.

By letting the device execute the computer-readable instructions of the computer program product, the device functions in the same way as the device in a network system which has been described before, and thus such a network system can be formed and the same effects can be achieved by use of the device.

The device executing the computer-readable instructions functions as a system element equivalent to the device in the aforementioned network system as mentioned above, and thus the computer-readable instructions may of course further include instructions implementing the aforementioned configurations desirable to the device in the aforementioned network system.

Illustrative Embodiments

Referring now to the drawings, a description will be given in detail of an illustrative embodiment in accordance with aspects of the present invention.

FIG. 1 is a block diagram showing the overall composition of a network system according to the illustrative embodiment.

The network system includes a PC (Personal Computer) 1 and image processing devices 3, 3, 5 and 5 which are connected together by a LAN (Local Area Network) 7 to communicate data.

The PC 1 includes a CPU (Central Processing Unit) 101, a ROM (Read Only Memory) 102, a RAM (Random Access Memory) 103, an operation unit 105, a display unit 106, an HDD (Hard Disk Drive) 107, a LAN I/F (interface) 108, etc. The CPU 101 is a unit for controlling each part of the PC 1 and performing various calculations according to programs stored in the ROM 102 and the RAM 103. The ROM 102 is a storage unit capable of holding its memory contents even when the power switch of the PC 1 is turned OFF, in which bare essentials of programs and data necessary for the control of the PC 1, such as a BIOS (Basic Input Output System), is stored. The RAM 103 is a storage unit capable of storing an OS (Operating System) and various application programs read out from the HDD 107, in which various data generated during calculations by the CPU 101 are also stored. The operation unit 105 is formed by a keyboard, various pointing devices (e.g. mouse), etc. The display unit 106 is formed by an LCD (Liquid Crystal Display) capable of displaying color images, etc. The HDD 107 is a storage unit storing the OS, the various application programs, and various data files. The LAN I/F 108 is a unit for controlling the communication via the LAN 7. The OS is installed in the PC 1 for controlling the above hardware. Concrete examples of the OS installed in the PC 1 include Windows®, Linux®, Mac OS®, etc. Since various functions provided by these operating systems are widely known, detailed explanation thereof is omitted here. In the following explanation, the PC 1 is assumed to have various functions provided by Windows®.

The image processing device 3 is a multifunctional device called "MFP" (Multi-Function Product), which is provided with a scanner function, a printer function, a copy function, a facsimile function, a telephone function, an e-mail transmission/reception function, etc. The image processing device 3 includes a CPU 301, a ROM 302, a RAM 303, a nonvolatile RAM 304, operation keys 305, a display panel 306, an HDD 307, a LAN I/F 308, a printing unit 311, a reading unit 312, a modem 313, etc. The CPU 301 is a unit for controlling each part of the image processing device 3 and performing various calculations according to programs stored in the ROM 302. The ROM 302 stores programs and data necessary for the control of the image processing device 3. The RAM 303 is a storage unit for mainly storing various data generated during calculations by the CPU 301. Since the access speed of the RAM 303 is higher than those of the nonvolatile RAM 304 and the HDD 307, part of data stored in the nonvolatile RAM 304 and the HDD 307 can be transferred to the RAM 303 and used during the operation of the image processing device 3. The nonvolatile RAM 304 is a storage unit configured to hold its memory contents by use of an embedded battery even when the power switch of the image processing device 3 is turned OFF. In this illustrative embodiment, the nonvolatile RAM 304 stores address book data 321 and backup data (not shown) which will be explained in detail later. The operation keys 305 are input devices operated by the user for giving various instructions to the image processing device 3. The display panel 306 is formed by an LCD. The HDD 307 is a storage unit storing various data. In this illustrative embodiment, the HDD 307 is mainly used for temporarily storing image data read by the reading unit 312. The LAN I/F 308 is a unit for controlling the communication via the LAN 7. The printing unit 311 is a unit for recording (printing) an image represented by image data on a sheet-like medium (e.g. paper). The printing unit 311 operates when an image is printed by the printer function, when a received image is printed by the facsimile function, when a copy image is printed by the copy function, etc. The reading unit 312 is a unit for reading an image from a document set in a not shown ADF (Automatic Document Feeder) or a document placed on contact glass of a flat bed and thereby generating image data representing the image. The reading unit 312 operates when an image is read by the scanner function, when an image to be transmitted is read by the facsimile function, etc. The modem 313 is a unit for voice communication and transmission/reception of facsimile images via a public circuit.

The image processing device 5 is a multifunctional device called "DCP" (Digital Copier Peripheral). The image processing device 5 is provided with the scanner function, the printer function, the copy function, the e-mail transmission/reception function, etc., but is not provided with the facsimile function and the telephone function differently from the image processing device 3. The image processing device 5 includes a CPU 501, a ROM 502, a RAM 503, a nonvolatile RAM 504, operation keys 505, a display panel 506, an HDD 507, a LAN I/F 508, a printing unit 511, a reading unit 512, etc. The above components are substantially identical with those of the image processing device 3, and thus detailed explanation thereof is omitted here. The image processing device 5 does not include a component corresponding to the modem 313 of the image processing device 3 since the image processing device 5 is not provided with the facsimile function or the telephone function.

Incidentally, while only four image processing devices 3, 3, 5 and 5 are shown in FIG. 1 for the sake of convenience, the network system may actually include more image processing devices (devices) connected to the LAN 7.

In the network system configured as above, the devices on the network (the image processing devices 3, 3, 5 and 5 in this illustrative embodiment) execute processes which will be explained later, by which one of the devices functions as a "master device" and devices other than the master device function as "general devices". While which of the devices should function as the master device is determined in a process explained later, the outline is as follows: In this network system, an ordinal rank in the system is assigned to each device, and a device of a higher rank shifts into a state for functioning as the master device with higher priority. In the following, such an ordinal rank assigned to each device will also be referred to as "a priority".

The device functioning as the master device is required to play a variety of roles as follows:

(1) Manage the general devices existing in the system and supply "shared data" (data to be shared by all the devices in the system) to each general device (2) Generate a backup of the shared data (before update) on each update of the shared data while managing multiple pieces of backup data which have been generated in previous updates of the shared data so that the shared data can be restored in case it is updated erroneously (3) Manage the priorities (ordinal ranks) of the devices in the system, while reassigning the priorities to all the devices when the number of devices in the system has increased or decreased (4) When a device having a higher priority than the master device exists in the system as a result of the priority reassignment, replace the master device with the high-priority device In this illustrative embodiment, the "shared data" to be shared by all the devices in the system is the aforementioned address book data. FIG. 2 is a table showing an example of the address book data. As shown in FIG. 2, multiple pieces of data (each of which is a combination of an ID, a name, a telephone number, a FAX number and a mail address, for example) are registered as the address book data. The latest address book data is supplied from the master device when a device is added to the system. Each device receiving the latest address book data stores the data in its own nonvolatile RAM (304, 504) as "master data". When a device updates its own address book data, the address book data in the master device is first updated accordingly by a process explained later, and thereafter the latest address book data (updated in the master device) is supplied to each device on the network. Consequently, the devices on the network consistently store the latest and identical address book data.

Further, on the update of the address book data, a copy of the master data (i.e. address book data) before the update is stored as the backup data by a process which will be explained later. A piece of backup data is stored as a separate file on each update of the master data, by which multiple pieces of backup data are accumulated as the update of the master data is repeated. Since simple accumulation of the backup data causes an unlimited increase of storage capacity (storage areas) occupied by the backup data, in this illustrative embodiment, the backup data is accumulated to keep the data size of the backup data within a prescribed storage capacity by deleting the oldest backup data when the data size of the accumulated backup data exceeds the prescribed storage capacity. Incidentally, the method for preventing the unlimited increase of backup data may be selected arbitrarily. For example, it is also possible to previously specify how many pieces of previous backup data should be accumulated, instead of restricting the upper limit of the data size of the accumulated backup data.

The multiple pieces of backup data generated corresponding to updates are stored in the master device within a prescribed storage capacity, while each of the multiple pieces of backup data is stored in each of the general devices respectively so as to let newer backup data be stored in a general device having higher priority, by a process which will be explained later. For example, when the address book data is updated in the case where the system includes four devices (including one master device and three general devices), backup data #1 having the contents of the address book data before the update is generated. The backup data #1 is stored in the master device, while being transmitted to a general device having the highest priority (i.e. a device having the second priority in the system (since the master device has the first priority)) and stored in the general device having the highest priority (second priority in the system). When the address book data is updated further, the existing backup data #1 is renamed "backup data #2", while a copy of the address book data before the update is made as (new) "backup data #1". At this stage, both the backup data #1 and #2 are stored in the master device. The (old) backup data #1 already stored in the general device having the highest priority (second priority in the system) is transmitted to a device having the next priority (third priority in the system) and stored in the device as "backup data #2". The new backup data #1 is transmitted from the master device to the general device having the highest priority (second priority in the system) and the old backup data #1 already stored in the general device is overwritten with the new backup data #1. Thereafter, as the update of the address book data is repeated, multiple pieces of backup data are accumulated in the master device as separate files, while each general device stores a piece of backup data in order of decreasing priority (starting from the general device having the highest priority). A concrete process for realizing such a data backup method will be explained in detail later.

Incidentally, when the facsimile function, the telephone function or the e-mail transmission function of the image processing device 3 is used, the user of the image processing device 3 can refer to the address book data stored in the device and thereby select the destination of data transmission or a telephone call. In the case of the image processing device 5 which is not provided with the facsimile function nor the telephone function, the user of the image processing device 5 using its e-mail transmission function can refer to the address book data stored in the device and thereby select the destination of data transmission (e-mail). The e-mail transmission function is a function capable of converting image data read by the scanner function into data of an e-mail format and transmitting an e-mail containing the data to the destination. Each image processing device (3, 5), also having the e-mail reception function as the counterpart of the e-mail transmission function, is capable of receiving an e-mail and printing out image data contained in the e-mail by use of its printer function.

In the following, processes executed by each device on the network (image processing device 3, 3, 5, 5) for realizing such a network system will be explained in detail. In the following explanation, each of the image processing devices 3, 3, 5 and 5 will be collectively called "the device" as long as the discrimination between the image processing devices 3 and the image processing devices 5 is unnecessary.

First, a process which is executed when the power of the device is turned ON will be described referring to a flow chart of FIG. 3.

When the power is turned ON, the device first transmits (broadcasts) a "master aptitude value" (S105). The master aptitude value is a value which will be used for determining the aforementioned "priority" of the device. In this illustrative embodiment, a value determined by the expression: (nonvolatile RAM capacity)×(continuous operability index: 2 in a device with the FAX function, 1 in a device without the FAX function) is transmitted as the master aptitude value. Therefore, the master aptitude value of a device becomes higher when the device has a nonvolatile RAM (304, 504) of a higher capacity or the FAX function. In a process explained later, a device having a higher master aptitude value is judged to have a higher priority, by which a device having the highest master aptitude value will function as the master device. The priority of each device is determined as above for the following reasons. A device having a higher nonvolatile RAM capacity has a greater ability for preserving the backup data, and such a device is considered to be suitable as the master device. Meanwhile, a device having the FAX function, less likely to be turned OFF, is expected to be highly capable of constantly supplying the address book data and monitoring the increase/decrease of devices in the system, and such a device is considered to be suitable as the master device.

After the transmission of the master aptitude value (S105), the device checks whether a reply from the master device has been received (S110). If no reply has been received (S110: NO), the device waits until a prescribed time period (e.g. 1 second) elapses (S115) and thereafter checks whether a timeout has occurred (S120). If no timeout has occurred (S120: NO), the process returns to the step S110. The loop of S110-S120 is repeated until a reply from the master device is received or the timeout occurs.

When the timeout occurs during the repetition of the loop of S110-S120 (S120: YES), it means that no master device (for replying to the master aptitude value) exists on the network. In this case, the device recognizes that the device itself should function as the master device and generates "management information" (S125). The details of the step S125 will be explained later.

Figure 3:
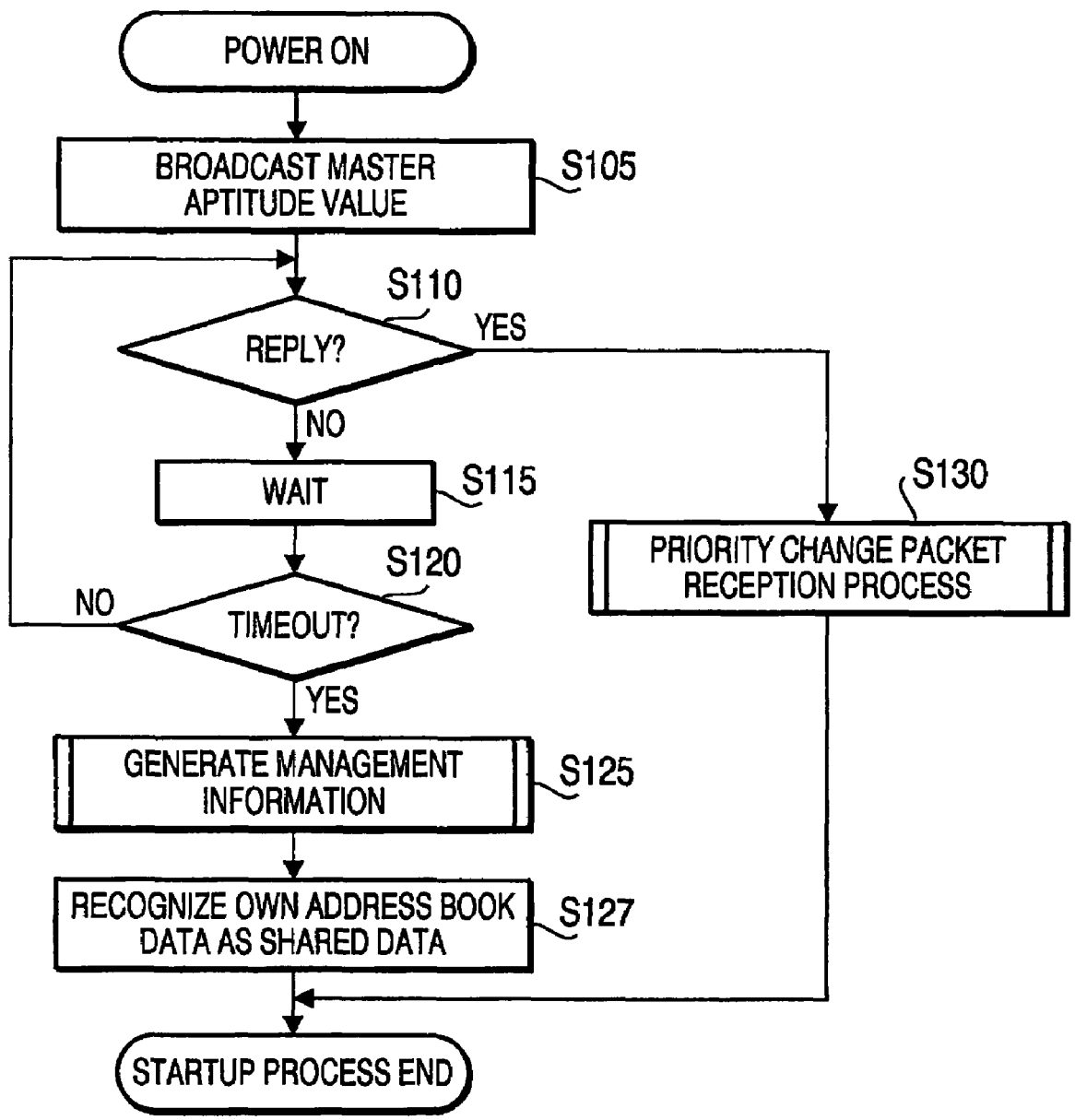
FIG. 3 is a flow chart showing a process executed by each device in the network system when the power of the device is turned ON according to at least one aspect of the invention.

After finishing the step S125, the device recognizes the address book data stored therein as the shared data (S127) and ends the process of FIG. 3. As for the method of recognition, the device may be designed to recognize its address book data as the shared data by copying the address book data (or shaped address book data) to its storage area for the shared data, or the device may be programmed right from the start to supply the address book data itself as the shared data.

On the other hand, when a reply from the master device is received during the repetition of the loop of S110-S120 (S110: YES), the device executes a priority change packet reception process (S130) and ends the process of FIG. 3. The details of the step S130 will be explained later.

Figures 4, 5:
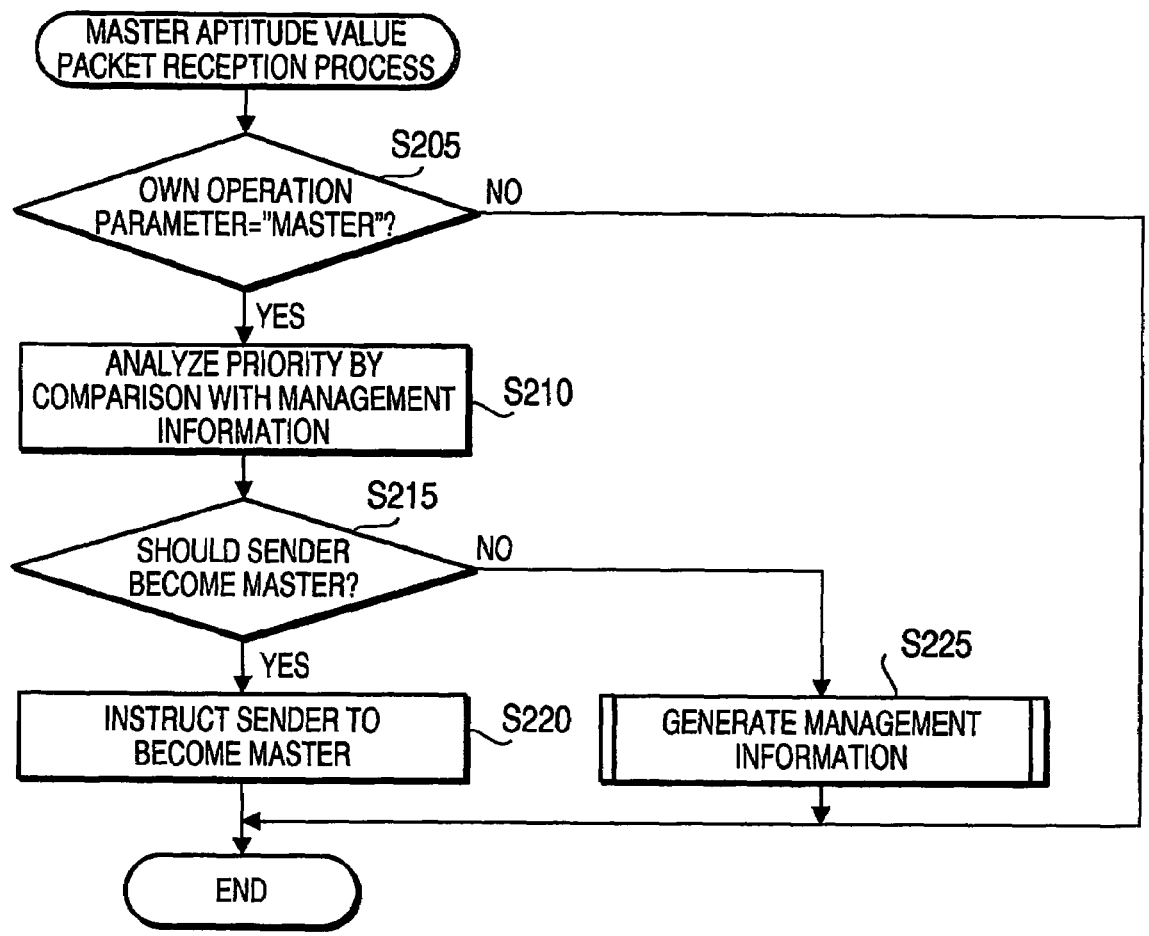
FIG. 4 is a flow chart showing a master aptitude value packet reception process according to at least one aspect of the invention.
FIG. 5 is a table showing an example of management information according to at least one aspect of the invention.

Next, a master aptitude value packet reception process which is executed by the device upon reception of a master aptitude value packet (a packet transmitted in the step S105 of FIG. 3 to represent the master aptitude value) as an interrupt routine (hereinafter referred to as an "event handler") in response to the receive event will be explained referring to a flow chart of FIG. 4.

The device starting the master aptitude value packet reception process upon reception of the master aptitude value packet first judges whether its own operation parameter represents "master" (S205). The operation parameter is a flag indicating whether the device is in a state for functioning as the master device or in a state for functioning as a general device. If the operation parameter does not represent "master" (S205: NO), the device immediately ends the process. Therefore, in the state for functioning as a general device, the device executes no substantial process in the master aptitude value packet reception process.

On the other hand, if the operation parameter represents "master" (S205: YES), the device in the state for functioning as the master device compares the received master aptitude value with the management information and thereby analyzes the priority of the device transmitting the master aptitude value packet (S210). The management information is generated by the device functioning as the master device (in a process explained later) and stored in its storage are (e.g. HDD 307 or 507). As shown in FIG. 5, multiple pieces of data (each of which is a combination of an ID, a priority, an IP address and a master aptitude value, for example) are registered as the management information. In the step S210, the device functioning as the master device compares the received master aptitude value with the master aptitude values recorded in the management information and thereby analyzes whether the device that transmitted the master aptitude value packet has a higher priority (a higher master aptitude value) than a current master device (itself).

If the sender (the device that transmitted the master aptitude value packet) should become the master device based on the result of the analysis of S210 (S215: YES), the current master device instructs the sender to become the master device (S220) and ends the master aptitude value packet reception process. On the other hand, if the current master device should keep on functioning as the master device based on the result of the analysis of S210 (S215: NO), the device generates the management information (S225) and ends the master aptitude value packet reception process. The step S225 is equivalent to the aforementioned step S125. The details of the step S225 (S225) will be explained below.

Next, the management information generating process (S215, S225) will be explained in detail referring to a flow chart of FIG. 6.

The device starting the management information generating process broadcasts an instruction for requesting all the general devices to send back their master aptitude values (S305) and receives replies (master aptitude value packets) from other devices for a prescribed waiting time period (e.g. 5 seconds) (S310). Subsequently, the device generates the management information explained above (see FIG. 5) based on the received master aptitude value packets and its own master aptitude value (S315) and judges whether its own master aptitude value is the highest by referring to the generated management information (S320). Incidentally, when there is no reply to the broadcast of S305, the device naturally judges that its own master aptitude value is the highest since the generated management information includes the master aptitude value of the device only.

If the master aptitude value of its own (i.e. the current master device) is not the highest (S320: NO), the device instructs a device having the highest master aptitude value to become the master device (S330) and ends the management information generating process. The device receiving the instruction of S330 executes the priority change packet reception process (explained later, see FIG. 7).

On the other hand, if the master aptitude value of its own (i.e. the current master device) is the highest (S320: YES), the device transmits a packet containing the following three pieces of information:

(1) priority-specifying information (2) device address information for monitoring (3) address information on the master device to the managed devices (devices registered in the management information) (S340). Each device receiving the packet of S340 (each device registered in the management information) executes the priority change packet reception process (explained later, see FIG. 7) and sends back a reply to the received packet to the master device (the device executing the management information generating process).

After finishing the step S340, the device checks whether the reply has been received from all the managed devices (S350), waits a prescribed time period (e.g. 1 second) (S355) if the reply has not been received from all the managed devices (S350: NO), and thereafter checks whether a timeout has occurred (S360). If no timeout has occurred (S360: NO), the process returns to the step S350. The loop of S350-S360 is repeated until the reply is received from all the managed devices or the timeout occurs.

When the timeout occurs during the repetition of the loop of S350-S360 (S360: YES), it means that no device for replying to the packet exists on the network. In this case, the device recognizing that the contents of the management information are already invalid returns to the step S315 to redo the process from S315.

On the other hand, when the reply is received from all the managed devices during the repetition of the loop of S350-S360 (S350: YES), the device sets a flag representing "master" to its own operation parameter (S365) and ends the management information generating process.

Next, the priority change packet reception process, which is executed by a device receiving the instruction of the step S220 of FIG. 4 or the step S330 of FIG. 6 (requesting the device to function as the master device) or the priority-specifying information transmitted in the step S340 of FIG. 6 as the event handler for this receive event, will be explained referring to a flow chart of FIG. 7.

The device starting the priority change packet reception process first judges whether the received instruction/information indicates that the device should change into the master device (S405).

If the device should change into the master device (S405: YES), the device checks whether the device is generating the management information (S410). If the device is generating the management information (S410: YES), it means that the device had recognized that the device itself should function as the master device before the start of this process. In this case, the device immediately ends this event handler process. If the device is not generating the management information (S410: NO), the device, recognizing that the device itself should function as the master device at this point, acquires the master data of the address book data from the current master device (S415).

Figure 7:
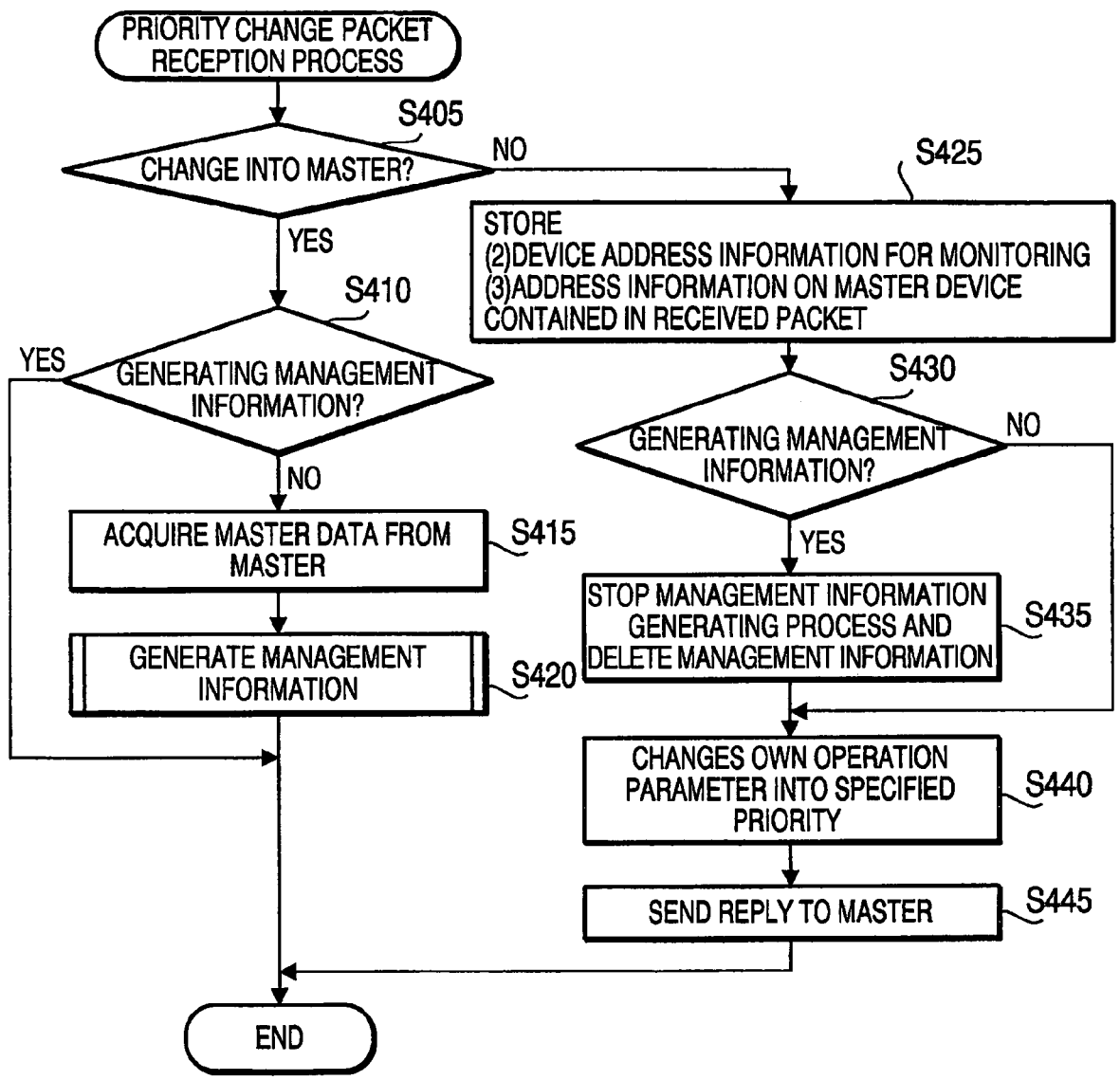
FIG. 7 is a flow chart showing a priority change packet reception process according to at least one aspect of the invention.
Figure 8:
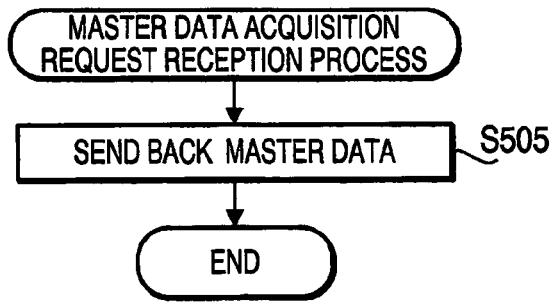
FIG. 8 is a flow chart showing a master data acquisition request reception process according to at least one aspect of the invention.

Specifically, in the step S415, the device transmits a master data acquisition request to the current master device. The master device receiving the master data acquisition request executes a master data acquisition request reception process shown in FIG. 8 as the event handler for this receive event. By executing the master data acquisition request reception process, the master device sends back the master data to the requesting device (S505), by which the device acquires the master data (S415 in FIG. 7).

After acquiring the master data (S415), the device generates the management information (S420) and ends the priority change packet reception process. The step S420 is equivalent to the management information generating process of FIG. 6 (S305-S365) already explained above and thus repeated explanation thereof is omitted here.

On the other hand, if the device should not change into the master device (S405: NO), the device stores "(2) device address information for monitoring" and "(3) address information on the master device" in its nonvolatile RAM 304, 504 (S425). Subsequently, the device checks whether the device is generating the management information (S430). If the device is generating the management information (S430: YES), it means that the device had erroneously recognized that the device itself should function as the master device before the start of this process even though the device should not function as the master device. In this case, the device stops the management information generating process and deletes the management information generated so far (S435), by which the device executing this priority change packet reception process is prevented from starting to function as the master device in this state in which there exists another device for transmitting the priority change packet (i.e. a device already functioning as the master device). Incidentally, if the device is not generating the management information (S430: NO), the step S435 is skipped since the device is not going to function as the master device.

Subsequently, the device changes its own operation parameter into the specified priority (S440), sends a reply (indicating that its priority has changed into that specified by the master device) to the master device (S445) and ends the priority change packet reception process. Incidentally, the reply sent to the master device in the step S445 is the aforementioned reply received by the master device during the loop of S350-S360 in FIG. 6.

Figure 9:
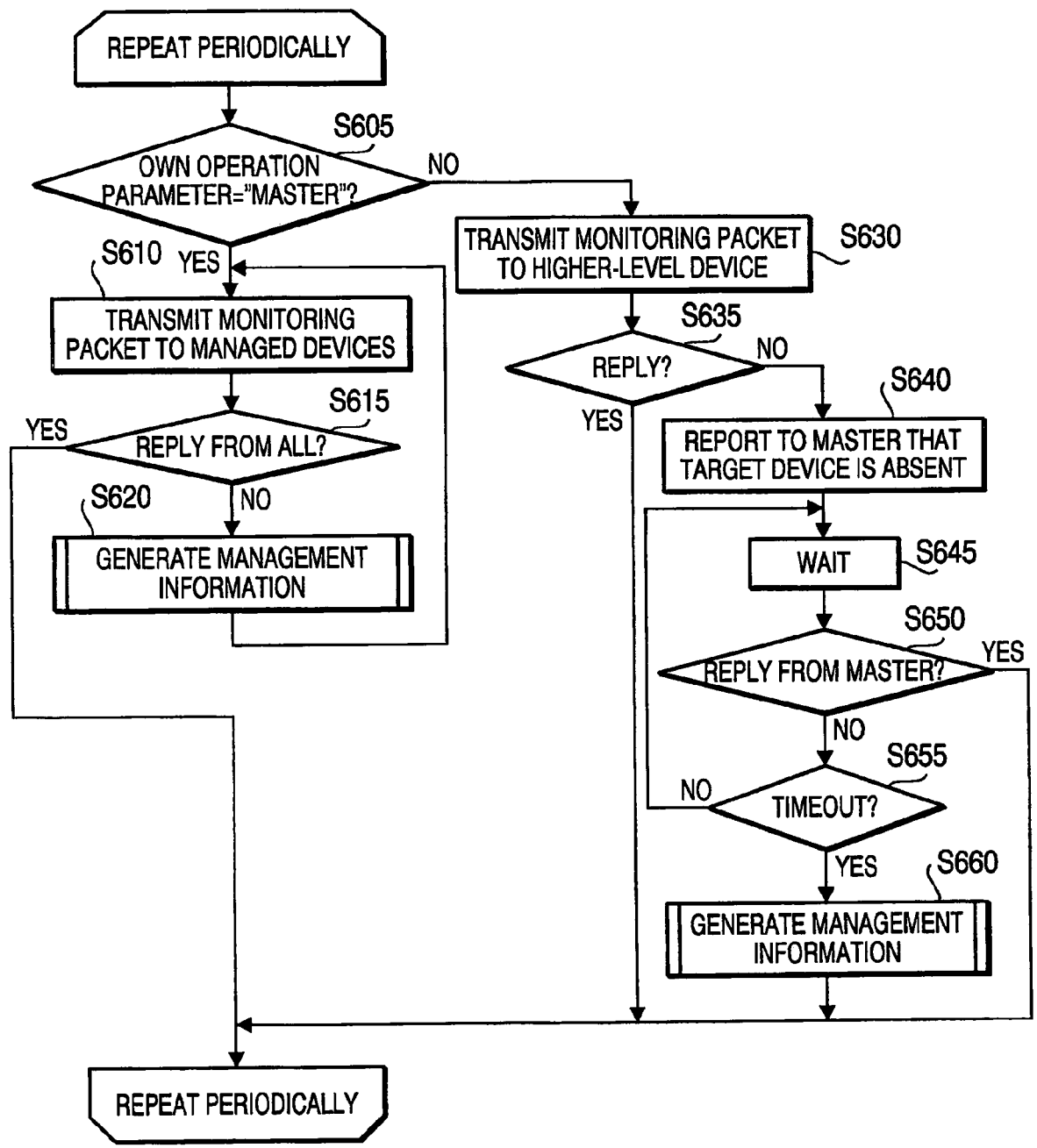
FIG. 9 is a flow chart showing a process repeated by each device periodically according to at least one aspect of the invention.

Next, a process repeated by each device periodically or substantially at fixed time periods (periodic handler) will be explained referring to a flow chart of FIG. 9.

The device starting this process first judges whether its own operation parameter is "master" (S605). If its own operation parameter is "master" (S605: YES), the device as the master device transmits a monitoring packet to the managed devices (S610).

Figure 10:
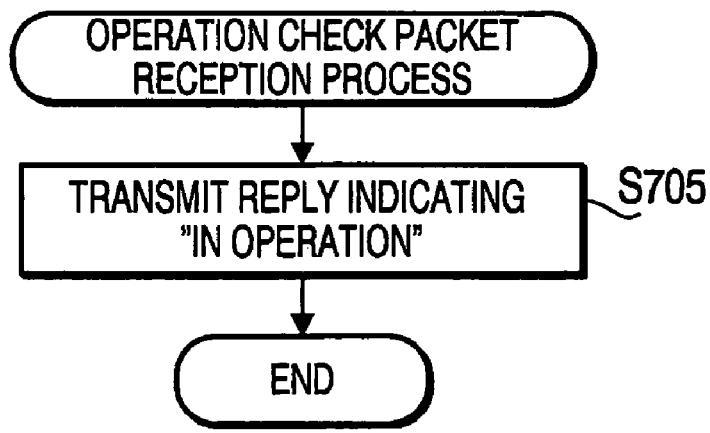
FIG. 10 is a flow chart showing an operation check packet reception process according to at least one aspect of the invention.

Each managed device (general device) receiving the monitoring packet executes an operation check packet reception process shown in FIG. 10 as the event handler for this receive event, by which a reply indicating that the general device is in operation is sent to the master device (S705).

After a while, the device as the master device checks whether the reply has already been received from all the devices to which the monitoring packet was transmitted (S615). If the reply has been received from all the devices (S615: YES), the master device recognizes that all the managed devices (general devices registered in the management information) are in operation as before and ends the process of FIG. 9.

If at least one of the devices has not returned the reply yet (S615: NO), the device as the master device recognizes that not all the managed devices (general devices registered in the management information) are in operation as before, and regenerates the management information by executing the management information generating process (S620). The step S620 is equivalent to the management information generating process of FIG. 6 (S305-S365) already explained above and thus repeated explanation thereof is omitted here.

After regenerating the management information (S620), the device returns to the step S610 to repeat the sequence from S610, by which the device checks whether all the latest managed devices (general devices registered in the regenerated management information) are in operation.

In the judgment of S605, if its own operation parameter is not "master" (S605: NO), the device as a general device transmits the monitoring packet to a device having an immediately higher priority than itself (higher-level device) (S630).

A device (higher-level device) receiving the monitoring packet executes the operation check packet reception process of FIG. 10 (explained above) as the event handler for this receive event, by which the device (higher-level device) transmits a reply indicating that it is in operation to the device having an immediately lower priority than itself (S705).

The device which transmitted the monitoring packet to the higher-level device checks whether a reply has been received from the higher-level device (S635). If a reply has been received from the higher-level device (S635: YES), the device recognizes that the higher-level device is in operation as before and ends the process of FIG. 9.

On the other hand, if no reply has been received from the higher-level device (S635: NO), the device recognizes that the higher-level device has stopped its operation and reports to the master device that the monitoring target device (higher-level device) is absent (S640).

Figure 11:
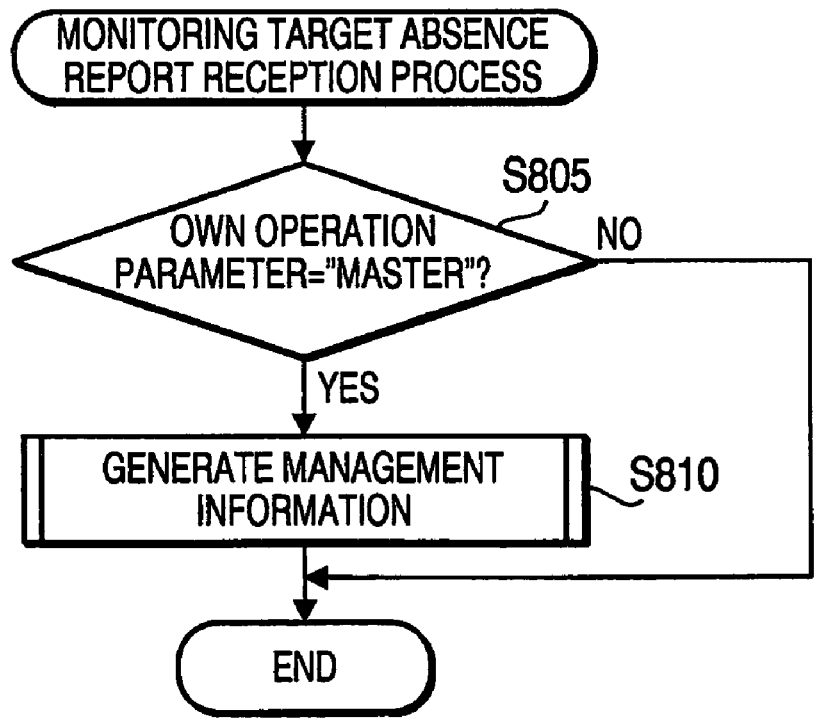
FIG. 11 is a flow chart showing a monitoring target absence report reception process according to at least one aspect of the invention.

The device receiving the report executes a monitoring target absence report reception process shown in FIG. 11 as the event handler for this receive event. Specifically, at the start of the monitoring target absence report reception process, the device checks whether its own operation parameter is "master" (S805). If its own operation parameter is "master" (S805: YES), the device regenerates the management information by executing the management information generating process (S810). The step S810 is equivalent to the management information generating process of FIG. 6 (S305-S365) already explained above and thus repeated explanation thereof is omitted here. Since the management information is regenerated in the step S810, the higher-level device (suspected to have stopped its operation) is deleted from the management information if communication between the master device and the higher-level device is impossible. On the other hand, if its own operation parameter is not "master" (S805: NO), the device (general device) skips the step S810 and ends the monitoring target absence report reception process. Therefore, in the state for functioning as a general device, the device executes no substantial process in the monitoring target absence report reception process.

Figure 6:
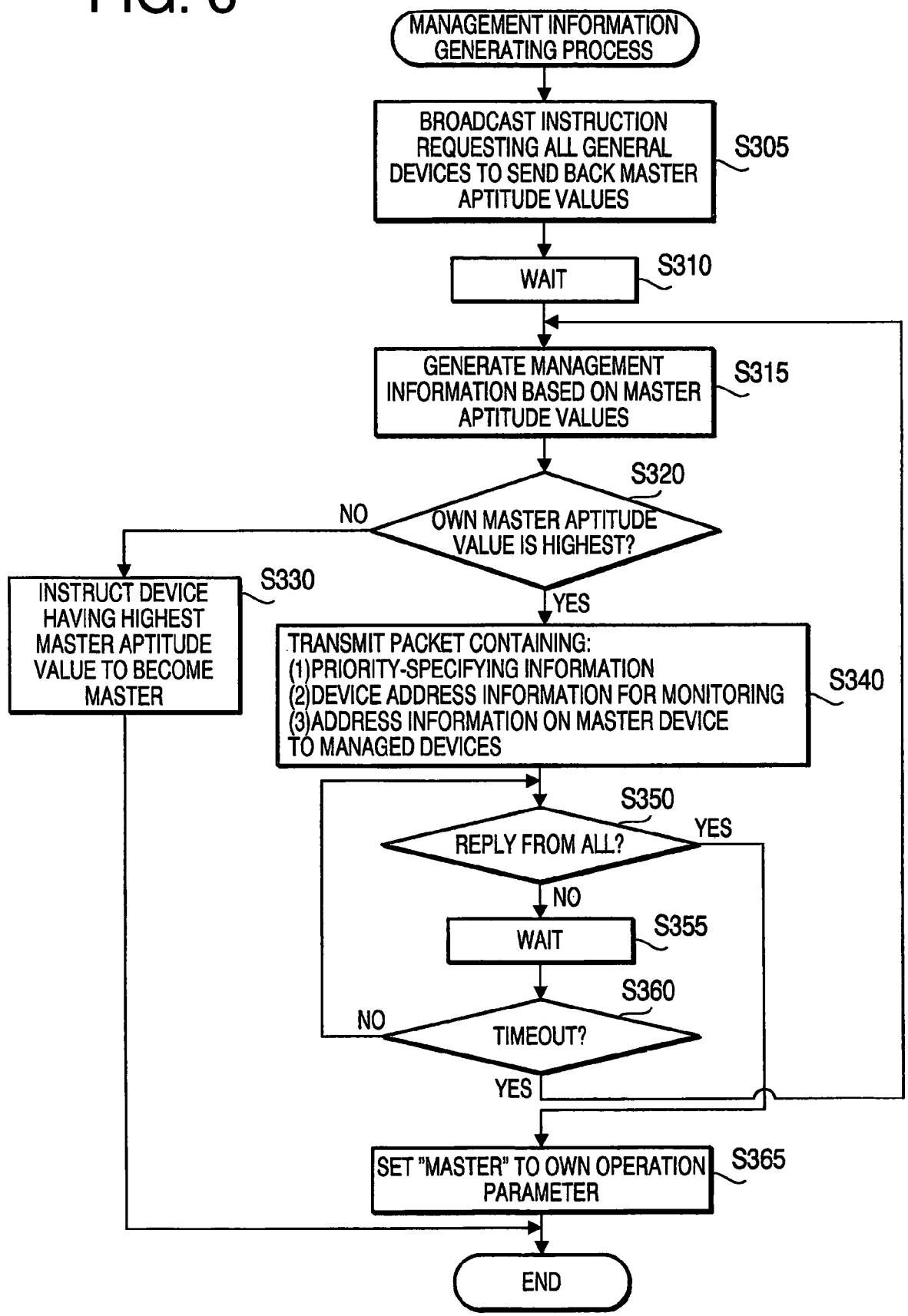
FIG. 6 is a flow chart showing a management information generating process according to at least one aspect of the invention.

Incidentally, when the above monitoring target absence report reception process (including the management information generating process (S810) equivalent to that of FIG. 6 (S305-S365)) is executed by the master device, a reply of some kind is transmitted by the master device (S330 or S340).

Referring again to FIG. 9, the device which transmitted the report (S640) waits a prescribed time period (e.g. 1 second) (S645) and thereafter checks whether a reply from the master device has been received (S650). If no reply has been received (S650: NO), the device checks whether a timeout has occurred (S660) and returns to S645 if no timeout has occurred (S655: NO). The loop of S645-S655 is repeated until the reply is received from the master device or the timeout occurs.

When the reply is received from the master device during the repetition of the loop of S645-S655 (S650: YES), the process of FIG. 9 is ended.

On the other hand, when the timeout occurs (S655: YES), it means that no master device (for replying to the report) exists on the network. In this case, the device recognizing that the device itself should function as the master device generates the management information (S660) and ends the process of FIG. 9. The step S660 is equivalent to the management information generating process of FIG. 6 (S305-S365) and thus repeated explanation thereof is omitted here. Incidentally, since the device can not acquire the master data from the former master device in this case, the device regenerates the management information based on copy data of the master data previously obtained by the device or by another device.

The processes explained above are executed by the devices on the network (the image processing devices 3, 3, 5 and 5 in this illustrative embodiment), by which one of the devices functions as the master device, manages the other devices, and supplies the address book data (shared data to be shared by all the devices in the system) to the managed devices. The master device manages the priorities of all the managed devices and when a device having a higher priority (higher master aptitude value) joins the network, the master device is replaced by the high-priority device.

Next, a process which is executed when the user performed an operation for updating the address book will be explained below referring to a flow chart of FIG. 12. The user can enter data for update by operating the operation keys (305, 505) of the master device or a general device. When the entered data is confirmed, the device starts the process shown in FIG. 12.

The device starting this process checks whether its own operation parameter is "master" (S1005). If its own operation parameter is "master" (S1005: YES), the device, functioning as the master device and storing the original of the master data of the address book data therein, executes an address book update process in order to update the original (S1010). The details of the step S1010 will be explained in detail later. When the address book update process (S1010) is finished, the device ends the process of FIG. 12.

On the other hand, if its own operation parameter is not "master" (S1005: NO), the device, functioning as a general device and storing a copy of the master data of the address book data therein (not storing the original of the master data), transmits update data to the master device so that the original will be updated according to the update data (S1020) and ends the process of FIG. 12.

Figure 12:
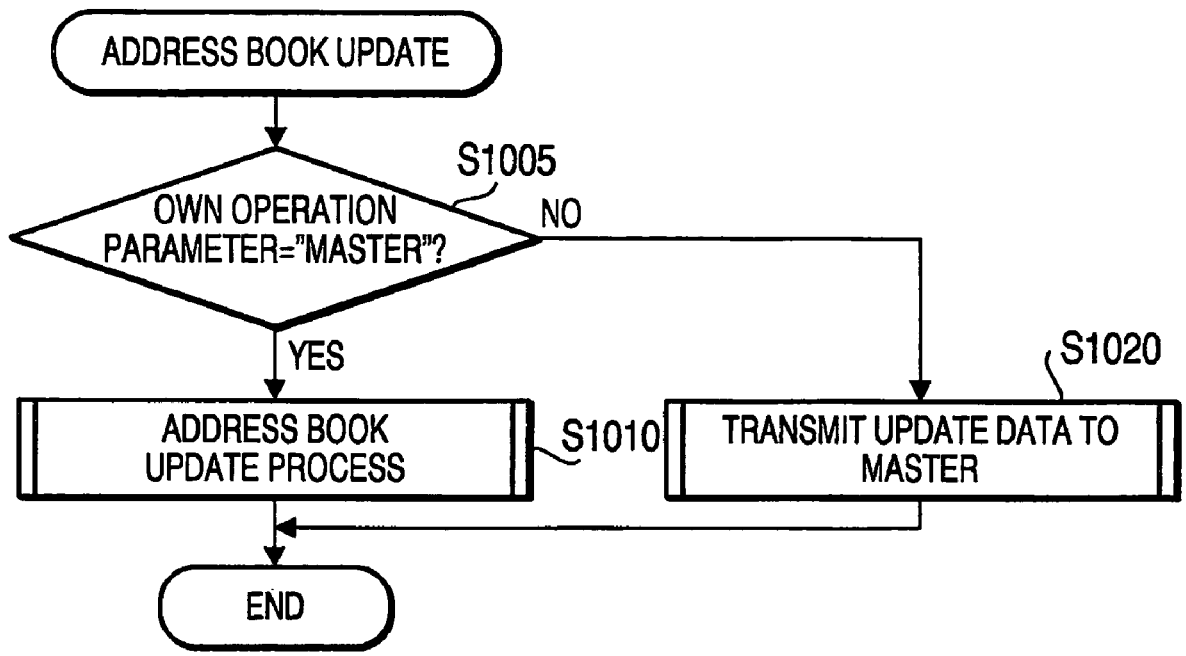
FIG. 12 is a flow chart showing a process executed when a user performed an operation for updating the address book according to at least one aspect of the invention.
Figure 13:
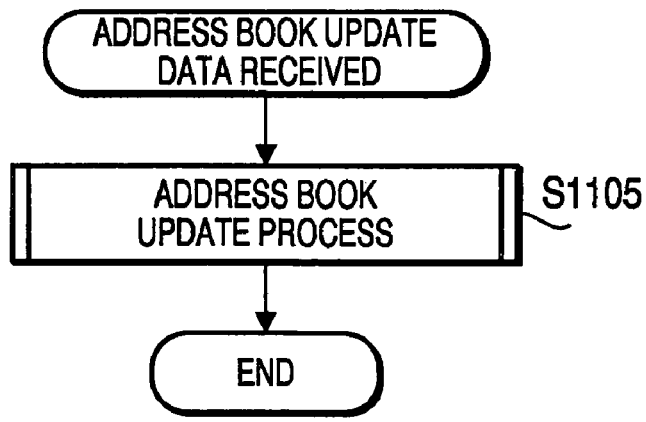
FIG. 13 is a flow chart showing a process executed when address book update data is received according to at least one aspect of the invention.

The master device receiving the update data of S1020 executes a process shown in FIG. 13 as the event handler for this receive event, in which the master device executes an address book update process (S1105). The step S1105 is equivalent to the address book update process of S1010 of FIG. 12 (details will be explained later). When the address book update process (S1105) is finished, the master device ends the process of FIG. 13.

In short, the step S1010 is executed by the master device when the user of the master device performed an operation for updating the address book, while the step S1105 is executed by the master device when the user of a general device performed an operation for updating the address book. In either case, the address book update process is executed by the master device.

Figure 14:
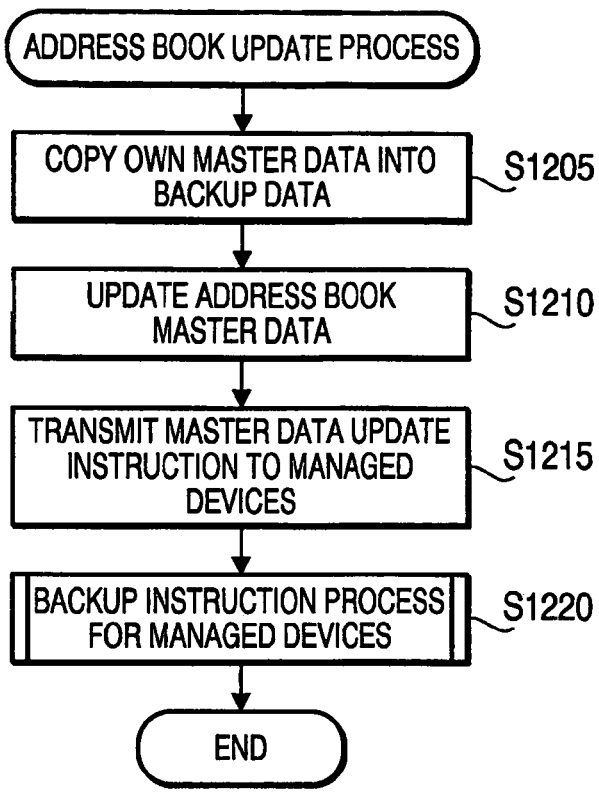
FIG. 14 is a flow chart showing an address book update process according to at least one aspect of the invention.

Next, the address book update process (S1010, S1105) will be explained referring to a flow chart of FIG. 14.

At the start of the address book update process, the device (master device) copies its own master data into backup data (S1205). The backup data, as the copy of the master data (address book data) before the update, is stored in the non-volatile RAM (304, 504) in this illustrative embodiment.

After S1205 is finished, the device updates the master data (S1210), by which the master data is updated incorporating the latest update information. Subsequently, the device transmits a master data update instruction to the managed devices (S1215).

Figure 15:
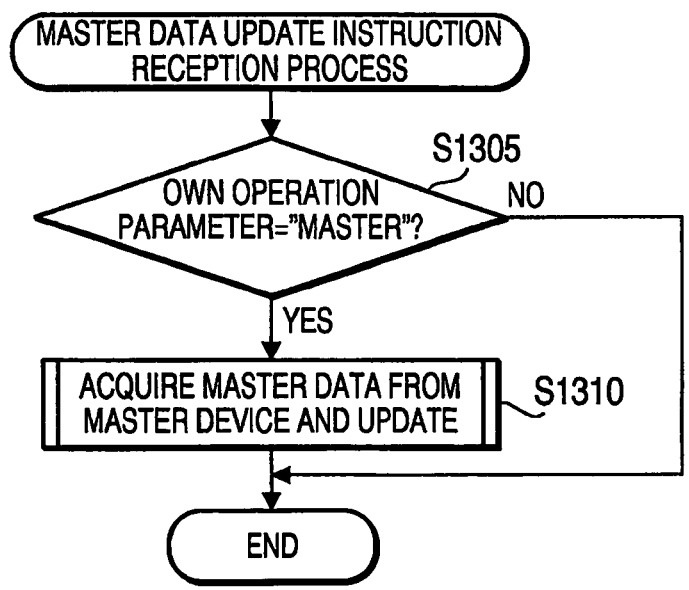
FIG. 15 is a flow chart showing a master data update instruction reception process according to at least one aspect of the invention.

Each device (managed device) receiving the master data update instruction of S1215 executes a master data update instruction reception process shown in FIG. 15 as the event handler for this receive event. Specifically, the device starting the master data update instruction reception process checks whether its own operation parameter is "master" (S1305). If its own operation parameter is not "master" (S1305: NO), the device (general device) acquires the master data from the master device, updates its own master data (a copy of the original stored in the master device) to the acquired master data (S1310), and ends the master data update instruction reception process. On the other hand, if its own operation parameter is "master" (S1305: YES), the device (master device) skips the step S1310 and immediately ends the process. Therefore, in the state for functioning as the master device, the device executes no substantial process in the master data update instruction reception process.

Figure 16:
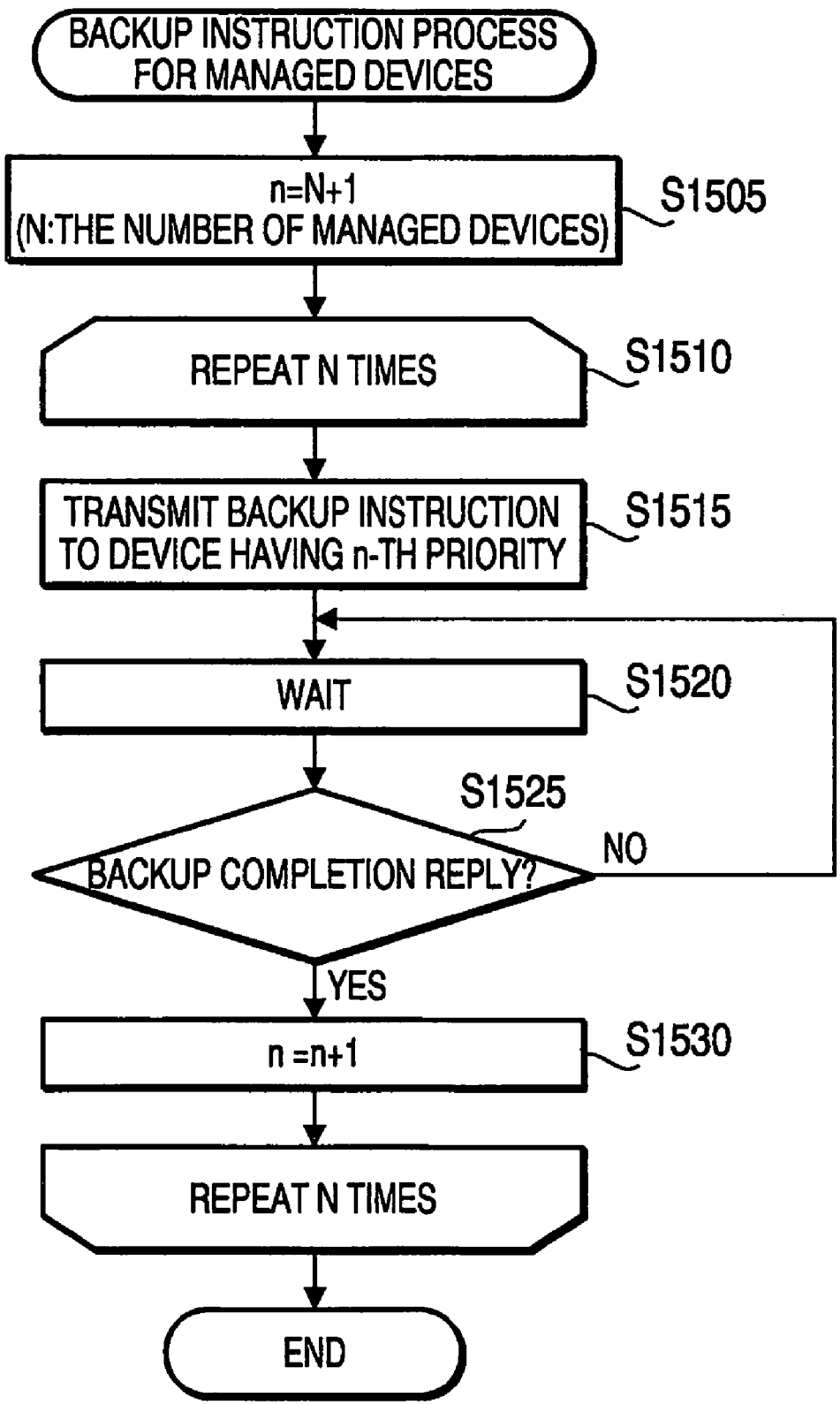
FIG. 16 is a flow chart showing a backup instruction process executed for managed devices according to at least one aspect of the invention.

Referring again to FIG. 14, the device (master device) which finished the step S1215 executes a backup instruction process (S1220) for the managed devices. The details of the backup instruction process (S1220) are shown in FIG. 16. At the start of the backup instruction process, the device sets a counter variable n at N+1 (N: the number of managed devices) (S1505). For example, in the case where the system includes four devices (one master device and three general devices), the number of devices managed by the master device (the number of general devices) is three (N=3) and thus the counter variable n is set at 3+1=4. As above, the total number of devices including the master device and general devices is obtained by adding 1 (master device) to N (general devices), and the total number is set to the counter variable n.

Subsequently, the device (master device) repeats a loop of S1515-S1530 (which will be explained below) N times (S1510). In this loop, the device first transmits a backup instruction to a device having the n-th priority (S1515).

Figure 17:
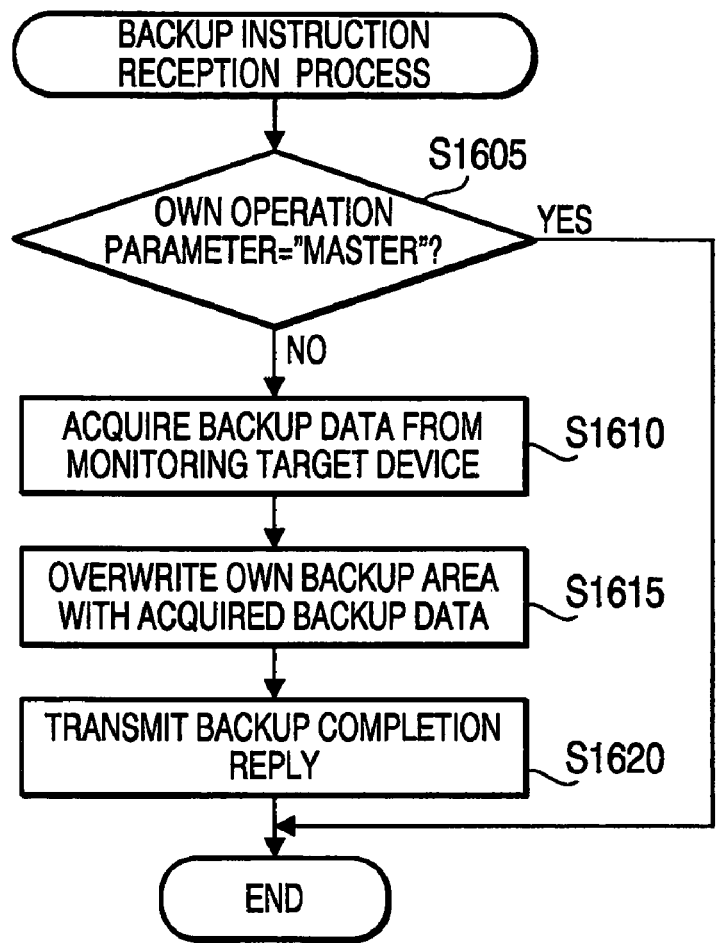
FIG. 17 is a flow chart showing a backup instruction reception process according to at least one aspect of the invention.

The device receiving the backup instruction executes a backup instruction reception process shown in FIG. 17 as the event handler for this receive event. Specifically, the device receiving the backup instruction checks whether its own operation parameter is "master" (S1605). If its own operation parameter is not "master" (S1605: NO), the device (general device) acquires the backup data from the monitoring target device (a device having an immediately higher priority than itself) (S1610).

Figure 18:
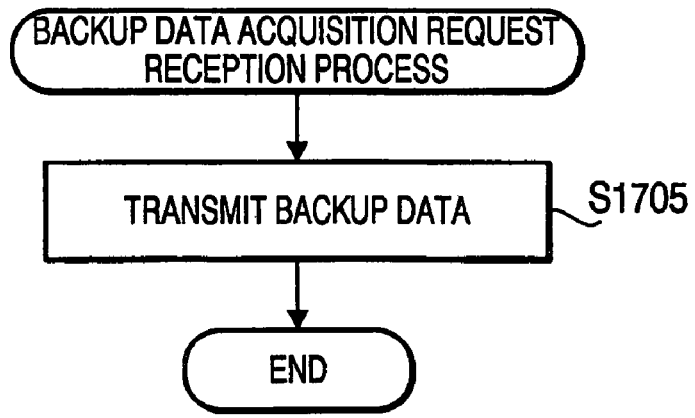
FIG. 18 is a flow chart showing a backup data acquisition request reception process according to at least one aspect of the invention.

Specifically, in the step S1610, the device transmits a backup data acquisition request to the monitoring target device. The monitoring target device receiving the backup data acquisition request executes a backup data acquisition request reception process shown in FIG. 18 as the event handler for this receive event, in which the monitoring target device sends back its own backup data to the requesting device (S1705). The backup data sent in S1705 is acquired by the device in the step S1610.

The device which acquired the backup data (S1610) overwrites its own backup area with the acquired backup data (S1615), transmits a backup completion reply to the master device (S1620), and ends the backup instruction reception process. In the judgment of S1605, if its own operation parameter is "master" (S1605: YES), the device (master device) skips the steps S1610-S1620 and immediately ends the process. Therefore, in the state for functioning as the master device, the device executes no substantial process in the backup instruction reception process.

Since the backup completion reply (indicating that backup has been finished) is sent to the master device from the device of the n-th priority finishing the steps S1605-S1620, the master device finishing the step S1515 waits for the reply a prescribed time period (e.g. 1 second) (S1520) and thereafter checks whether the reply from the n-th priority device has been received (S1525). If no reply has been received (S1525: NO), the master device returns to S1520 and repeats the loop of S1520-S1525 until the reply is received from the n-th priority device.

When the reply is received from the n-th priority device during the repetition of the loop of S1520-S1525 (S1525: YES), the master device decrements the counter variable n by 1 (S1530). After repeating the above steps S1515-S1530 N times, the master device ends the backup instruction process.

In the steps S1505-S1530 explained above, the n-th priority device (device having the n-th priority) is a device in the ordinal rank represented by the counter variable n. The counter variable n is first set at the total number of devices in the system (initial value) and thereafter successively decremented by 1 (S1530) each time the loop of S1510-S1530 is repeated. For example, in the case where the system includes four devices including one master device and three general devices (with the counter variable n decreasing in the manner of 4, 3, 2 by the repetition), the backup instruction is first transmitted to a fourth priority device and thereafter to a third priority device and to a second priority device by the repetition of the step S1515. In short, the transmission of the backup instruction is repeated starting from a device having the lowest priority and thereafter raising the ordinal rank of the destination by one each time. Consequently, each general device stores a piece of backup data, in which newer backup data is stored in a device of higher priority.

Figure 19:
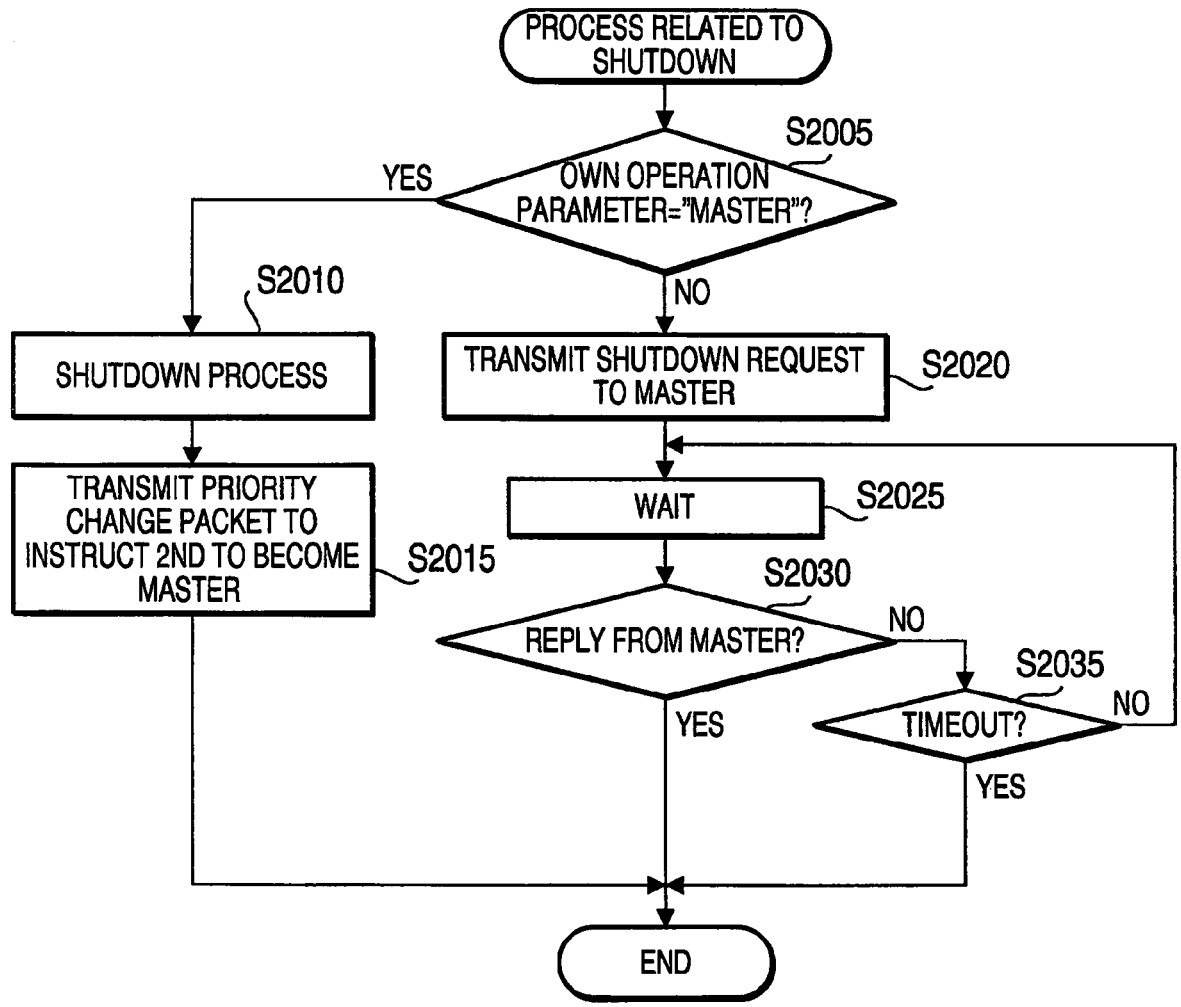
FIG. 19 is a flow chart showing a process executed when a device connected to the network disconnects from the network according to at least one aspect of the invention.

Next, a process which is executed when a device connected to the network disconnects from the network (e.g. when the power switch is turned OFF) will be explained referring to a flow chart of FIG. 19.

Figure 20:
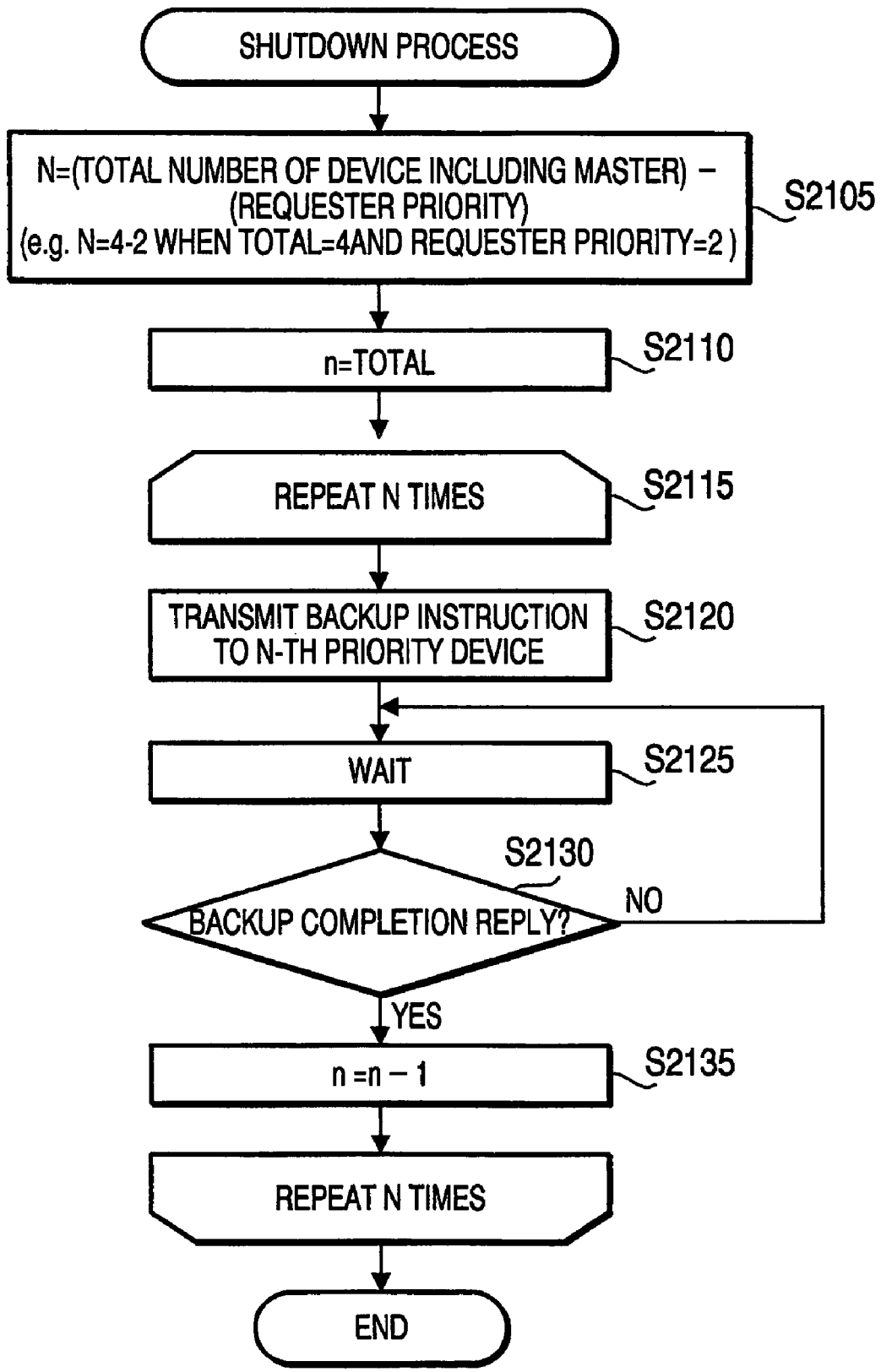
FIG. 20 is a flow chart showing a shutdown process according to at least one aspect of the invention.

The device starting this process checks whether its own operation parameter is "master" (S2005). If its own operation parameter is "master" (S2005: YES), the device (master device) executes a shutdown process (S2010). The details of the shutdown process (S2010) are shown in FIG. 20.

At the start of the shutdown process of FIG. 20, the device figures out the number of repetitions (N) of a loop of S2120-S2135 which will be explained later (S2105). Specifically, the number N of repetitions is obtained by subtracting "the priority of a device requesting shutdown" from "the total number of devices including the master device and general devices". For example, in the case where the system includes four devices (one master device and three general devices), when a device of the second priority (i.e. a general device of the highest priority) is requesting shutdown, the number N of repetitions is obtained by subtracting 2 from 4 (N=4−2=2). When the device (master device) itself (i.e. the device of the first priority) is requesting shutdown, the number N of repetitions is obtained by subtracting 1 from 4 (N=4−1=3). The number N of repetitions obtained as above corresponds to the number of devices having lower priorities than the device requesting shutdown. Subsequently, the device (master device) sets a counter variable n at the total number of devices including the master device and general devices (S2110).

Thereafter, the device (master device) repeats the loop of S2120-S2135 (which will be explained below) N times (S2115).

In this loop, the device first transmits the backup instruction to a device having the n-th priority (S2120). The device receiving the backup instruction executes the backup instruction reception process of FIG. 17 as the event handler for this receive event. Since the details of the process of FIG. 17 have been explained above, repeated explanation thereof is omitted here.

Since the backup completion reply is sent to the master device from the n-th priority device finishing the backup, the master device finishing the step S2120 waits for the reply a prescribed time period (e.g. 1 second) (S2125) and thereafter checks whether the reply from the n-th priority device has been received (S2130). If no reply has been received (S2130: NO), the master device returns to S2125 and repeats the loop of S2125-S2130 until the reply is received from the n-th priority device.

When the reply is received from the n-th priority device during the repetition of the loop of S2125-S2130 (S2130: YES), the master device decrements the counter variable n by 1 (S2135). After repeating the above steps S2120-S2135 N times, the master device ends the shutdown process.

In the steps S2105-S2135 explained above, the n-th priority device (device having the n-th priority) is a device in the ordinal rank represented by the counter variable n. The counter variable n is first set at the total number of devices in the system (initial value) and thereafter successively decremented by 1 (S2135) each time the loop of S2125-S2130 is repeated. Incidentally, the number N of repetitions in the shutdown process of FIG. 20 corresponds to the number of devices having lower priorities than the device requesting shutdown. Therefore, the counter variable n is decreased by one at a time starting from a value corresponding to the lowest priority to "a value corresponding to a priority immediately lower than that of the device requesting shutdown". The backup instruction is transmitted to devices having such priorities in the steps S2105-S2135. In short, the backup instruction is transmitted to "all devices having lower priorities than the device requesting shutdown". The transfer of the backup data caused by such transmission of the backup instruction will be explained in detail later referring to timing charts.

After finishing the steps S2105-S2135 (S2010 in FIG. 19), the device (master device) transmits a priority change packet to a device having the second priority (general device having the highest priority) to instruct the device to become the master device (S2015) and ends the process of FIG. 12. The second priority device receiving the priority change packet executes the aforementioned priority change packet reception process (see FIG. 7).

On the other hand, if its own operation parameter is not "master" (S2005: NO), the device (general device) transmits a shutdown request to the master device (S2020).

Figure 21:
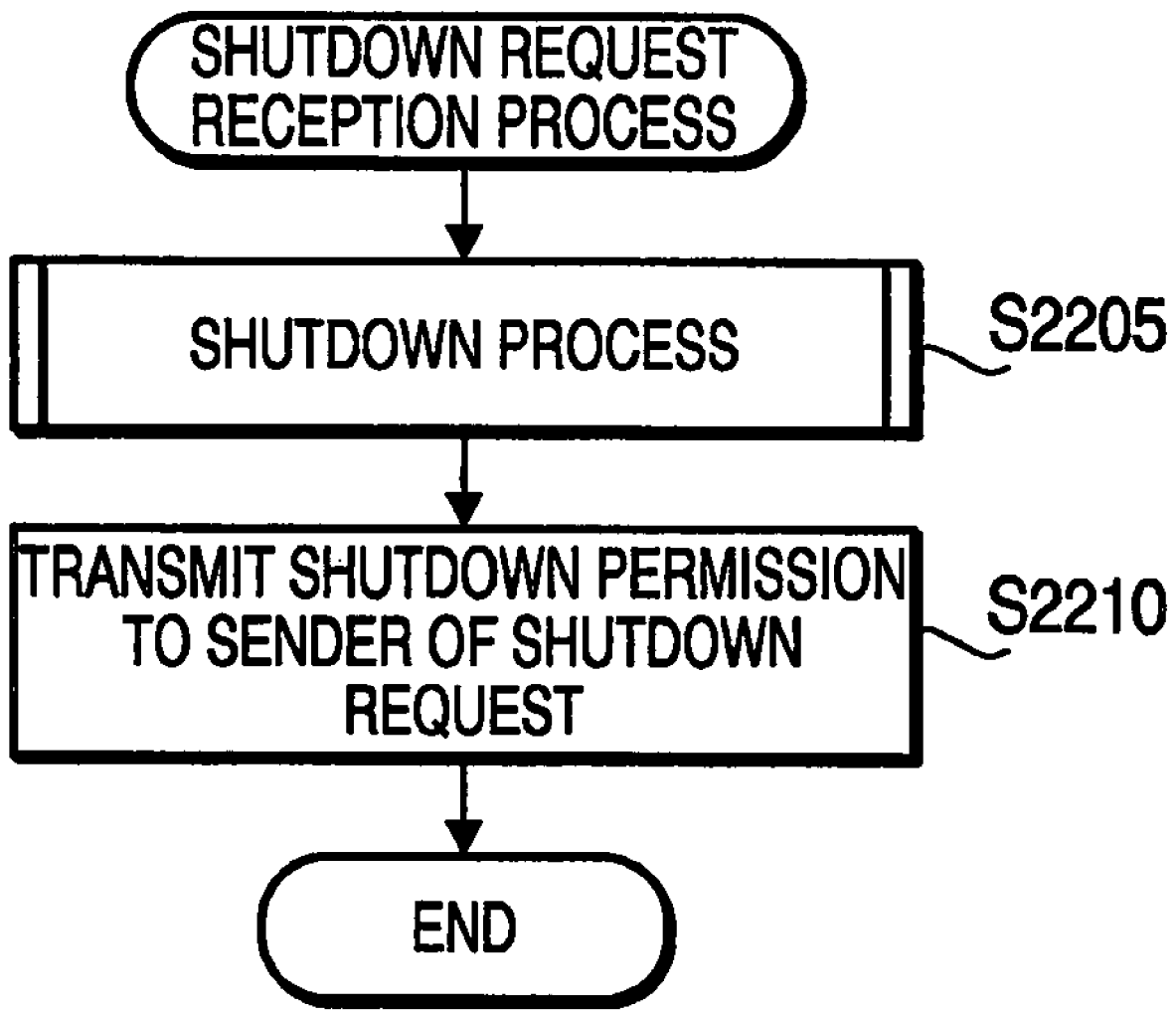
FIG. 21 is a flow chart showing a shutdown request reception process according to at least one aspect of the invention.

The master device receiving the shutdown request executes a shutdown request reception process shown in FIG. 21 as the event handler for this receive event, in which the master device executes a shutdown process. The step S2205 is equivalent to the shutdown process of FIG. 20 (S2105-S2135) and thus repeated explanation thereof is omitted here. After finishing the step S2205, the master device transmits a shutdown permission to the sender of the shutdown request (S2210) and ends the shutdown request reception process.

Referring again to FIG. 19, the device (general device) which transmitted the shutdown request in S2020 waits a prescribed time period (e.g. 1 second) (S2025) and thereafter checks whether a reply from the master device has been received (S2030). If no reply has been received (S2030: NO), the device checks whether a timeout has occurred (S2035) and returns to S2025 if no timeout has occurred (S2035: NO).

The loop of S2025-S2035 is repeated until the reply is received from the master device or the timeout occurs. When the reply is received from the master device during the repetition of the loop of S2025-S2035 (S2030: YES) or when the timeout occurs (S2035: YES), the device ends the process of FIG. 19. By the completion of this process (S2005-S2035), the device shifts into a state in which it can disconnect from the network. Thereafter, the device may automatically turn OFF the power switch or simply inform the user of the state in which the power switch can be turned OFF.

Figure 22:
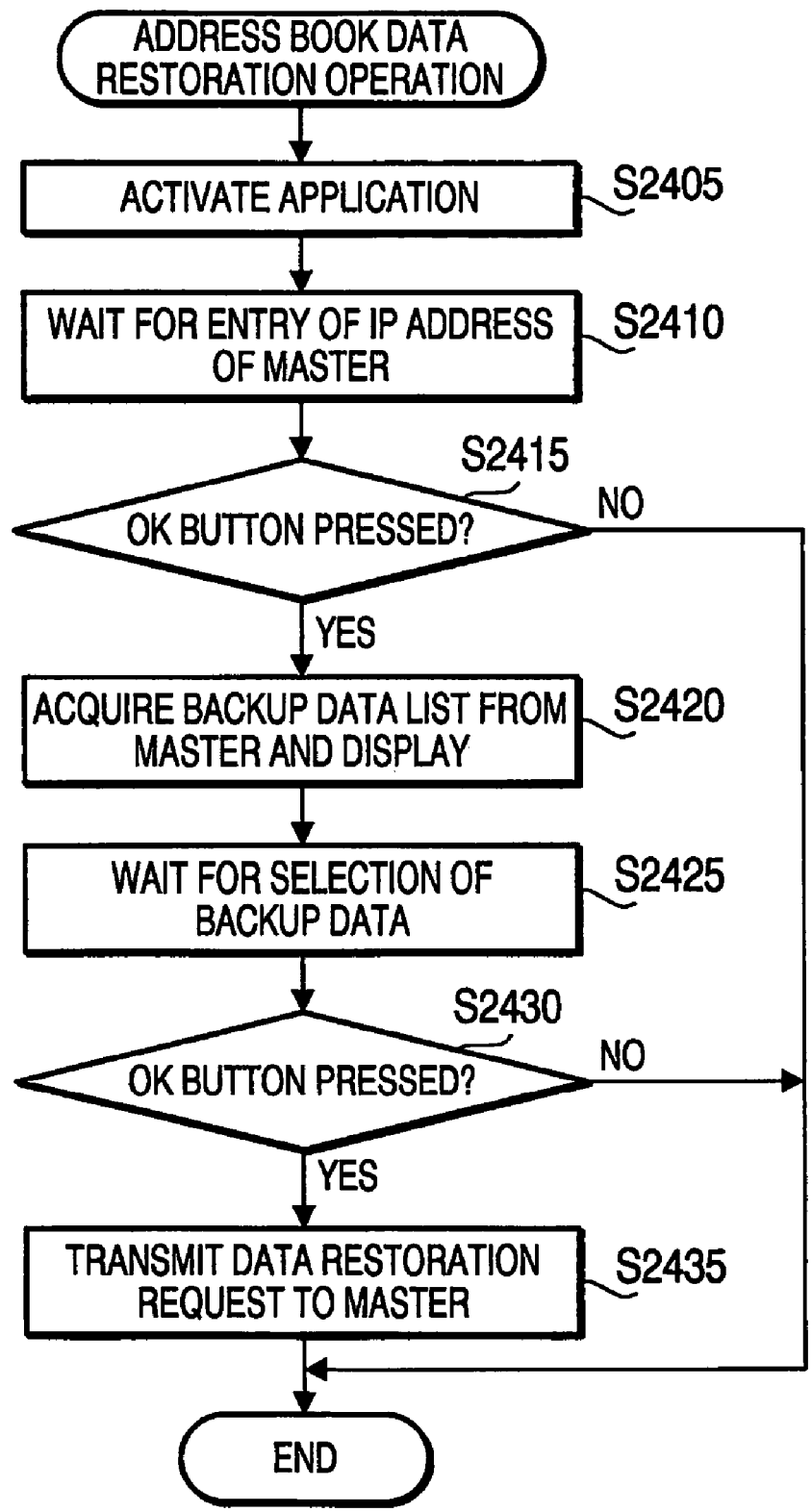
FIG. 22 is a flow chart showing a process executed by a PC of the network system for restoring updated address book data to that before the update by use of backup data according to at least one aspect of the invention.

Next, a process executed by the PC 1 for restoring updated address book data to that before the update by use of the aforementioned backup data will be explained referring to a flow chart of FIG. 22. This process is executed when a prescribed operation (e.g. clicking an icon or menu item with the pointing device for activating a program) is performed by the user of the PC 1.

Figure 23A:
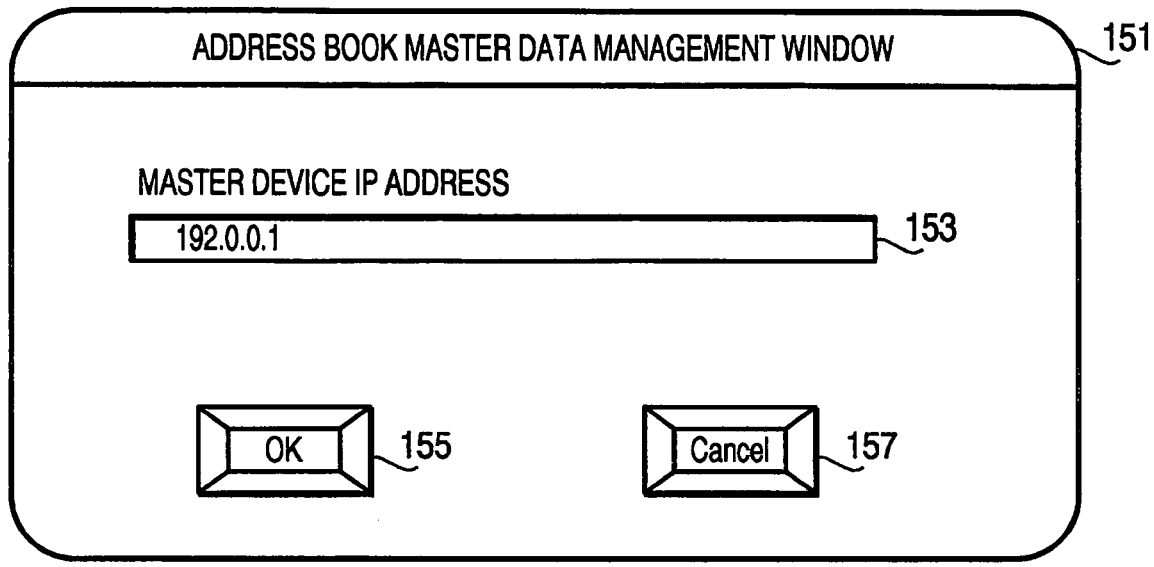
FIG. 23A is an explanatory drawing showing an address book master data management window displayed by the PC according to at least one aspect of the invention.

The PC 1 starting this process activates an application (S2405) and thereby displays an address book master data management window 151 (see FIG. 23A) on the display unit 106 to wait for an entry of an IP address (S2410). In this state, the user can enter the IP address of the master device in a master device IP address entry box 153 of the address book master data management window 151 and press (click with the pointing device) an OK button 155 or a cancel button 157 in the window.

When an entry is made by the user, the PC 1 exits from S2410 and thereafter checks whether the OK button 155 has been pressed (S2415). If the OK button 155 has not been pressed (S2415: NO), the PC 1, judging that the cancel button 157 has been pressed or a not shown different operation has been performed, ends the process of FIG. 22.

Figure 23B:
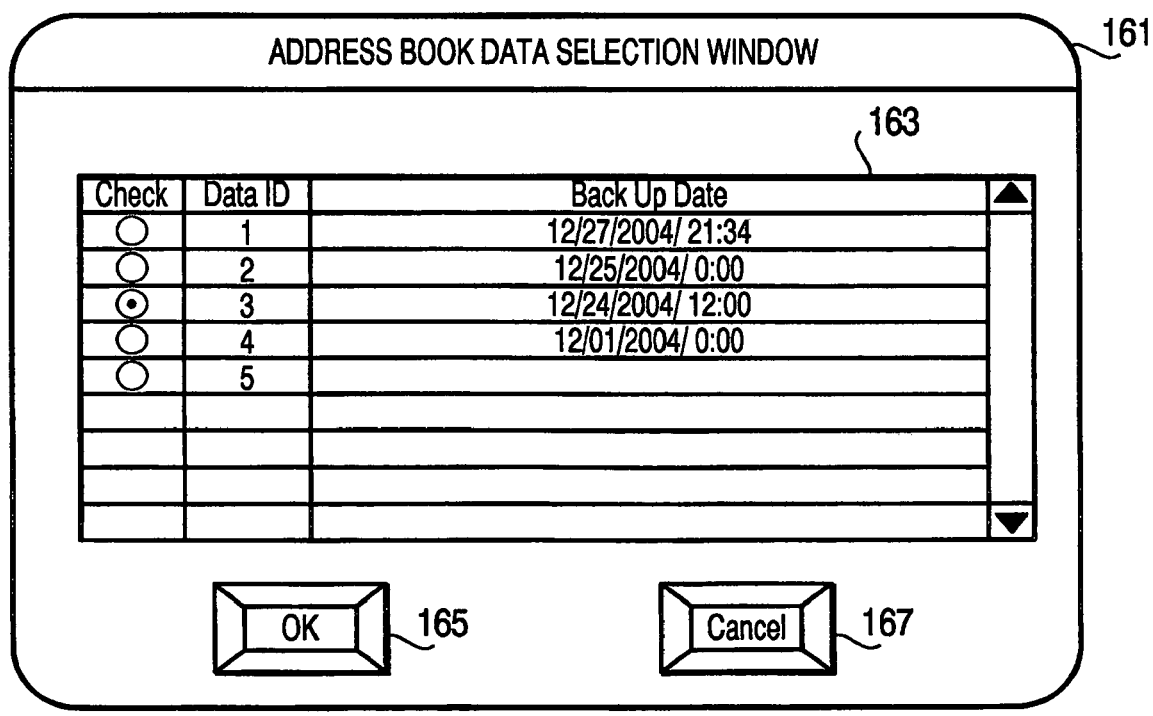
FIG. 23B is an explanatory drawing showing an address book data selection window displayed by the PC according to at least one aspect of the invention.

If the OK button 155 has been pressed (S2415: YES), the PC 1 acquires a backup data list from the master device and displays the list (S2420). Specifically, the PC 1 displays an address book data selection window 161 (see FIG. 23B) on the display unit 106. In a list display area 163 in the address book data selection window 161, a list of selectable backup data is displayed together with their backup dates.

After displaying the address book data selection window 161, the PC 1 waits for a selection of backup data (S2425). In this state, the user can select one of the backup data displayed in the list display area 163 of the address book data selection window 161 and press an OK button 165 or a cancel button 167 in the window.

When a selection is made by the user, the PC 1 exits from S2425 and thereafter checks whether the OK button 165 has been pressed (S2430). If the OK button 165 has not been pressed (S2430: NO), the PC 1, judging that the cancel button 167 has been pressed or a not shown different operation has been performed, ends the process of FIG. 22.

If the OK button 165 has been pressed (S2430: YES), the PC 1 transmits a data restoration request to the master device (S2435) and ends the process of FIG. 22. The master device receiving the data restoration request executes a process corresponding to the data restoration request.

Next, the process which is executed by the device receiving the data restoration request of S2435 as the event handler for this receive event will be explained referring to a flow chart of FIG. 24.

The device starting this process checks whether its own operation parameter is "master" (S2605). If its own operation parameter is not "master" (S2605: NO), the device immediately ends the process. Therefore, in the state for functioning as a general device, the device executes no substantial process in the process of FIG. 24.

On the other hand, if its own operation parameter is "master" (S2605:YES), the device (master device) judges whether the backup data specified by the user exists in the device itself (S2610). As explained before, the "backup data" in this illustrative embodiment include multiple pieces of backup data accumulated in a storage area of the master device and multiple pieces of backup data each of which is stored respectively in a storage area of each of the general devices. When the latest backup data is generated, the same backup data is stored both in the storage area of the master device and in the storage area of a general device having the highest priority. However, there are cases where the backup data exists in the master device only or in another device only due to power off or shortage of remaining storage capacity of a device.

Therefore, when the specified backup data is judged to exist in itself (S2610: YES), the master device obtains the backup data from its own storage area (S2615). When the specified backup data is not judged to exist in itself (S2610: NO), the master device checks the location of the backup data and obtains the backup data from a managed device (S2620).

Figure 24:
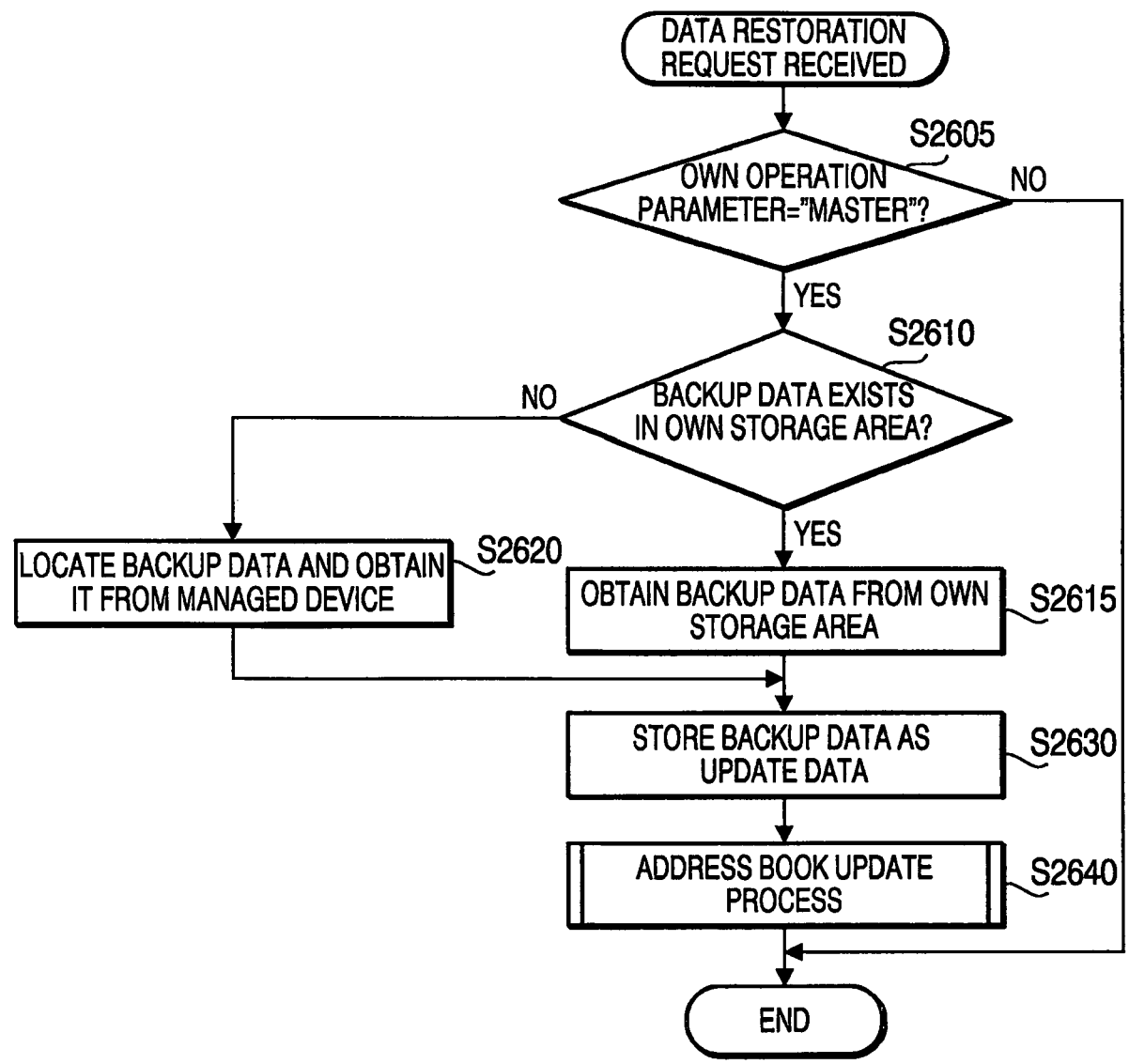
FIG. 24 is a flow chart showing a process executed by a device receiving data restoration request according to at least one aspect of the invention.

After obtaining the backup data from itself or another device, the master device stores the obtained backup data as update data (S2630), executes the address book update process (S2640), and ends the process of FIG. 24. The step S2640 is equivalent to the address book update process of FIG. 14 (S1205-S1220) and thus repeated explanation thereof is omitted here.

Concrete Example #1 of Operation of Network System

In the following, some examples of the operation of the network system implemented by the above processes will be explained in detail. In the following explanation, devices in accordance with at least one aspect of the present invention (image processing devices 3, 3, 5 and 5 in this illustrative embodiment) will be referred to as "devices 1, 2, 3 and 4" in order to avoid the complexity of the explanation.

First, a concrete example #1 will be explained.

Figure 25:
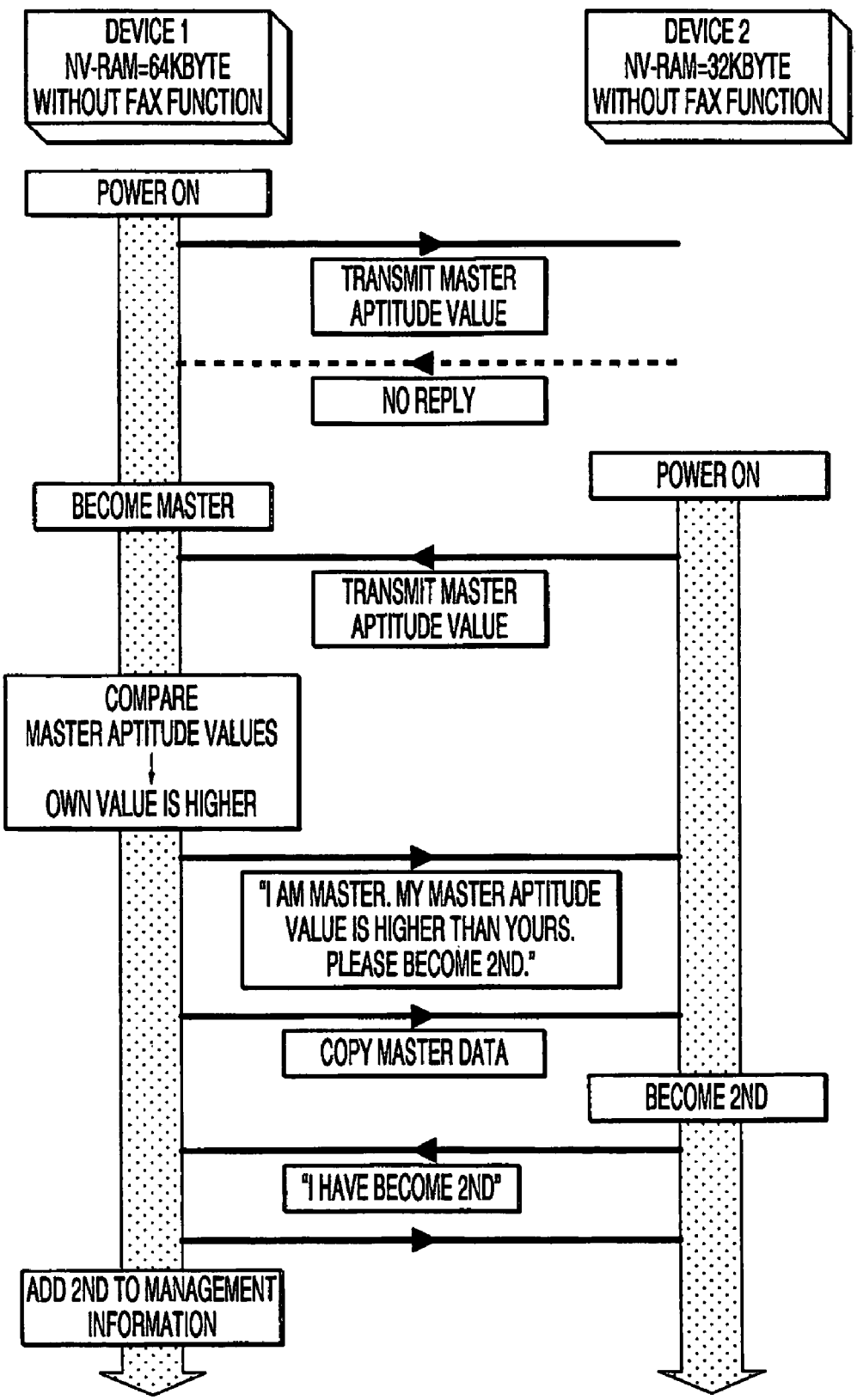
FIG. 25 is a timing chart showing a concrete example #1 of the operation of the network system according to at least one aspect of the invention.

FIG. 25 is a timing chart showing how the priority is determined and the master data is supplied to a device 2 that is newly connected to a network system including a device 1 functioning as the master device.

In the concrete example #1, the master aptitude value of the device 1 is 64 (nonvolatile RAM capacity=64, continuous operability index=1 (without the FAX function)) and that of the device 2 is 32 (nonvolatile RAM capacity=32, continuous operability index=1 (without the FAX function)).

When the power of the device 1 is turned ON first, the device 1 transmits (broadcasts) its own master aptitude value. Since no reply is returned from the network in response to the master aptitude value, the device 1 functions as the master device.

Thereafter, when another device 2 is turned ON, the device 2 transmits (broadcasts) its own master aptitude value. The device 1 receiving the master aptitude value makes the comparison of the master aptitude values. In this case, the device 1 judges that its own master aptitude value (=64) is higher than that of the device 2 (=32).

Consequently, the device 1 sends a message saying "I am the master device. My master aptitude value is higher than yours. Please become the second priority device." to the device 2. Further, the master data (address book data) stored in the device 1 (master device) is copied to the device 2. The device 2 becomes the second priority device and returns a message saying "I have become the second priority device." to the device 1. The device 1 receiving the message adds the second priority device to the management information.

Concrete Example #2 of Operation of Network System

Next, a concrete example #2 will be explained.

Figure 26:
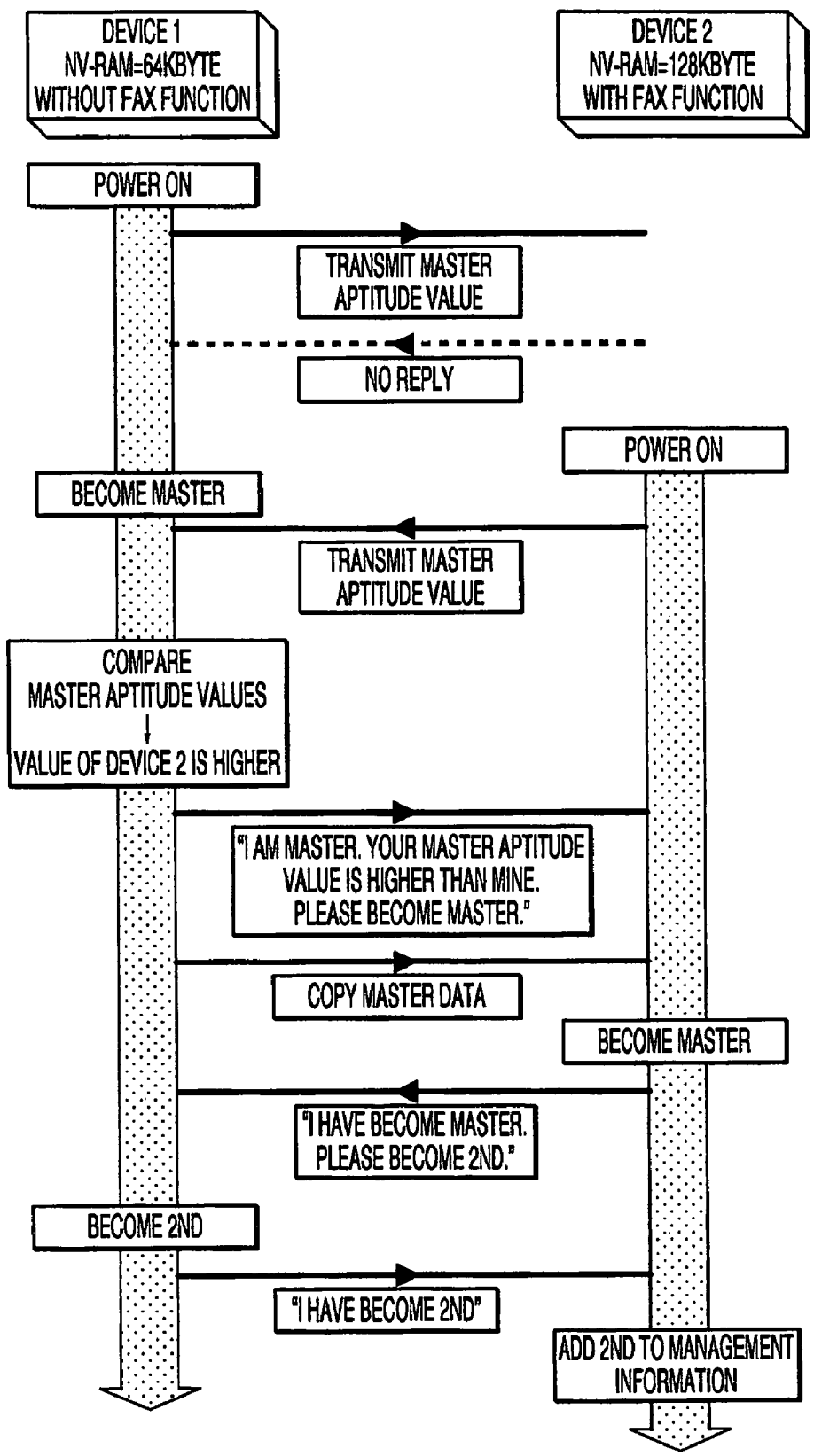
FIG. 26 is a timing chart showing a concrete example #2 of the operation of the network system according to at least one aspect of the invention.

FIG. 26 is a timing chart also showing how the priority is determined and the master data is supplied to a device 2 that is newly connected to a network system including a device 1 functioning as the master device.

In the concrete example #2, the master aptitude value of the device 1 is 64 (nonvolatile RAM capacity=64, continuous operability index=1 (without the FAX function)) and that of the device 2 is 256 (nonvolatile RAM capacity=128, continuous operability index=2 (with the FAX function)), differently from the concrete example #1. In short, the device 2 joining the network later has a higher master aptitude value.

When the power of the device 1 is turned ON first, the device 1 transmits (broadcasts) its own master aptitude value. Since no reply is returned from the network in response to the master aptitude value, the device 1 functions as the master device.

Thereafter, when another device 2 is turned ON, the device 2 transmits (broadcasts) its own master aptitude value. The device 1 receiving the master aptitude value makes the comparison of the master aptitude values. In this case, the device 1 judges that the master aptitude value of the device 2 (=256) is higher than that of itself (=64).

Consequently, the device 1 sends a message saying "I am the master device. Your master aptitude value is higher than mine. Please become the master device." to the device 2. Further, the master data (address book data) stored in the device 1 (master device) is copied to the device 2. The device 2 becomes the master device (device having the first priority) and returns a message saying "I have become the master device. Please become the second priority device." to the device 1. The device 1 receiving the message becomes the second priority device and returns a message saying "I have become the second priority device." to the device 2. The device 2 adds the second priority device to the management information.

As above, when a device having a higher priority joins the network later, replacement of the master device occurs according to the priorities of the devices.

Concrete Example #3 of Operation of Network System

Next, a concrete example #3 will be explained.

Figure 27:
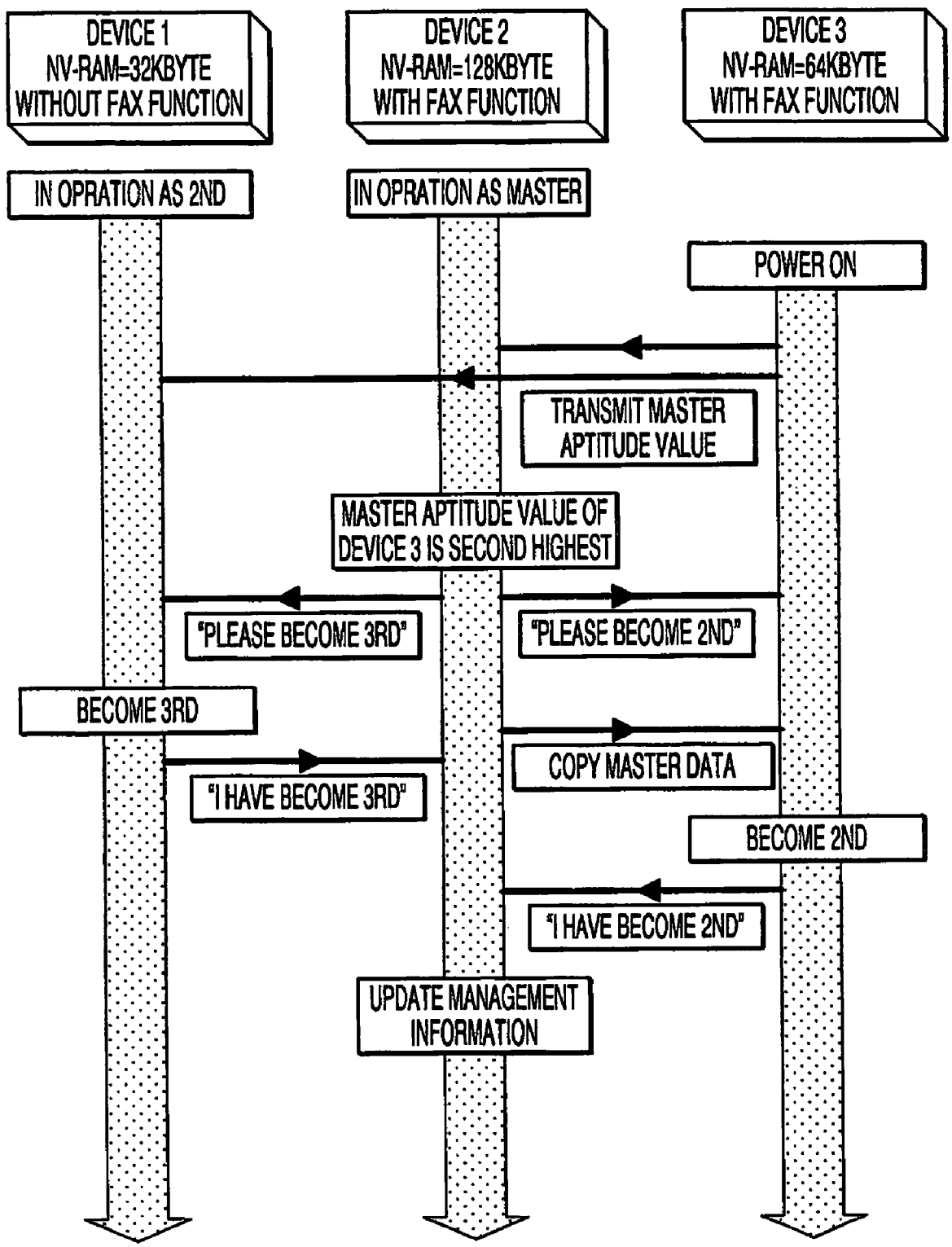
FIG. 27 is a timing chart showing a concrete example #3 of the operation of the network system according to at least one aspect of the invention.

FIG. 27 is a timing chart showing a case where a device 3 is newly connected to a network system including two devices 1 and 2 already in operation on the network.

In the concrete example #3, the master aptitude value of the device 1 is 32 (nonvolatile RAM capacity=32, continuous operability index=1 (without the FAX function)), that of the device 2 is 256 (nonvolatile RAM capacity=128, continuous operability index=2 (with the FAX function)), and that of the device 3 is 128 (nonvolatile RAM capacity=64, continuous operability index=2 (with the FAX function)).

When the power of the device 3 is turned ON, the device 3 transmits (broadcasts) its own master aptitude value. The device 2 (master device) receiving the master aptitude value makes the comparison of the master aptitude values. In this case where the master aptitude values of the devices 1, 2 and 3 are 32, 256 and 128, the device 2 judges that its own master aptitude value (=256) is the highest, while judging that the devices 3 and 1 are of the second and third priorities, respectively.

Consequently, the device 2 sends a message saying "Please become the second priority device." to the device 3 while transmitting a message saying "Please become the third priority device." to the device 1. Further, the master data (address book data) stored in the device 2 (master device) is copied to the device 3.

The device 3 becomes the second priority device and returns a message saying "I have become the second priority device." to the device 2. Meanwhile, the device 1 becomes the third priority device and returns a message saying "I have become the third priority device." to the device 2. The device 2 receiving the messages updates the management information accordingly.

As above, when a device having a higher priority joins the network later, a change in ordinal ranks occurs even among general devices according to the priorities of the devices.

Concrete Example #4 of Operation of Network System

Next, a concrete example #4 will be explained.

Figure 28:
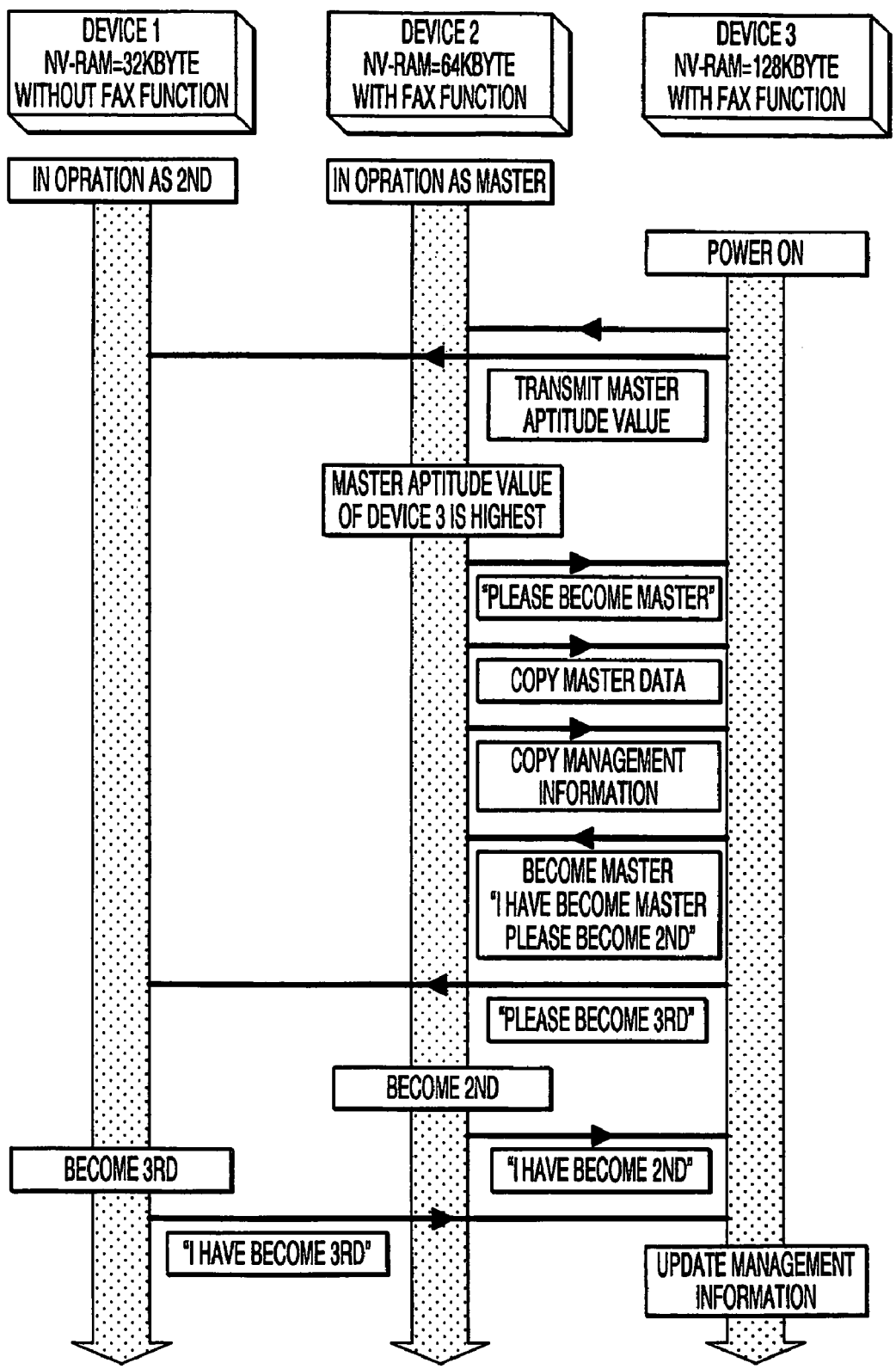
FIG. 28 is a timing chart showing a concrete example #4 of the operation of the network system according to at least one aspect of the invention.

FIG. 28 is a timing chart also showing a case where a device 3 is newly connected to a network system including two devices 1 and 2 already in operation on the network.

In the concrete example #4, the master aptitude value of the device 1 is 32 (nonvolatile RAM capacity=32, continuous operability index=1 (without the FAX function)), that of the device 2 is 128 (nonvolatile RAM capacity=64, continuous operability index=2 (with the FAX function)), and that of the device 3 is 256 (nonvolatile RAM capacity=128, continuous operability index=2 (with the FAX function)).

When the power of the device 3 is turned ON, the device 3 transmits (broadcasts) its own master aptitude value. The device 2 (master device) receiving the master aptitude value makes the comparison of the master aptitude values. In this case where the master aptitude values of the devices 1, 2 and 3 are 32, 128 and 256, the device 2 judges that the device 3 has the highest master aptitude value (=256).

Consequently, the device 2 sends a message saying "Please become the master device." to the device 3. Further, the master data (address book data) and the management information stored in the device 2 (master device) are copied to the device 3.

Subsequently, the device 3 returns a message saying "I have become the master device. Please become the second priority device." to the device 2, while transmitting a message saying "Please become the third priority device." to the device 1. In response to the message, the device 2 becomes the second priority device and returns a message saying "I have become the second priority device." to the device 3. Meanwhile, the device 1 becomes the third priority device and returns a message saying "I have become the third priority device." to the device 3. The device 3 receiving the messages updates the management information accordingly.

As above, when a device having the highest priority joins the network including devices in operation, replacement of the master device occurs and thereafter reassignment of ordinal ranks of general devices is carried out according to the priorities of the devices.

Concrete Example #5 of Operation of Network System

Next, a concrete example #5 will be explained.

Figure 29:
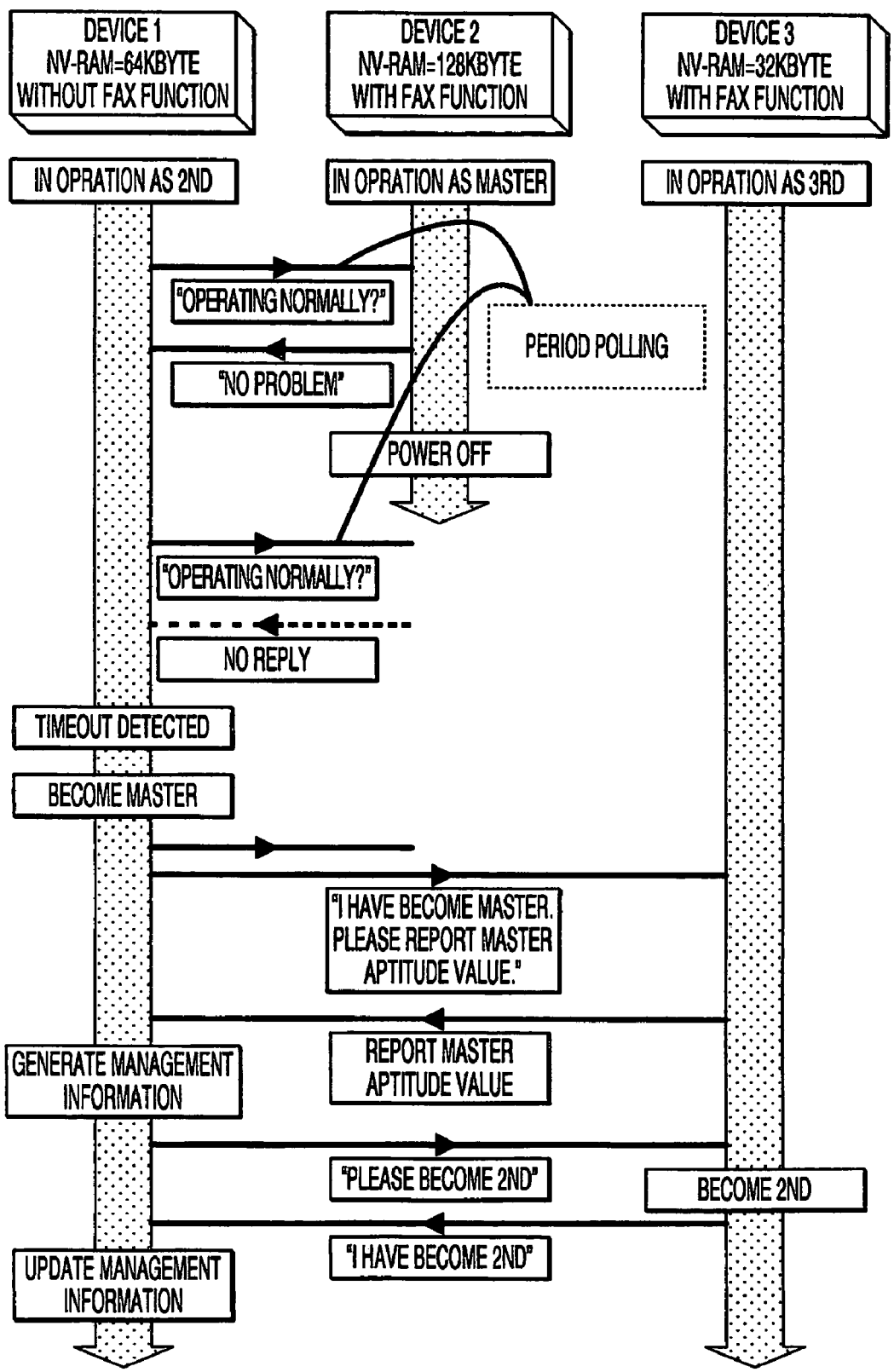
FIG. 29 is a timing chart showing a concrete example #5 of the operation of the network system according to at least one aspect of the invention.

FIG. 29 is a timing chart also showing a case where the power of a device 2 is suddenly turned OFF when three devices 1, 2, and 3 are in operation on the network.

In the concrete example #5, the master aptitude value of the device 1 is 128 (nonvolatile RAM capacity=128, continuous operability index=1 (without the FAX function)), that of the device 2 is 256 (nonvolatile RAM capacity=128, continuous operability index=2 (with the FAX function)), and that of the device 3 is 64 (nonvolatile RAM capacity=32, continuous operability index=2 (with the FAX function)).

When all the devices 1, 2 and 3 are in operation, the device 1 (as a general device having the highest priority) periodically transmits a polling message saying "Operating normally?" to the device 2 as the master device and receives a reply saying "No problem." from the device 2, by which the device 1 monitors the presence of the master device.

When the power of the master device 2 is suddenly turned OFF, no reply to the polling message from the device 1 is returned from the device 2. In this case, the device 1 starts functioning as the master device at the point when a timeout is detected, and transmits (broadcasts) a request saying "I have become the master device. Please report your master aptitude value." to all the devices.

The device 3 receiving the request reports its own master aptitude value to the device 1. The device 1 generates the management information based on the reported master aptitude value. According to the ordinal ranks in the generated management information, the device 1 transmits a message saying "Please become the second priority device." to the device 3. The device 3 receiving the message becomes the second priority device and returns a message saying "I have become the second priority device." to the device 1.

As above, when the master device suddenly becomes absent, a device having the next highest priority detects the absence of the master device and shifts into a state for functioning as the master device, by which the period with no master device in the system can be ended immediately.

Concrete Example #6 of Operation of Network System

Next, a concrete example #6 will be explained.

Figure 30:
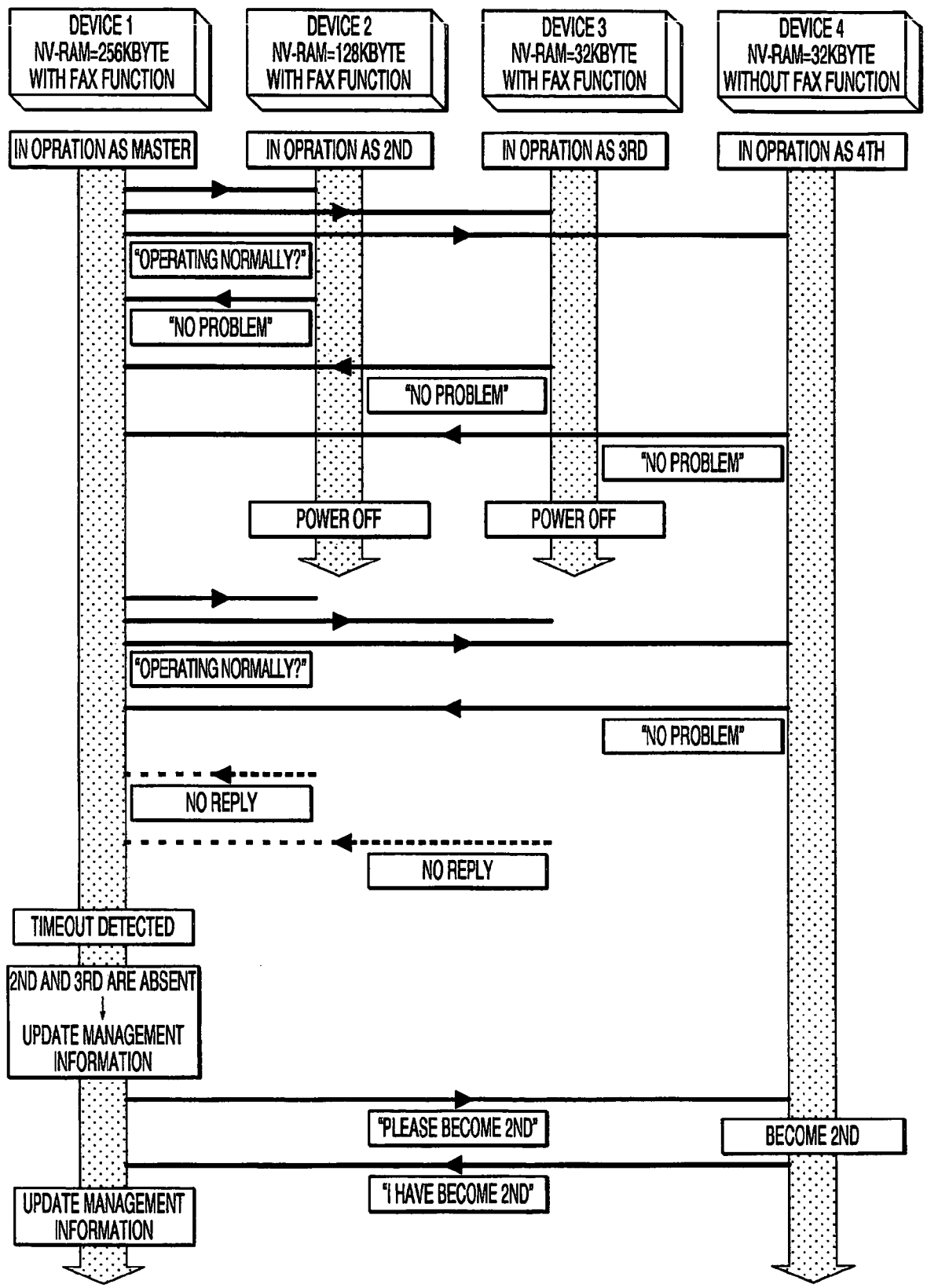
FIG. 30 is a timing chart showing a concrete example #6 of the operation of the network system according to at least one aspect of the invention.

FIG. 30 is a timing chart showing a case where devices 2 and 3 having the second and third priorities are suddenly turned OFF when four devices 1, 2, 3 and 4 are in operation on the network.

In the concrete example #6, the master aptitude values of the devices 1, 2, 3 and 4 are 512, 256, 64 and 32, respectively.

When all the devices 1, 2, 3 and 4 are in operation, the device 1 having the highest priority (master device) periodically transmits a polling message saying "Operating normally?" to all the general devices 2, 3 and 4 and receives replies saying "No problem." from the devices 2, 3 and 4, by which the device 1 monitors the presence of the general devices.

When the devices 2 and 3 are suddenly turned OFF, no reply to the polling message from the device 1 is returned from the device 2 or 3. In this case, the device 1 recognizes that the devices 2 and 3 are absent at the point when a timeout is detected, and updates the management information. According to the ordinal ranks in the updated management information, the device 1 transmits a message saying "Please become the second priority device." to the device 4. The device 4 receiving the message becomes the second priority device and returns a message saying "I have become the second priority device." to the device 1.

As above, when two or more general devices suddenly become absent, the management information is updated and the priorities are reassigned.

Concrete Example #7 of Operation of Network System

Next, a concrete example #7 will be explained.

Figure 31:
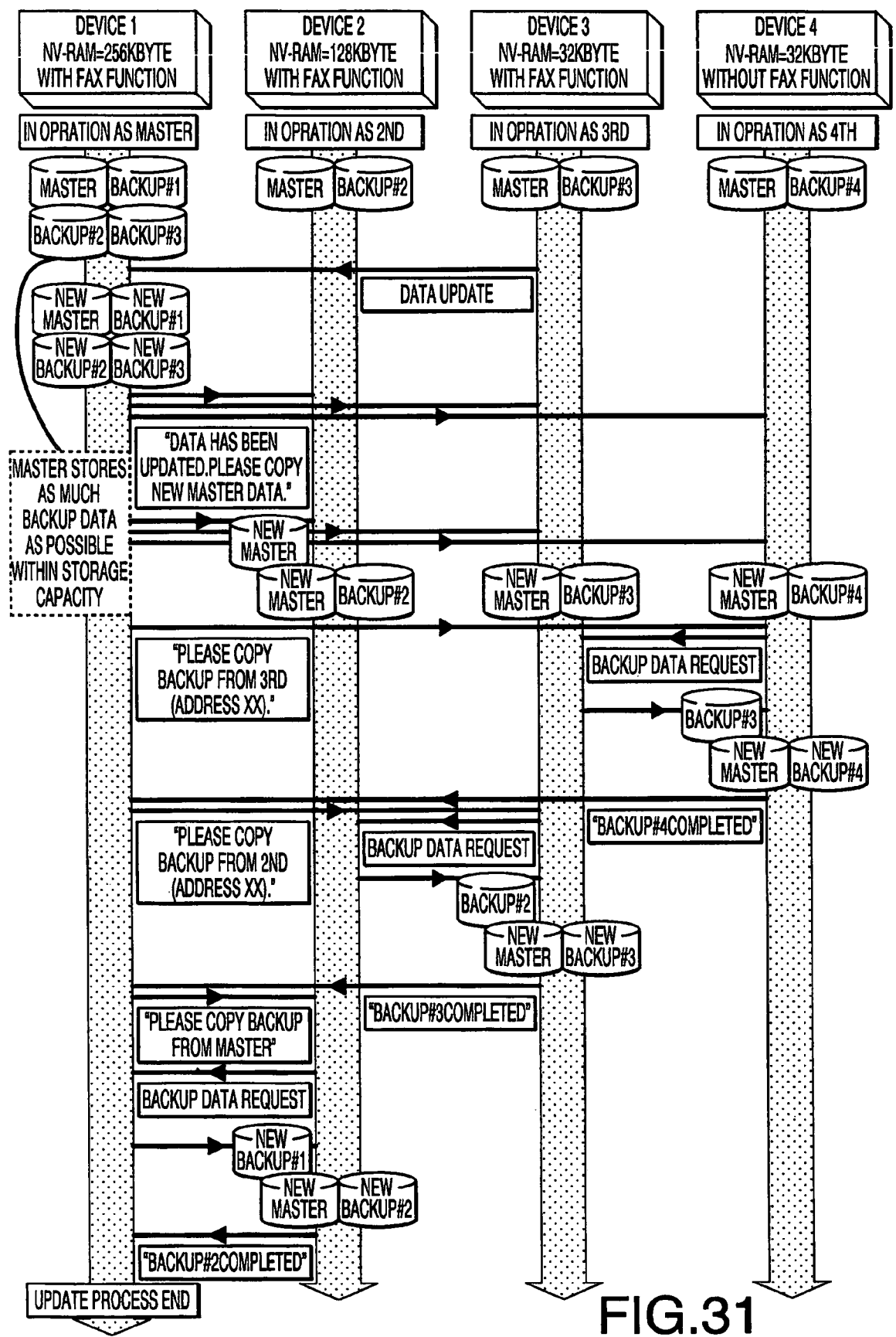
FIG. 31 is a timing chart showing a concrete example #7 of the operation of the network system according to at least one aspect of the invention.

FIG. 31 is a timing chart showing a case where the address book data is updated in the device 3 when four devices 1, 2, 3 and 4 are in operation on the network.

In the concrete example #7, the master aptitude values of the devices 1, 2, 3 and 4 are 512, 256, 64 and 32, respectively.

When the address book data is updated in the device 3, the device 3 transmits a data update request to the master device 1. The master device 1 receiving the data update request updates its own address book data (master data). The master device has been configured to store as much backup data as possible (within its storage capacity) in itself. In the example of FIG. 31, the master device 1 is capable of storing three backup data files. Therefore, the master device 1 deletes the oldest backup data #3, renames the former backup data #2 as (new) "backup data #3", renames the former backup data #1 as (new) "backup data #2", renames the former master data as (new) "backup data #1", and regards the updated master data as new master data.

After updating the master data as above, the master device 1 transmits a message saying "Data has been updated. Please copy new master data." to all the general devices 2, 3 and 4 and supplies the new master data to the general devices 2, 3 and 4.

Further, the master device 1 successively transmits instructions (requesting each device to copy backup data stored in a higher-level device (having an immediately higher priority) into the device) to the general devices 2, 3 and 4, starting from the device 4 of the lowest priority. In response to each instruction, the lowest priority device 4 first obtains former backup data #3 from the higher-level device 3 and stores it as new backup data #4 (by overwriting its own former backup data #4 with the obtained former backup data #3) and reports the backup completion to the master device 1. Subsequently, the device 3 obtains former backup data #2 from the higher-level device 2 and stores it as new backup data #3 (by overwriting its own former backup data #3 with the obtained former backup data #2) and reports the backup completion to the master device 1. Finally, the device 2 obtains former backup data #1 (new backup data #2) from the higher-level device (master device) 1 and stores it as new backup data #2 (by overwriting its own former backup data #2 with the obtained former backup data #1) and reports the backup completion to the master device 1.

By the above process, the update of the address book data and the storage of the backup data are completed.

Concrete Example #8 of Operation of Network System

Next, a concrete example #8 will be explained.

Figure 32:
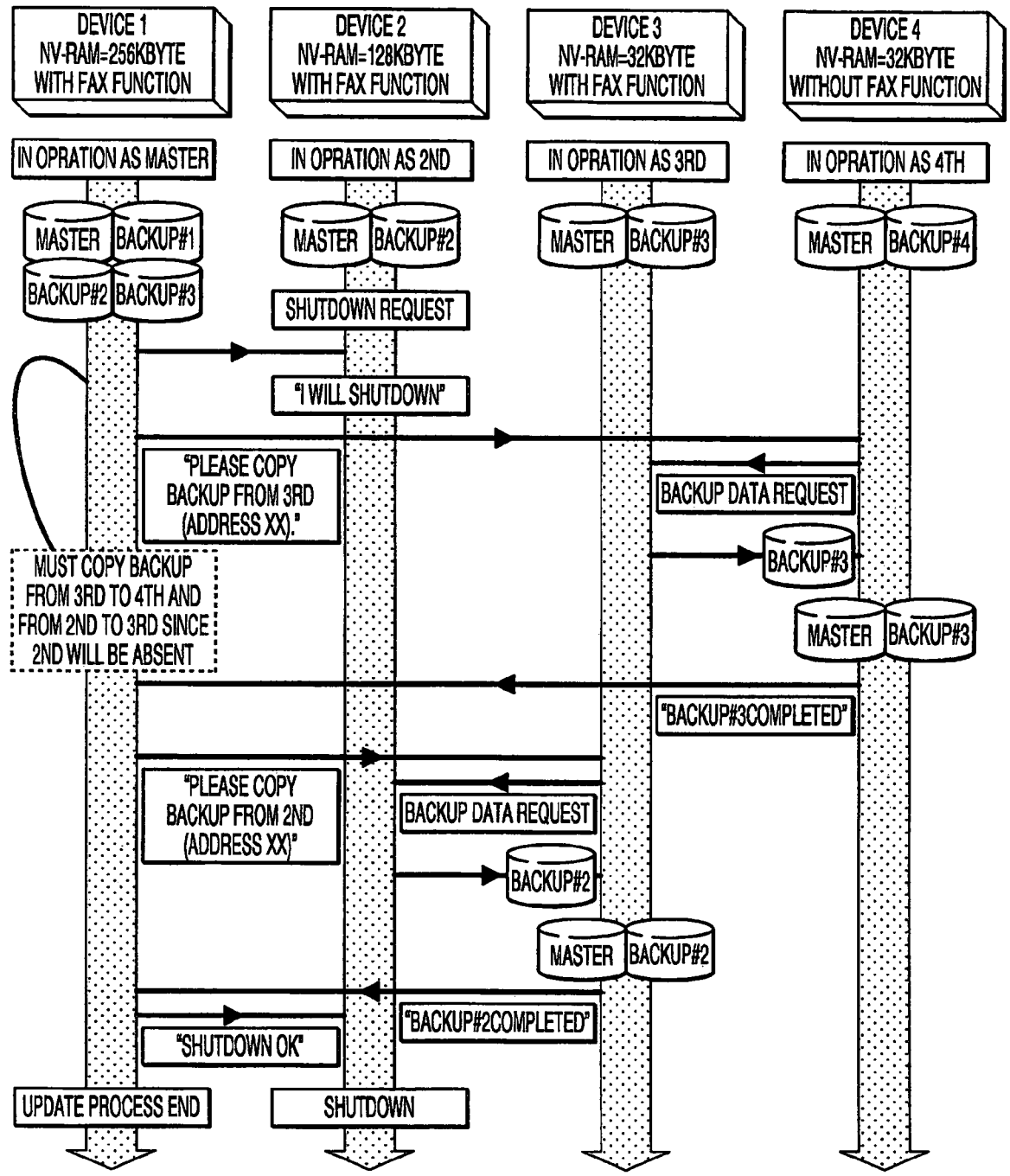
FIG. 32 is a timing chart showing a concrete example #8 of the operation of the network system according to at least one aspect of the invention.

FIG. 32 is a timing chart showing a case where the shutdown request is transmitted from the device 2 to the device 1 when four devices 1, 2, 3 and 4 are in operation on the network.

In the concrete example #8, the master aptitude values of the devices 1, 2, 3 and 4 are 512, 256, 64 and 32, respectively.

When a request for shutdown occurs in the device 2, the device 2 transmits the shutdown request saying "I will shut down." to the master device 1. The master device 1 receiving the shutdown request recognizes that the second priority device will be absent and thus the backup data of the third priority device has to be copied to the fourth priority device and the backup data of the second priority device has to be copied to the third priority device. In this case, the master device 1 successively transmits instructions (requesting each device to copy backup data stored in a higher-level device into the device) to the general devices 4 and 3 (from the lowest priority device 4 to the device 3 having an immediately lower priority than the sender of the shutdown request) starting from the lowest priority device 4. In response to each instruction, the lowest priority device 4 first obtains former backup data #3 from the higher-level device 3 and stores it as new backup data #4 (by overwriting its own former backup data #4 with the obtained former backup data #3) and reports the backup completion to the master device 1. Subsequently, the device 3 obtains former backup data #2 from the higher-level device 2 and stores it as new backup data #3 (by overwriting its own former backup data #3 with the obtained former backup data #2) and reports the backup completion to the master device 1.

By the above process, the backup data #3 stored in the device 3 (having an immediately higher priority than the device 4) is transferred to the device 4 and the backup data #2 stored in the device 2 (having an immediately higher priority than the device 3) is transferred to the device 3, by which the latest backup data stored in a device that is going to shut down (device 2) can be transferred to another device in operation (device 3).

Concrete Example #9 of Operation of Network System

Figure 33:
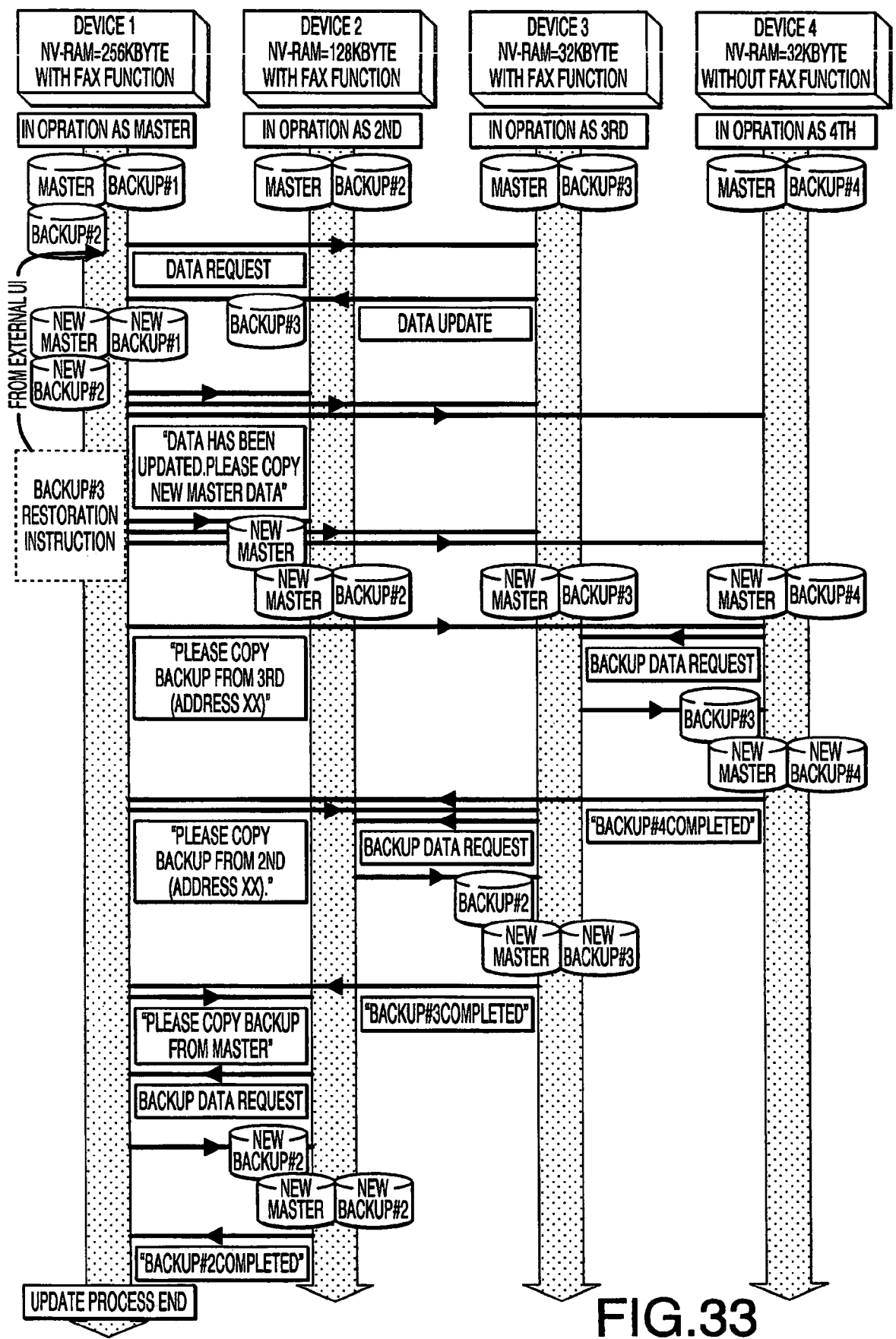
FIG. 33 is a timing chart showing a concrete example #9 of the operation of the network system according to at least one aspect of the invention.

FIG. 33 is a timing chart showing a case where an operation for restoring the master data to the backup data #3 is performed by the user when four devices 1, 2, 3 and 4 are in operation on the network.

In the concrete example #9, the master aptitude values of the devices 1, 2, 3 and 4 are 512, 256, 64 and 32, respectively. In the example of FIG. 33, the master device 1 is capable of storing two backup data files (backup data #1 and backup data #2).

When an operation for restoring the master data to the backup data #3 is performed by the user of the PC and an instruction requesting such restoration is transmitted from the PC to the master device 1, the master device 1 not storing the backup data #3 transmits a data request (requesting the backup data #3) to the device 3 storing the backup data #3. In response to the data request, the device 3 transmits the backup data #3 to the master device 1.

The master device 1 receiving the backup data #3 deletes the oldest backup data #2, renames the former backup data #1 as (new) "backup data #2", renames the former master data as (new) "backup data #1", and regards the backup data #3 received from the device 3 as After updating (restoring) the master data as above, the master device 1 transmits a message saying "Data has been updated. Please copy new master data." to all the general devices 2, 3 and 4 and supplies the new master data to the general devices 2, 3 and 4.

Further, the master device 1 successively transmits instructions (requesting each device to copy backup data stored in a higher-level device into the device) to the general devices 2, 3 and 4, starting from the device 4 of the lowest priority. In response to each instruction, the lowest priority device 4 first obtains former backup data #3 from the higher-level device 3 and stores it as new backup data #4 (by overwriting its own former backup data #4 with the obtained former backup data #3) and reports the backup completion to the master device 1. Subsequently, the device 3 obtains former backup data #2 from the higher-level device 2 and stores it as new backup data #3 (by overwriting its own former backup data #3 with the obtained former backup data #2) and reports the backup completion to the master device 1. Finally, the device 2 obtains former backup data #1 (new backup data #2) from the higher-level device (master device) 1 and stores it as new backup data #2 (by overwriting its own former backup data #2 with the obtained former backup data #1) and reports the backup completion to the master device 1.

By the above process, the update of the address book data (restoration of the master data) and the storage of the backup data are completed.

Concrete Example #10 of Operation of Network System

Next, a concrete example #10 will be explained.

Figure 34:
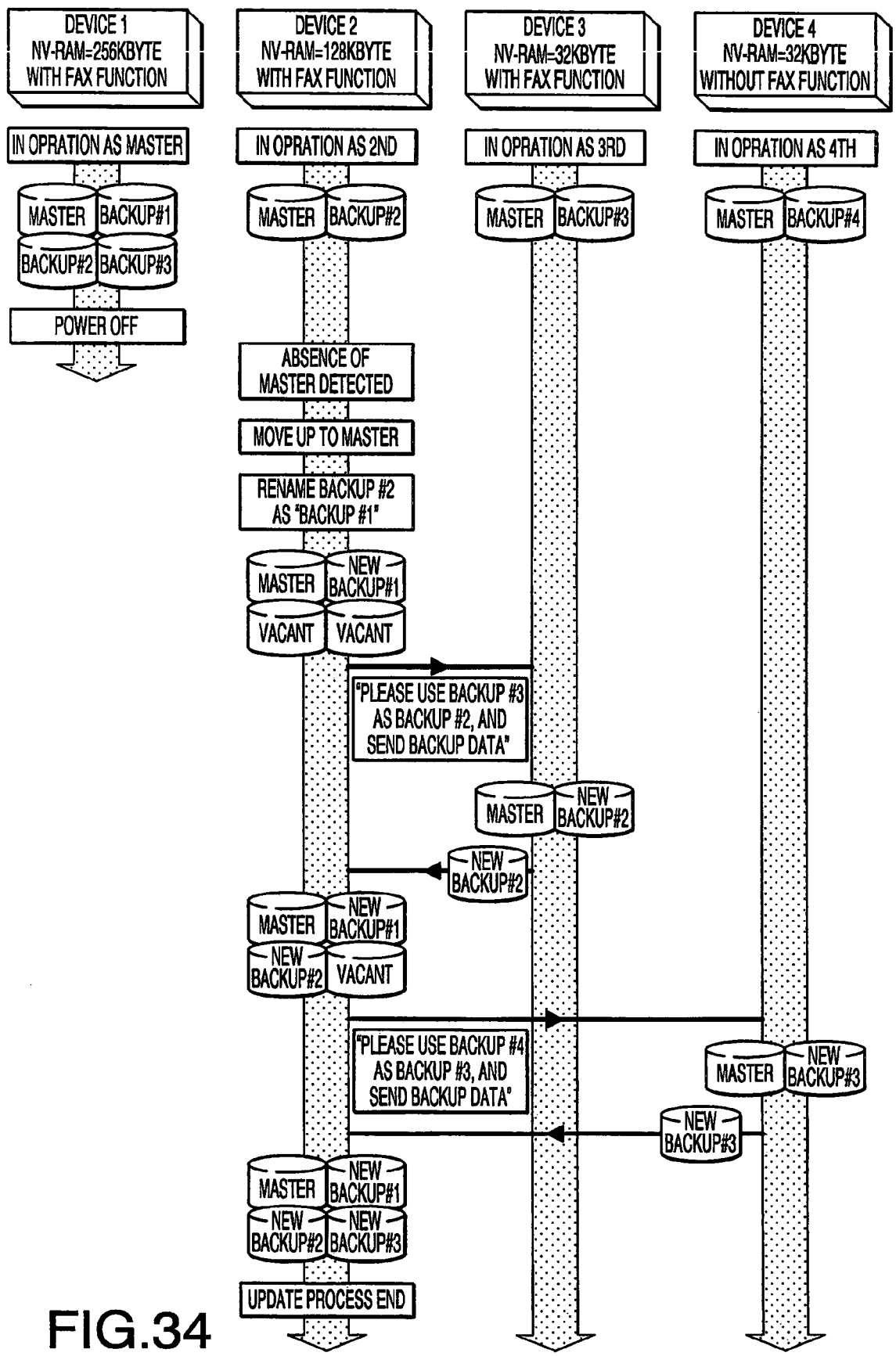
FIG. 34 is a timing chart showing a concrete example #10 of the operation of the network system according to at least one aspect of the invention.

FIG. 34 is a timing chart showing how the backup data are transferred when the master device 1 stops its operation when four devices 1, 2, 3 and 4 are in operation on the network.

In the concrete example #10, the master aptitude values of the devices 1, 2, 3 and 4 are 512, 256, 64 and 32, respectively.

When the master device 1 stops its operation, the device 2 of the next priority detects the absence of the master device 1 and moves up to the master device. In this case, the device 2 (storing the master data and the backup data #2 therein) renames the backup data #2 as new "backup data #1". The device 2 further requests lower-level devices 3 and 4 to send back their backup data #3 and #4. When the backup data #3 and #4 are received from the devices 3 and 4, the device 2 stores the received backup data #3 and #4 as new backup data #2 and #3, respectively.

Consequently, the device 2, which had stored the master data and the backup data #2 only at the point when the master device 1 stopped its operation, can store three pieces of new backup data #1, #2 and #3 when moving up to the master device.

Concrete Example #11 of Operation of Network System

Next, a concrete example #11 will be explained.

Figure 35:
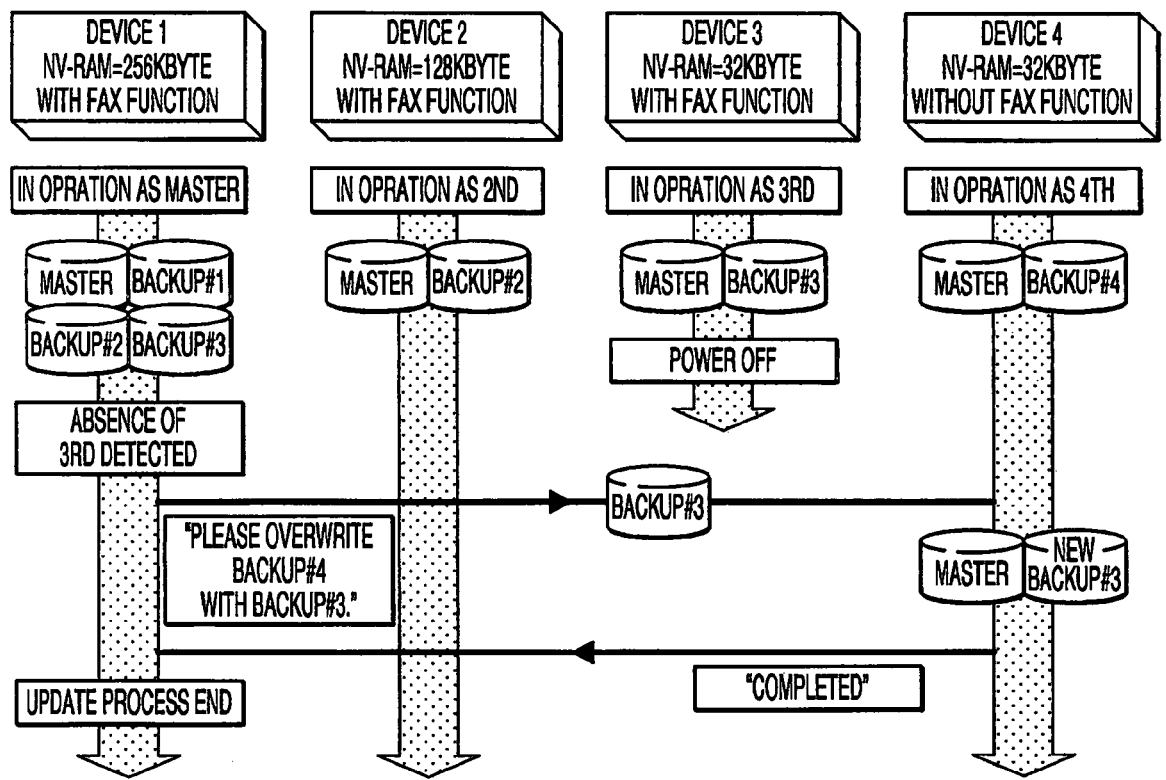
FIG. 35 is a timing chart showing a concrete example #11 of the operation of the network system according to at least one aspect of the invention.

FIG. 35 is a timing chart showing how the backup data are transferred when the general device 3 stops its operation when four devices 1, 2, 3 and 4 are in operation on the network.

In the concrete example #11, the master aptitude values of the devices 1, 2, 3 and 4 are 512, 256, 64 and 32, respectively.

When the general device 3 stops its operation, the master device 1 detects the absence of the device 3. In this case, the master device 1 has the backup data #3 (stored in the device 3) therein and the backup data #3 is newer backup data than the backup data #4 stored in the device 4. Therefore, the master device 1 instructs the device 4 to overwrite its backup data #4 with the backup data #3 transferred from the master device 1.

The device 4 receives the backup data #3 from the master device 1, overwrites its own backup data #4 with the received backup data #3, and reports the completion of overwriting to the master device 1.

By the above process, the backup data distributed and stored in the general devices can be managed so as to realize the storage of newer backup data.

While a description has been given above of an illustrative embodiment in accordance with at least one aspect of the present invention, the present invention is not to be restricted by the particular illustrative embodiment and a variety of modifications, design changes, etc. are possible without departing from the scope and spirit of the present invention described in the appended claims.

For example, while the address book data is used as the shared data supplied from the master device to the general devices in the above illustrative embodiment, in at least one aspect the present invention is applicable to any type of shared data as long as the data is shared by devices on a network. Specifically, the shared data may include device setting data to be set to devices in common, the name or mail address of a manager (administrator) and condition information to be reported to the manager in cases where devices are managed by the same manager, a mail server address and a name server address generally used in common in a network, etc. By supplying such shared data from the master device to the general devices, the troublesome task of inputting such data to each of the general devices can be eliminated.

While the master aptitude value is obtained by multiplying the nonvolatile memory capacity (nonvolatile RAM capacity) and the continuous operability index together in the above illustrative embodiment, the calculating formula of the master aptitude value may be modified arbitrarily depending on performance required of the master device. For example, it is desirable to calculate the master aptitude value using at least one of the following parameters (including those used in the above illustrative embodiment):

(a) nonvolatile RAM capacity (Kbyte) (High nonvolatile memory capacity is suitable for backup.)

(b) HDD capacity (Kbyte) (High HDD capacity is also suitable for backup.)

(c) continuous operability index (2: with the FAX function, 1: without the FAX function) (Low probability of power off is suitable for the master device.)

(d) CPU clock rate (MHz) (High processing speed is suitable for the master device.)

(e) RAM capacity (Mbyte) (High calculation speed is suitable for the master device.)

(f) network I/F bit rate (bps) (A high bit rate of the network I/F is suitable for mass data communication between devices avoiding a bottleneck caused by the network I/F.)

(g) shipping date (year) (A newer product generally has higher performance when the functions and the price range are the same.)

The above parameters (a)-(g) can be used for the calculation of the master aptitude value while properly adjusting the combination of parameters, the weight of each parameter in the formula, etc. depending on factors to be emphasized, or properly combining multiplication, addition, etc. For example, while a master aptitude value $(p)=(a)\times(c)$ is employed in the above illustrative embodiment, a formula $(p)=((a)+(b))\times(c)$ may be used when the backup data are stored also in the HDD. When the RAM capacity is taken into consideration, a formula $(p)=((a)+(e)/2)\times(c)$ or $(p)=((a)+(e)-2000)\times(c)$ may be employed, for example.

What is claimed is:

1. A network system comprising:
   a plurality of devices connected to a network, each of the devices is assigned an ordinal rank in the system in which one of the devices with highest ordinal rank functions as a master device and other devices of the devices with other ordinal ranks function as general devices, wherein each of the other devices includes:

a master device checking unit configured to operate when one of the other devices is functioning as one of the general devices check whether the one of the devices functioning as the master device exists in the system;

a control unit configured to control the one of the other devices to function as the master device when an ordinal rank of the one of the other devices is judged to be highest in the system; and a priority reassigning unit configured to reassign the other ordinal ranks of the each of the other devices connected to the network when the one of the other devices has a higher ordinal rank than the master device in the system, wherein the reassigning the other ordinal ranks further includes updating the ordinal rank of the each of the devices connected to the network based on a corresponding master aptitude value.

2. The network system according to claim 1, wherein:

the each of the other devices further includes a master device communication information storing unit configured to store master device communication information for communicating with the one of the devices functioning as the master device, and the master device checking unit checks whether the one of the devices functioning as the master device exists in the system by communicating with the one of the devices functioning as the master device according the master device communication information stored in the master device communication information storing unit.

3. The network system according to claim 2, wherein the each of the other devices further includes a master device communication information supplying unit configured to operate when the one of the devices is functioning as the master device to supply the master device communication information to devices functioning as general devices.

4. The network system according to claim 1, wherein:

the each of the other devices further includes a higher-level device checking unit configured to operate when the one of the devices is functioning as one of the general devices to check whether a higher-level device of an immediately higher ordinal rank than the device itself exists in the system, and the master device checking unit checks whether the one of the devices functioning as the master device exists in the system when the higher-level device is not found to exist in the system by the higher-level device checking unit.

5. The network system according to claim 4, wherein:

the each of the other devices further includes a higher-level device communication information storing unit configured to store higher-level device communication information for communicating with the higher-level device, and the higher-level device checking unit checks whether the higher-level device exists in the system by communicating with the higher-level device according to the higher-level device communication information stored in the higher-level device communication information storing unit.

6. The network system according to claim 5, wherein the each of the other devices further includes a higher-level device communication information supplying unit configured to operate when the one of the devices is functioning as the master device to supply the higher-level device communication information to devices functioning as general devices.

7. The network system according to claim 1, wherein:

the system is configured so that data to be shared by the plurality of devices is supplied from the master device to the general devices, and the each of the other devices further includes a shared data generating unit which generates the shared data when the one of the devices is shifted from a state for functioning as a general device to a state for functioning as the master device by the first control unit.

8. The network system according to claim 7, wherein:

the each of the other devices further includes a shared data storing unit configured to operate when the one of the devices is functioning as a general device to store the shared data supplied from the device functioning as the master device, and the shared data generating unit generates the shared data based on the shared data stored in the shared data storing unit.

9. The network system according to claim 1, wherein the each of the other devices further includes:

an ordinal rank determining unit configured to operate when the one of the devices is functioning as the master device to determine the ordinal rank of the each of the other devices in the system based on characteristic information representing characteristics of the each of the other devices in the system;

a master replacement reporting unit configured to operate when the one of the devices is functioning as the master device to report to a higher-level device of an ordinal rank higher than the one of the devices that the higher-level device should function as the master device when the each of the other devices ranked by the ordinal rank determining unit include such a higher-level device; and a second control unit configured to control the one of the devices to function as the master device when the report indicating that the one of the devices itself should function as the master device is received from a current master device while the one of the devices is functioning as a general device.

10. The network system according to claim 9, wherein the each of the other devices further includes:

a characteristic information acquiring unit configured to operate when the one of the devices is functioning as the master device to acquire the characteristic information from the other devices in the system; and a characteristic information supplying unit configured to operate when the one of the devices is functioning as a device to the characteristic information to the master device.

11. The network system according to claim 10, wherein:

the characteristic information supplying unit supplies the characteristic information to the master device when the one of the devices joins the network and functions as a general device, and the ordinal rank determining unit determines the ordinal rank of the each one of the devices in the system when the characteristic information is acquired from the devices in the system by the characteristic information acquiring unit while the one of the devices is functioning as the master device, based on the acquired characteristic information.

12. The network system according to claim 9, wherein:
the system is configured so that data to be shared by the plurality of devices is supplied from the master device to the general devices, and
the each of the devices further includes a shared data transferring unit configured to transfer the shared data to a higher-level device of an ordinal rank higher than the one of the devices when the devices ranked by the ordinal rank determining unit include such a higher-level device.

13. The network system according to claim 1, wherein the each of the devices further includes:
an ordinal rank determining unit configured to operate when the one of the devices functioning as the master device to determine the ordinal rank of the each one of the devices in the system based on characteristic information representing characteristics of the each one of the devices in the system;
an ordinal rank reporting unit configured to report the ordinal rank to the each one of the devices when the ordinal rank is determined by the ordinal rank determining unit; and
a third control unit configured to control the one of the devices to function as a general device when the report indicating the ordinal rank is received from a different device while the one of the devices is functioning as the master device.

14. The network system according to claim 13, wherein the each of the devices further includes:
a characteristic information acquiring unit configured to operate when the one of the devices is functioning as the master device to acquire the characteristic information from the other devices in the system; and
a characteristic information supplying unit configured to operate when the one of the devices is functioning as a general device to supply the characteristic information to the master device.

15. The network system according to claim 14, wherein:
the characteristic information supplying unit supplies the characteristic information to the master device when the device joins the network and functions as a general device, and
the ordinal rank determining unit determines the ordinal rank of the each one of the devices in the system when the characteristic information is acquired from the devices in the system by the characteristic information acquiring unit while the one of the devices is functioning as the master device, based on the acquired characteristic information.

16. The network system according to claim 13, wherein:
the system is configured so that data to be shared by the plurality of devices is supplied from the master device to the general devices, and
the each one of the devices further includes a shared data transferring unit configured to transfer the shared data to a higher-level device of an ordinal rank higher than the each one of the devices when the other devices ranked by the ordinal rank determining unit include such a higher-level device.

17. The network system according to claim 1, wherein:
the system is configured so that data to be shared by the plurality of devices is supplied from the master device to the general devices,
the each one of the devices is a communication device having a function of transmitting data to a destination specified by address data, and
the shared data is address book data including the address data.

18. A network system comprising:
a plurality of devices connected to a network, each of the devices is assigned an ordinal rank in the system in which one of the devices with highest ordinal rank functions as a master device and other devices of the devices with other ordinal ranks function as general devices, wherein each of the other devices includes:
an ordinal rank determining unit configured to operate when the one of the devices is functioning as the master device to determine the ordinal rank of the each one of the devices in the system based on characteristic information representing characteristics of the each one of the devices in the system;
a master replacement reporting unit configured to operate when the one of the devices is functioning as the master device to report to a higher-level device of an ordinal rank higher than one of the devices that the higher-level device should function as the master device when the devices ranked by the ordinal rank determining unit include such a higher-level device;
a control unit configured to control the one of the devices to function as the master device when the report indicating that the one of the devices itself should function as the master device is received from a master device while the one of the devices is functioning as a general device, and
a priority reassigning unit configured to reassign the other ordinal ranks of the each of the other devices connected to the network when the report indicates that the each of the other devices itself should function as the master device is received from the current master device while the one of the devices is functioning as a general device, wherein the reassigning the other ordinal ranks further includes updating the ordinal rank of the each of the devices connected to the network based on a corresponding master aptitude value.

19. The network system according to claim 18, wherein the each of the other devices further includes:
a characteristic information acquiring unit configured to operate when the one of the devices is functioning as the master device to acquire the characteristic information from the other devices in the system; and
a characteristic information supplying unit configured to operate when the one of the devices is functioning as a general device to supply the characteristic information to the master device.

20. The network system according to claim 19, wherein:
the characteristic information supplying unit supplies the characteristic information to the master device when the one of the devices joins the network and functions as a general device, and
the ordinal rank determining unit determines the ordinal rank of the each one of the devices in the system when the characteristic information is acquired from the other devices in the system by the characteristic information acquiring unit while the one of the devices is functioning as the master device, based on the acquired characteristic information.

21. The network system according to claim 18, wherein:
the system is configured so that data to be shared by the plurality of devices is supplied from the master device to the general devices, and
the each of the other devices further includes a shared data transferring unit configured to transfer the shared data to a higher-level device of an ordinal rank higher than the one of the devices when the other devices ranked by the ordinal rank determining unit include such a higher-level device.

22. The network system according to claim 18, wherein:
the system is configured so that data to be shared by the plurality of devices is supplied from the master device to the general devices, and
the each of the other devices further includes a shared data acquiring unit configured to operate when the one of the devices is shifted from a state for functioning as a general device to a state for functioning as the master device to acquire the shared data from another one of the devices functioning as the master device until the shift.

23. The network system according to claim 18, wherein:
the system is configured so that data to be shared by the plurality of devices is supplied from the master device to the general devices,
the each of the other devices is a communication device having a function of transmitting data to a destination specified by address data, and
the shared data is address book data including the address data.

24. A network system comprising:
a plurality of devices connected to a network, each of the devices is assigned an ordinal rank in the system in which one of the devices of the highest ordinal rank functions as a master device and other devices of the devices with other ordinal ranks function as general devices, wherein each of the other devices includes:
an ordinal rank determining unit configured to operate when the one of the devices is functioning as the master device to determine the ordinal rank of the each one of the devices in the system based on characteristic information representing characteristics of the each one of the devices in the system;
an ordinal rank reporting unit configured to report the ordinal rank to the each one of the devices when the ordinal rank is determined by the ordinal rank determining unit;
a control unit configured to control the one of the devices to function as a general device when the report indicating the ordinal rank is received from a different device while the one of the devices is functioning as the master device, and
a priority reassigning unit configured to reassign the other ordinal ranks of the each of the other devices connected to the network when the one of the devices has a higher ordinal rank than the existing master device in the system, wherein the reassigning the other ordinal ranks further includes updating the ordinal rank of the each of the devices connected to the network based on a corresponding master aptitude value.

25. The network system according to claim 24, wherein the each of the other devices further includes:
a characteristic information acquiring unit configured to operate when the one of the devices is functioning as the master device to acquire the characteristic information from the other devices in the system; and
a characteristic information supplying unit configured to operate when the one of the devices is functioning as a general device to supply the characteristic information to the master device.

26. The network system according to claim 25, wherein:
the characteristic information supplying unit supplies the characteristic information to the master device when the one of the devices joins the network and functions as a general device, and
the ordinal rank determining unit determines the ordinal rank of the each one of the devices in the system when the characteristic information is acquired from the other devices in the system by the characteristic information acquiring unit while the one of the devices is functioning as the master device, based on the acquired characteristic information.

27. The network system according to claim 24, wherein:
the system is configured so that data to be shared by the plurality of devices is supplied from the master device to the general devices, and
the each of the other further includes a shared data transferring unit configured to transfer the shared data to a higher-level device of an ordinal rank higher than the one of the devices when the other devices ranked by the ordinal rank determining unit include such a higher-level device.

28. The network system according to claim 24, wherein:
the system is configured so that data to be shared by the plurality of devices is supplied from the master device to the general devices, and
the each of the other devices further includes a shared data acquiring unit configured to operate when the one of the devices is shifted from a state for functioning as a general device to a state for functioning as the master device to acquire the shared data from another one of the devices functioning as the master device until the shift.

29. The network system according to claim 24, wherein:
the system is configured so that data to be shared by the plurality of devices is supplied from the master device to the general devices,
the each of the other devices is a communication device having a function of transmitting data to a destination specified by address data, and
the shared data is address book data including the address data.

30. A device which is used as a node forming a network system including a plurality of other devices connected to a network, each of the other devices is assigned an ordinal rank in the system in which one of the devices of the highest ordinal rank functions as a master device and other devices of the devices with other ordinal ranks function as general devices, wherein the device comprises:
a master device checking unit configured to operate when the device is functioning as a general device to check that one of the other devices functioning as the master device exists in the system;
an ordinal rank judging unit configured to judge the ordinal rank of the device when no one of the other devices functioning as the master device exists in the system;
a control unit configured to control the device to function as the master device when the ordinal rank of the device is judged to be the highest in the system by the ordinal rank judging unit; and
a priority reassigning unit configured to reassign the other ordinal ranks of the each of the other devices connected to the network when the device functions as the master device, wherein the reassigning the other ordinal ranks further includes updating the ordinal rank of each of the devices connected to the network based on a corresponding master aptitude value.

31. A device which is used as a node forming a network system including a plurality of other devices connected to a network, each of the other devices is assigned an ordinal rank in the system in which one of the devices of the highest ordinal rank functions as a master device and other devices of the devices with other ordinal ranks function as general devices, wherein the device comprises:
- an ordinal rank determining unit configured to operate when the device is functioning as the master device to determine the ordinal rank of the each one of the other devices in the system based on characteristic information representing characteristics of the each one of the other devices in the system;
- a master replacement reporting unit configured to operate when the device is functioning as the master device to report to a higher-level device of an ordinal rank higher than the device that the higher-level device should function as the master device when the other devices ranked by the ordinal rank determining unit include such a higher-level device; and
- a control unit configured to control the device to function as the master device when the report indicating that the device itself should function as the master device is received from a current master device while the device is functioning as a general device; and
- a priority reassigning unit configured to reassign the other ordinal ranks of the each of the other devices connected to the network when the device functions as the master device, wherein the reassigning the other ordinal ranks further includes updating the ordinal rank of each of the other devices connected to the network based on a corresponding master aptitude value.

32. A device which is used as a node forming a network system including a plurality of other devices connected to a network, each of the other devices is assigned an ordinal rank in the system in which one of the devices of the highest ordinal rank functions as a master device and other devices of the devices with other ordinal ranks function as general devices, wherein the device comprises:
- an ordinal rank determining unit configured to operate when the device is functioning as the master device to determine the ordinal rank of the each one of the other devices in the system based on characteristic information representing characteristics of the each one of the other devices in the system;
- an ordinal rank reporting unit configured to report the ordinal rank to the each one of the devices when the ordinal rank is determined by the ordinal rank determining unit; and
- a control unit configured to control the device to function as a general device when the report indicating the ordinal rank is received from one of the other devices while the device is functioning as the master device; and
- a priority reassigning unit configured to reassign the other ordinal ranks of the each of the other devices connected to the network when the one of the other devices functions as the master device, wherein the reassigning the other ordinal ranks further includes updating the ordinal rank of each of the other devices connected to the network based on a corresponding master aptitude value.

* * * * *

UNITED STATES PATENT AND TRADEMARK OFFICE
CERTIFICATE OF CORRECTION

PATENT NO. : 7,673,008 B2
APPLICATION NO. : 11/359361
DATED : March 2, 2010
INVENTOR(S) : Atsushi Kojima It is certified that error appears in the above-identified patent and that said Letters Patent is hereby corrected as shown below:

In Column 42, Claim 10, Line 53:
Please replace "device to" with -- general device to supply --.

Signed and Sealed this

Thirteenth Day of July, 2010

David J. Kappos
*Director of the United States Patent and Trademark Office*